United States Patent [19]
Rogan et al.

[11] Patent Number: 5,321,816
[45] Date of Patent: Jun. 14, 1994

[54] LOCAL-REMOTE APPARATUS WITH SPECIALIZED IMAGE STORAGE MODULES

[75] Inventors: James D. Rogan, Grass Lake; Brian K. Forbes, West Bloomfield; Michael G. Birdsall, Ann Arbor, all of Mich.

[73] Assignee: Unisys Corporation, Blue Bell, Pa.

[21] Appl. No.: 988,365

[22] Filed: Dec. 9, 1992

Related U.S. Application Data

[63] Continuation of Ser. No. 420,081, Oct. 10, 1989, abandoned.

[51] Int. Cl.⁵ .............................................. G06F 13/00
[52] U.S. Cl. ................... 395/200; 364/DIG. 1; 364/DIG. 2; 364/242.94; 395/425
[58] Field of Search ... 364/200 MS File, 900 MS File; 395/200

[56] References Cited

U.S. PATENT DOCUMENTS

| | | | |
|---|---|---|---|
| 4,156,907 | 5/1979 | Rawlings et al. | 364/200 |
| 4,814,972 | 3/1989 | Winter et al. | 395/200 |
| 4,918,588 | 4/1990 | Barrett et al. | 364/200 |
| 4,922,486 | 5/1990 | Lindinsky et al. | 370/60 |
| 4,941,170 | 7/1990 | Herbst | 379/100 |
| 4,949,248 | 8/1990 | Caro | 395/725 |
| 4,958,341 | 9/1990 | Hemmady et al. | 370/60.1 |
| 5,021,949 | 6/1991 | Morten et al. | 395/200 |
| 5,129,061 | 7/1992 | Wang et al. | 395/200 |
| 5,155,847 | 10/1992 | Kirouac et al. | 395/600 |

*Primary Examiner*—Joseph L. Dixon
*Assistant Examiner*—Matthew M. Kim
*Attorney, Agent, or Firm*—Alfred W. Kozak; Mark T. Starr

[57] ABSTRACT

An apparatus provides a network combining a local site having a host computer and a specialized storage and retrieval module for storing image information which is connected to a remote site having document processing equipment working with remote specialized storage retrieval modules for storage of image and information data. The single local main host computer can operate the network such that documents which are converted to digitized packets can be stored in and retrieved from both the remote storage retrieval modules and also stored int eh local storage retrieval module for use of the remote and the local peripheral devices.

4 Claims, 28 Drawing Sheets

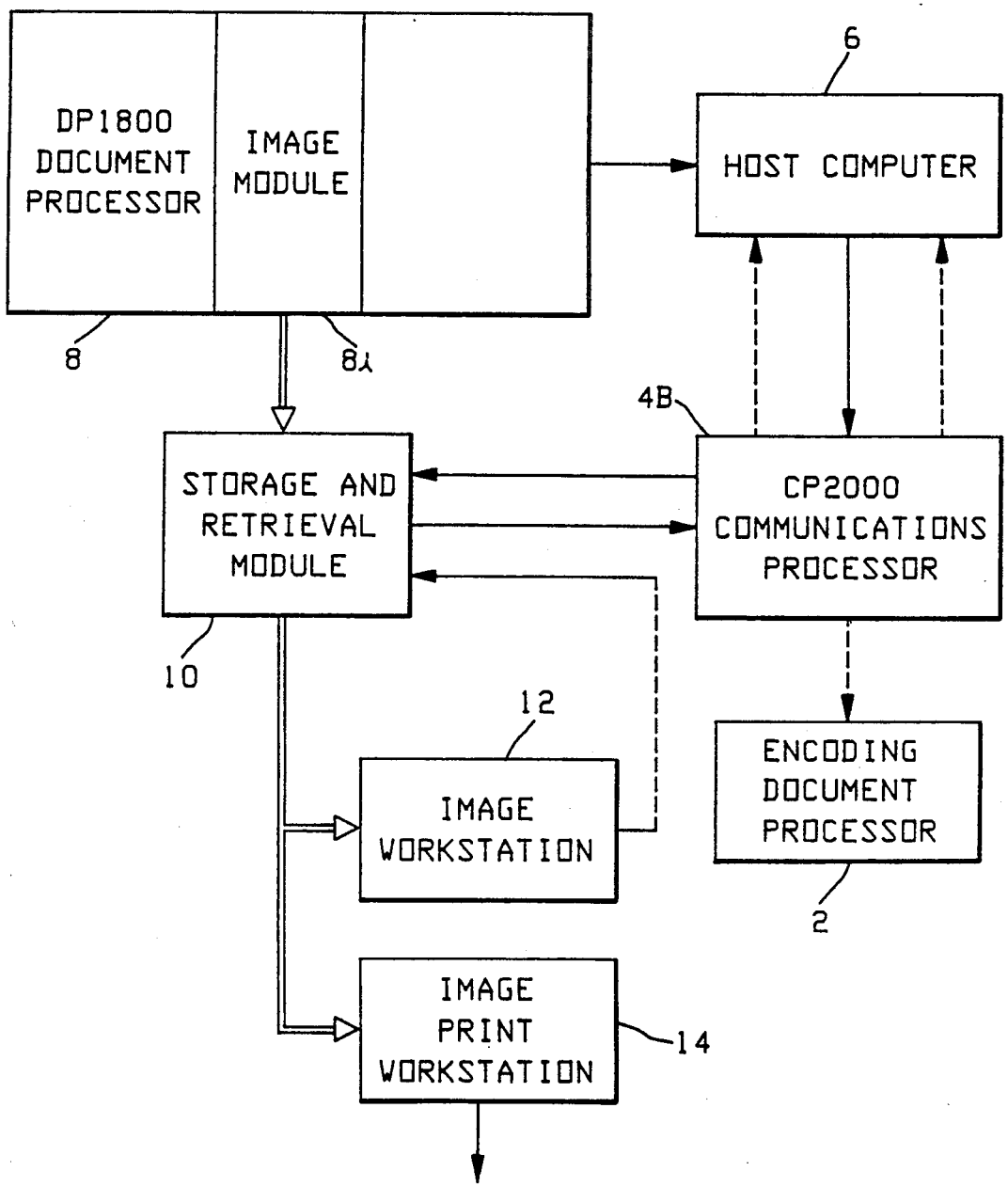

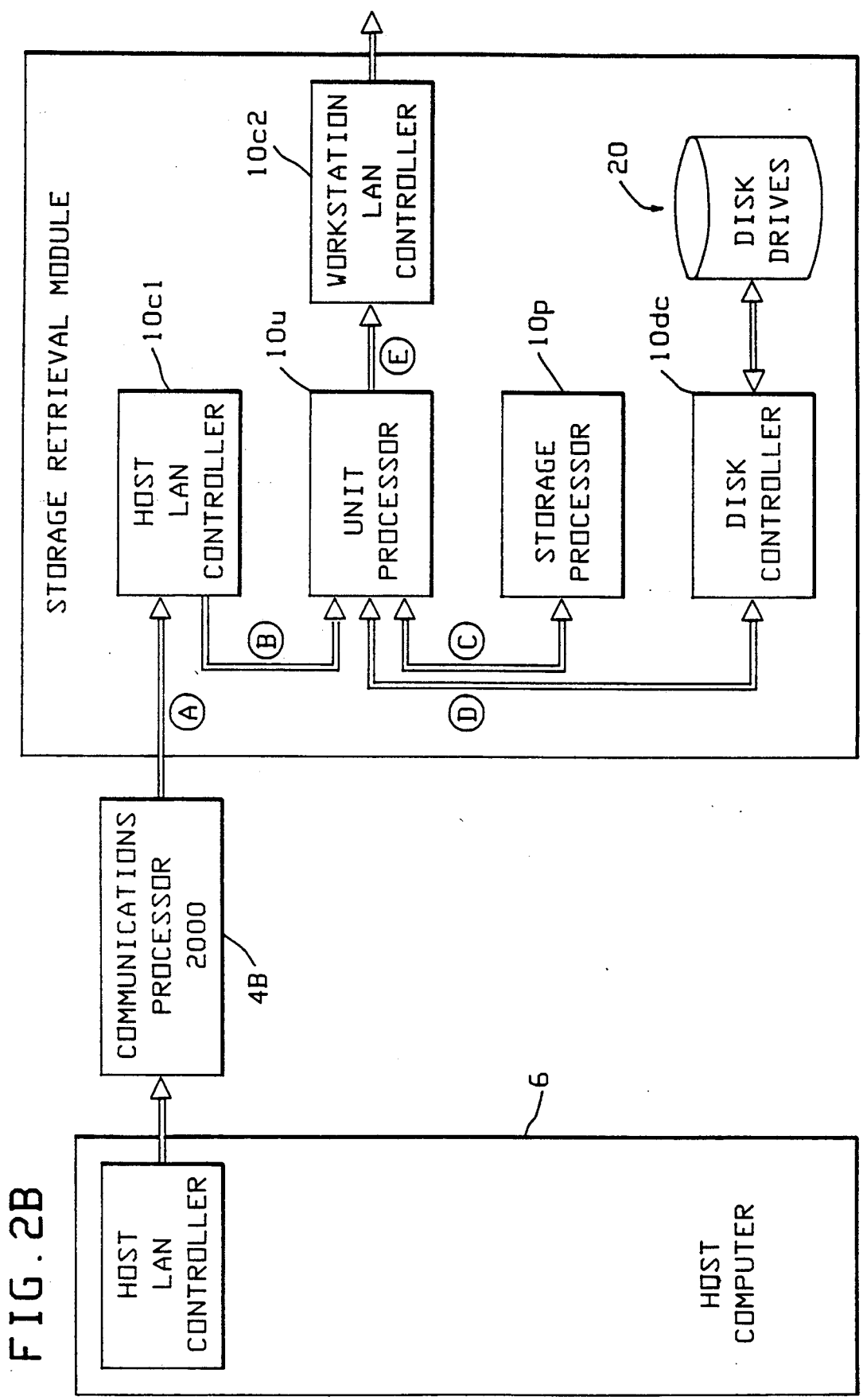

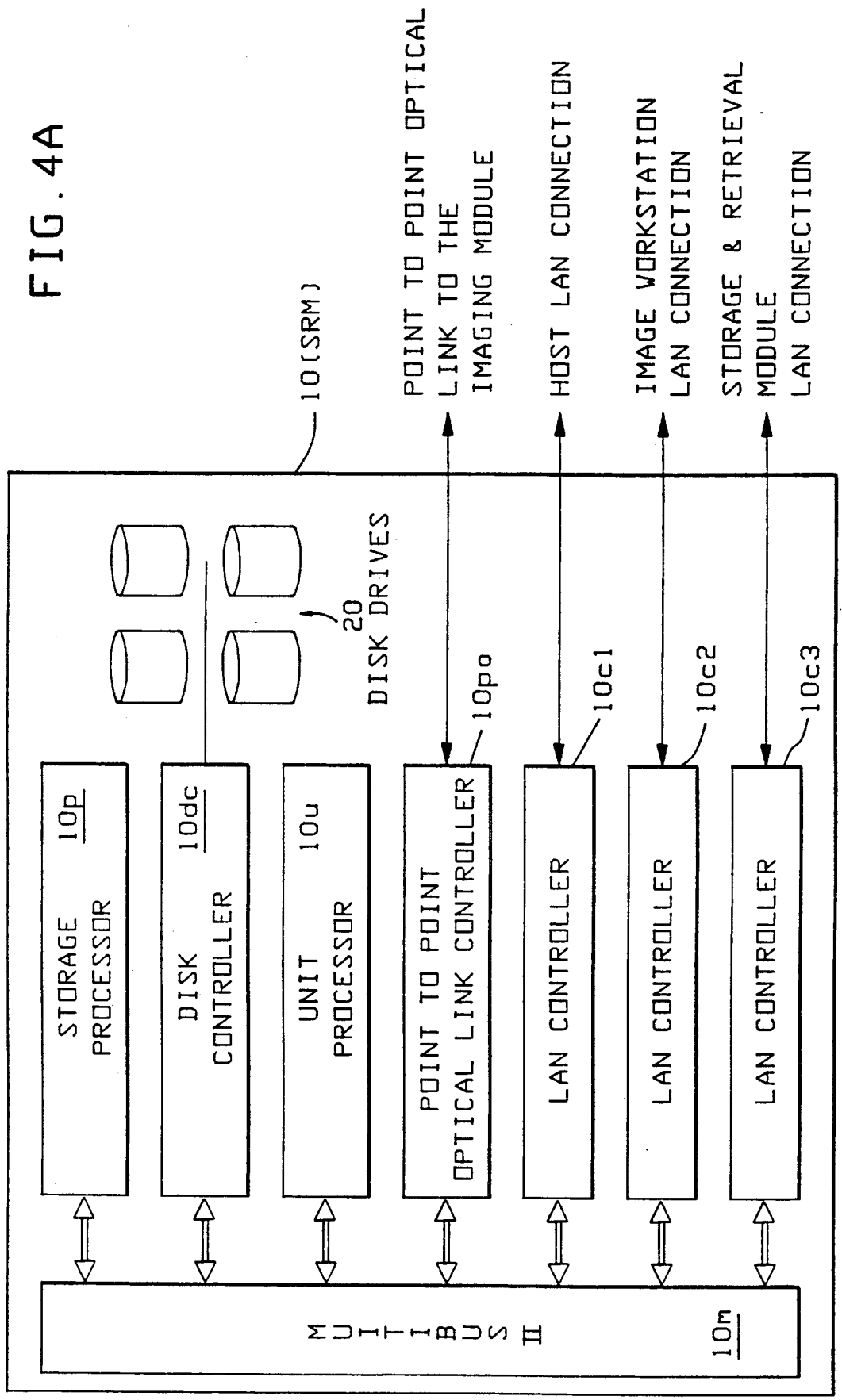

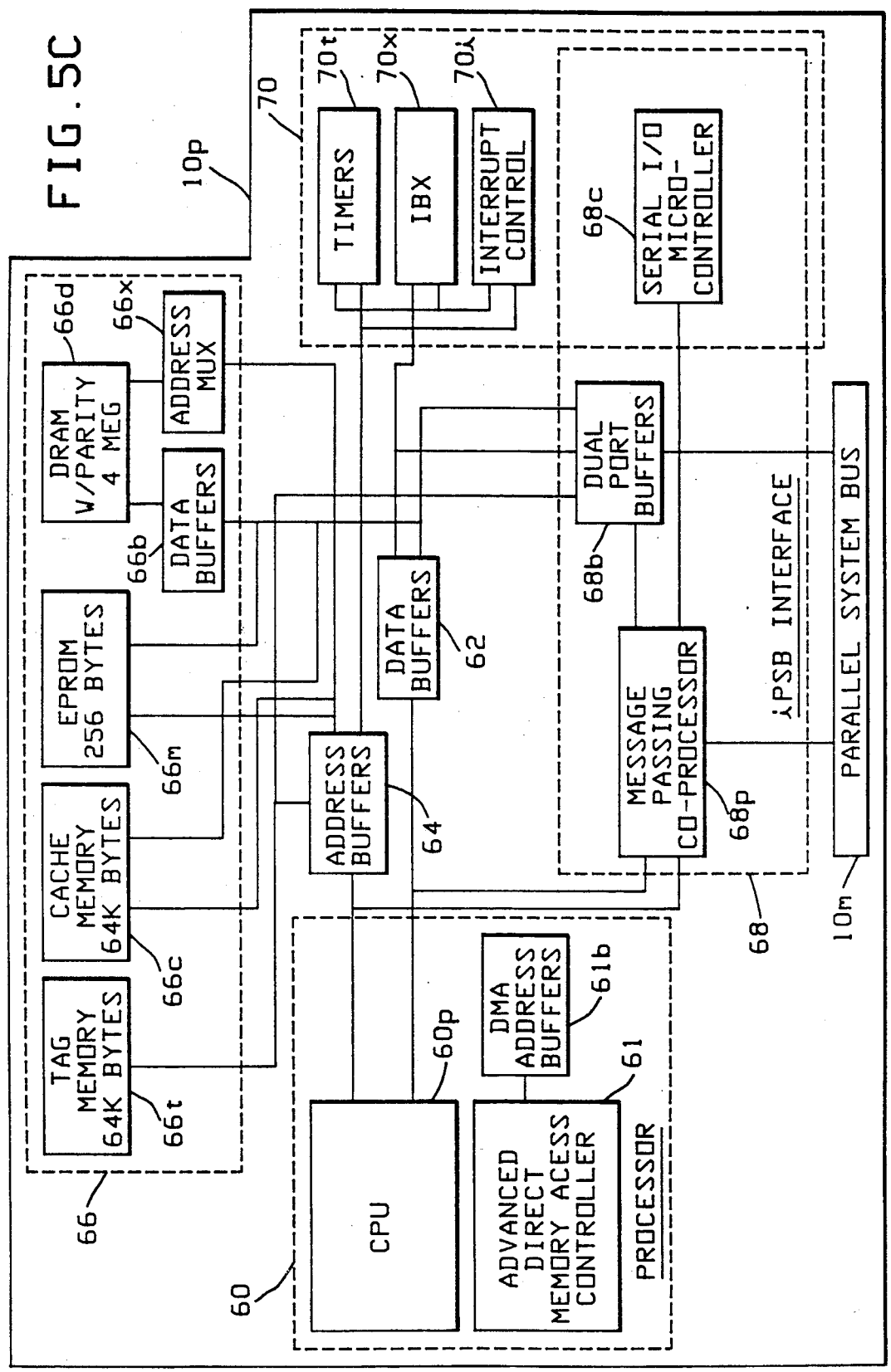

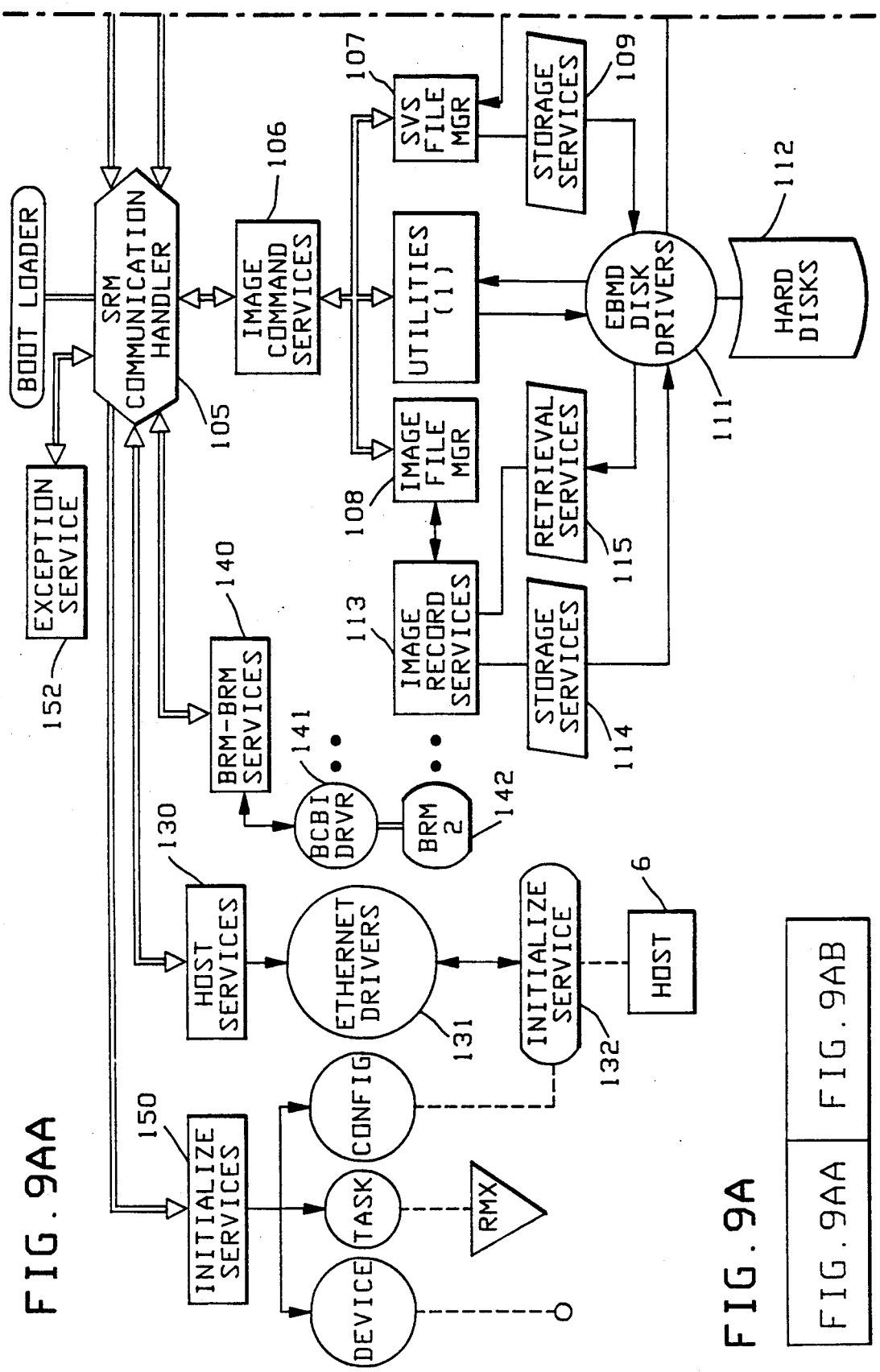

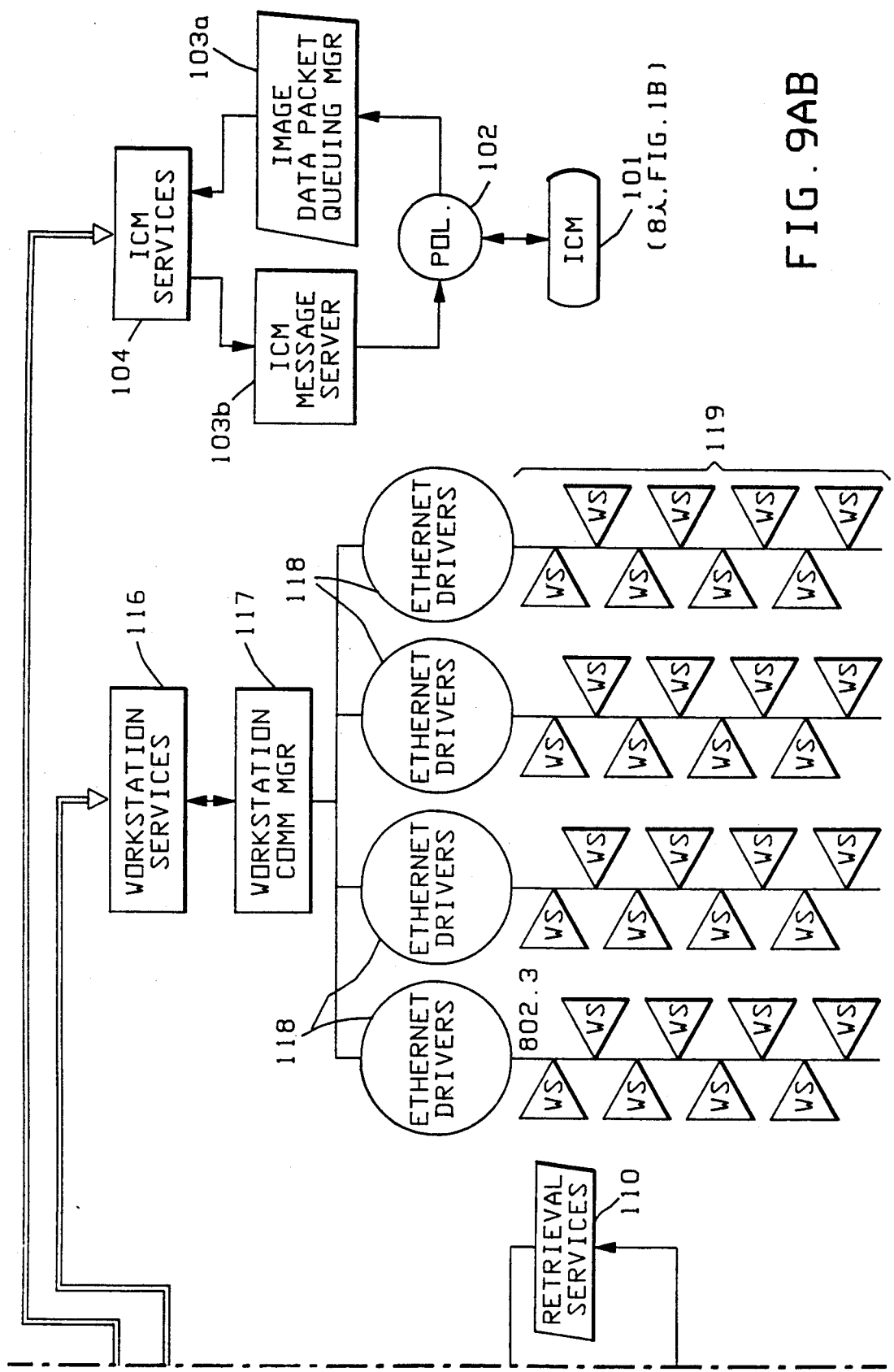

FIG. 9CA

```
1  /*IMAGE HEADER STRUCTURE */
2
3  DCL     IMG_11DR STRUCTURE
4          STRUCTURE(                      LIT
5          STATUS0                         WORD.
6          STATUS1                         WORD.
7          BIT_CHI                         DWORD.
8          X_PEL_SIZE                      BYTE.
9          X_PEL_SIZE                      BYTE.
10         Z_PELS                          WORD.
11         Z_PELS                          WORD.
12         COLOR_SCHEME                    STRUCTURE
13         (COLOR_FLAG                     BYTE.
14         RED_CODE                        BYTE.
15         BLUE_CODE                       BYTE.
16         GREEN_CODE                      BYTE.
17         WHITE_CODE                      BYTE.
18         BLACK_CODE                      BYTE).
19         RESERVED1                       BYTE.
20         NUMBER_OF_GRAYLEVELS            BYTE.
21         LOWER_GRAYLEVELS                BYTE.
22         UPPER_GRAYLEVELS                BYTE.
23         GRAYLEVEL_MAP           (256)   BYTE.
24         PROCESSING_HISTORY              DWORD.
25         CREATION_TIME                   IH_TIME_STAMP_STRUCTUTE
26         RESERVED2                       BYTE.
27         UNIT_NUMBER                     DWORD.
28         IMAGE_FORM                      BYTE.
29         COMPRESSION_TECHNIQUE           BYTE.
30         SCAN_DIRECTION                  BYTE.
31         SCAN_PROGRESSION                BYTE.
32         NON_FATAL_IMG_ERROR             WORD.
33         RESERVED3               (10)    BYTE.
34         X_ZONES                         BYTE.
35         Y_ZONES                         BYTE.
```

| | |
|---|---|
| FIG.9CA | FIG.9CB |

```
36        X_ZONE_PELS                      WORD,
37        Y_ZONE_PELS                      WORD,
38        ZONE_OFFSET                      STRUCTURE
39        (BIT_PTR                         WORD,
40         WORD_PTR                        WORD));
41
42                              (64)
43 /* IMAGE HEADER LITERALS */
44
45 DCL  -FCS$X$PEL$SIZE                    LIT '5';
46 DCL  -FCS$Y$PEL$SIZE                    LIT '5';
47 DCL  -RED$COLOR                         LIT '1';
48 DCL  -BLUE$COLOR                        LIT '2';
49 DCL  -GREEN$COLOR                       LIT '3';
50 DCL  -BLACK$COLOR                       LIT '4';
51 DCL  -WHITE$COLOR                       LIT '8';
52 DCL  -FCS$WHITE                         LIT '0';
53 DCL  -FCS$BLACK                         LIT '0FFH';
54 DCL  -FCS$NUMBER$OF$GRAYLEVELS          LIT '4';
55 DCL  -FCS$LOWER$GRAYLEVEL               LIT '0';
56 DCL  -FCS$LOWER$MID$GRAYLEVEL           LIT '050H';
57 DCL  -FCS$UPPER$MID$GRAYLEVEL           LIT '080H';
58 DCL  -FCS$UPPER$GRAYLEVEL               LIT '0FFH';
59 DCL  -FCS$DEFAULT$PROCESSING$HISTORY    LIT '001FH';
60 DCL  -INTERNAL$IMAGE$FORM               LIT '0';
61 DCL  -EXTERNAL$IMAGE$FORM               LIT '1';
62 DCL  -FCS$COMPRESSION$TECHNIQUE         LIT '1';
63 DCL  -FCS$SCAN$DIRECTION                LIT '4';
64 DCL  -FCS$SCAN$PROGRESSION              LIT '2';
65 DCL  -FCS$MAX$X$ZONES                   LIT '0';
66 DCL  -FCS$MAX$Y$ZONES                   LIT '64';
67 DCL  -FCS$X$ZONE$PELS                   LIT '1024';
68 DCL  -FCS$Y$ZONE$PELS                   LIT '16';
69 DCL  -NON$EXISTENT$ZONE                 LIT '0FFFFH';
70
```

FIG.12B  INDEX RECORD STRUCTURE
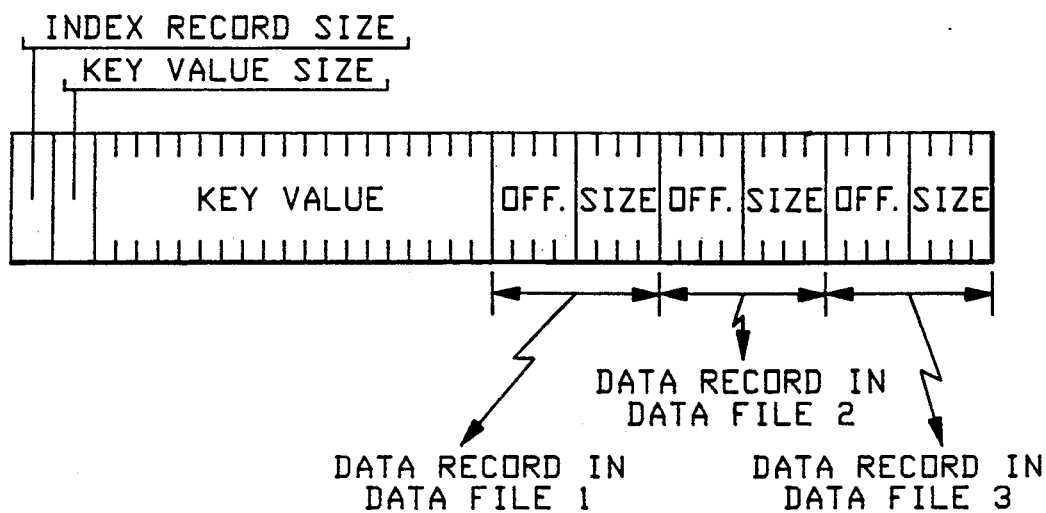
FIG.12C  INDEX FILE ORGANIZATION
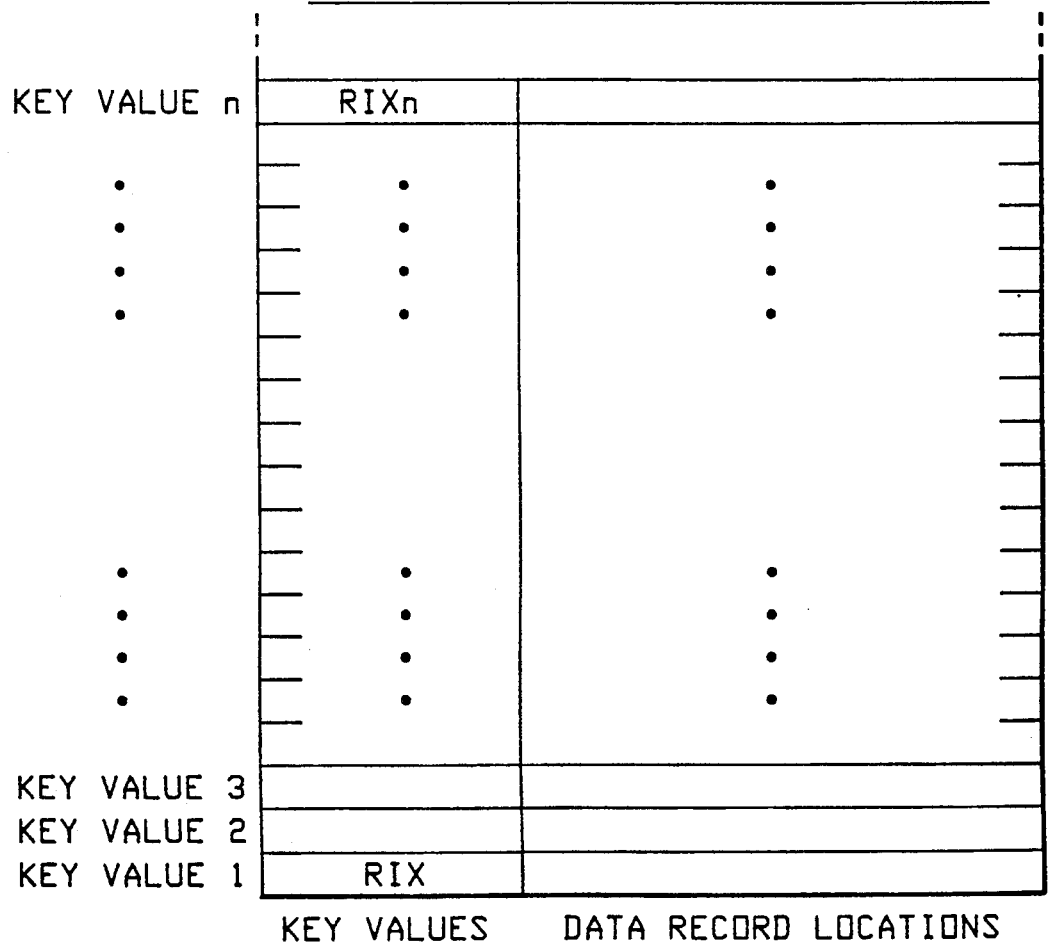

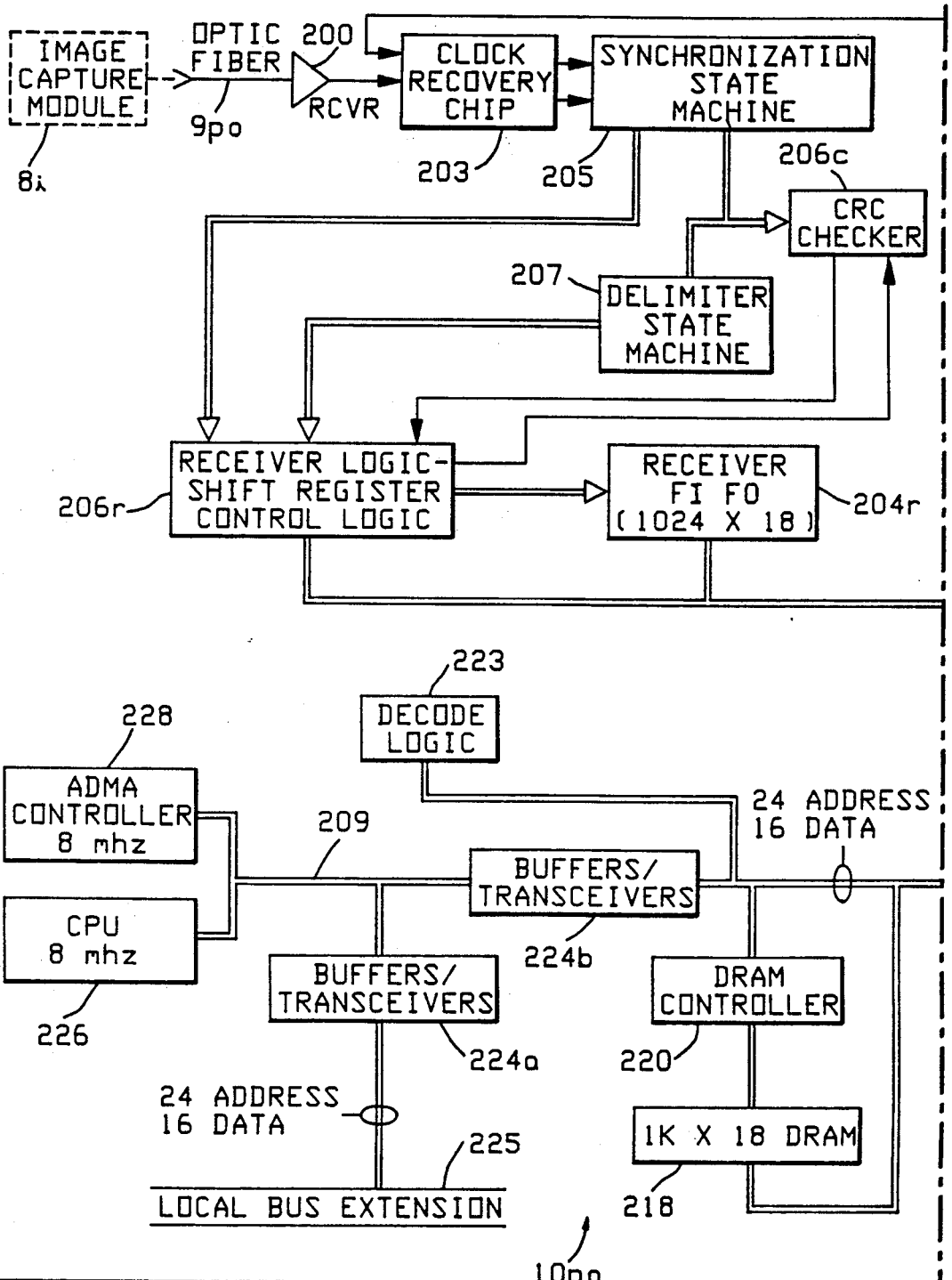

LOCAL-REMOTE APPARATUS WITH SPECIALIZED IMAGE STORAGE MODULES

This is a continuation of copending U.S. application Ser. No. 07/420,081 filed on Oct. 10, 1989 now abandoned.

FIELD OF THE INVENTION

This disclosure relates to remote storage and retrieval systems used for high-speed, high-volume data storage/retrieval while still permitting control management from a single host computer at a local site.

CROSS REFERENCES TO RELATED APPLICATIONS

This disclosure is related to a co-pending application which issued as U.S. Pat. No. 5,170,466 on Dec. 8, 1992 and which is commonly owned by the same assignee as this application.

BACKGROUND OF THE INVENTION

With the rising capability and flexibility of modern-day computer systems, there are increasing trends toward automation of tedious and routine functions in the handling of large volumes of data, and especially with the volumes of data engendered in the work of financial institutions, for example, whereby thousands of documents such as checks, deposit slips, remittance information forms, etc., must be checked, sorted, corrected, totalized and returned to the banks or financial institutions where they originated.

Thus, many financial and banking institutions maintain large staffs of people who facilitate the standard document processing procedures which require that all actual items be physically handled, reviewed and distributed to some other destination in addition to having made records of each of the individual transactions so that checking statements can be made for customers and also financial data and balances recorded for the operations of the banking or other financial institutions. Thus, much administrative overhead and handling is involved in these processes where various operators and administrative personnel must handle large volumes of individual documents which must be locatable and readable, and, in the case of checks, must be imprinted upon with the standard MICR (Magnetic Ink Character Recognition) codes.

The present disclosure involves a sophisticated image and item processing system which provides for greater efficiencies in the handling of large volumes of documents and information. Thus, instead of dealing with the actual documents for processing operations, the system operators and administrative personnel, in facilities of these banking or financial institutions, can use imaging systems which store images of the applicable documents. The operators can view the image data on image workstations and thus reduce the requirements for handling paper documents.

Thus, by working from document images on an image workstation, the operator is able to spend much less time and effort searching through stacks of paper and to devote more time for the processing of documents. The use of electronic images, instead of manual handling of physical documents, provides a new way of performing document processing functions.

A schematic overview of the general system for image and item processing is shown in FIG. 1A. The image and item processing system is composed of a number of modules which intercooperate to provide the required functions in the processing of documents in high volume and at high speed. These items include the high-speed document processor 8 and imaging module 8i, the Storage and Retrieval Module (SRM) 10, the image workstations 12, the image printer workstations 14, the encoding document processor 2, and the host computer system 6.

The system uses imaging technology to capture and process images of documents for item processing. Document images are stored and retrieved so that operators may perform various of the required activities when using the document image. These various types of activities are enabled by the application software being used.

In the operations of FIG. 1A, for example, financial institutions use the image and item processing system to electronically capture images of financial documents as they pass along the transport track in the document processor 8. After the images are captured, they are converted to digital data. The digital data is then sent to a disk storage device where it is later retrieved for display at the various image workstations. Operators may then perform data entry activities on the document image retrieved. Thus, institutions which handle large volumes of documents, such as banks and other financial institutions, may reduce the time and steps required to process a large volume of documents.

The document processor 8 is a high-speed, fast-sorting machine. It reads the magnetic ink character recognition code line (MICR) on documents as they flow through the transport and endorses them with the financial institution's endorsement. Further, it microfilms the documents as they pass the microfilmer and then uses previously programmed instructions to complete the customer sorting requirements by sending each document to a particular and appropriate pocket. The high-speed document processor 8 serves as an image capture site. Documents pass through the imaging module 8i, FIG. 1B where images are lifted from the documents at real-time sorter speed. The imaging module 8i, FIG. 1B digitizes, processes, and compresses the captured images. The resulting data is sent to the Storage and Retrieval Module in FIG. 1A.

The host computer 6 is connected to the document processor 8 through an interface which enables the document processor to receive the sorting parameters from the host 6 that will determine how it should sort the documents. The documents are read, endorsed, microfilmed, imaged, and sorted according to these parameters. After a first pass, the document processor 8 sends the acquired document code line data to the host. The host 6 is a mainframe computer which manages the entire system and stores all master data files except the image files.

The Imaging Module 8i is housed in the document processor 8 and provides the imaging capability for the system. It captures front and back images of documents and converts the image data to digital form. The Imaging Module 8i then combines the image and document data into image packets for transfer to the Storage and Retrieval Module 10.

The Storage and Retrieval Module (SRM) 10, stores the image packets until an image workstation 12 or print workstation 14 requests them for display or printing. The SRM transfers the image packet over a network to the workstations. Additionally, the SRM 10 receives modified document data from the image workstations (after the operators have performed data entry activities) and then sends it to the host 6.

The Image Workstation 12, of which there may be multiple numbers available, is the primary user interface for the system. It generally will have a high-resolution, 15-inch, monochrome, gray-scale monitor window with a high-performance data entry keyboard and an optional alpha/numeric keyboard. Thus image data is sen from the SRM and a high-resolution image can be made to appear on the monitor window. These image workstations can be located in a typical, quiet office environment rather than immediately in the computer room in order to provide a comfortable work place.

The main input device from operator to the workstation 12 is the data entry keyboard which is designed to facilitate image manipulation and high-speed data entry. Thus, an operator can zoom, pan, flip, or rotate a document image with one simple keystroke.

The communications processor 4B (FIG. 1A) facilitates communication between the host 6, the SRM 10, and the encoding document processors 2 of FIG. 1A.

The encoding document processors 2 are used for certain specific applications such as the re-entry of rejected documents and items and also for "power encoding" which is a process which automatically encodes items passing through a document processor with data previously entered by operators at their image workstations 12. These document processors 2 will pass document data through the communications processor 4B over to the host 6. When doing the power encoding function, the encoding document processor 2 (in one embodiment) is capable of encoding 3,800 documents per hour. Thus, when operators place groups of documents into the automatic feeder on the encoding document processor 2, the documents automatically move into the transport track, which then takes them past the MICR reader and the encoder module and then out into the various sorted pocket modules. The encoder module prints the MICR or Optical Character Read (OCR) characters onto the items as they flow through the transport. The typical operation is that the documents will be encoded with certain numerical amounts such as dollars and cents.

The print workstation 14 of FIG. 1A uses a type of image printer which involves a 300-dot-per-inch, non-impact laser printer that can print on standard 8½-inch × 11-inch paper in order to provide hard copy of images or data items or text.

As a result of this cooperative hardware in the image and item processing system, there is enabled a setup-of increased productivity, there is increased speed of operations because of the image-based processing capability, and there is an increased operator efficiency since there is no need to physically handle paper documents which can be called up on the image workstations. Further, there is a "flexibility" possible through modular configuration and by the addition of other modular units to increase capacity and with the provision of a quiet work environment through individual workstations such that the quality of the operator's work life eliminates fatiguing operations and improves operation efficiencies.

SUMMARY OF THE INVENTION

The present disclosure involves a system usable for long distance links whereby a document and image item processing system is operable completely in one local site and yet at the same time may be linked to remote cities at a distance so that high-speed, high-volume image and data document storage and retrieval can be effectuated at the remote location without the need for supplying a host computer system to manage the remote image processing operations. This system is built upon the use of a unit known as the storage/retrieval module (SRM) which is connected to a host processor through a local area network controller. The SRM provides capabilities for the storage of data received from high speed document sorters which capture images of documents in addition to sensing specific information data about each of the documents. Thus, while a bank may process documents locally, it is capable of also having satellite operations in distant cities which can also provide for the high speed processing with storage and retrieval of the images and information regarding the documents.

The Storage and Retrieval Module (SRM) 10 of the image and item processing system is a high-speed, magnetic disk controller which performs a number of essential functions supportive of the image and item processing system. It retrieves and stores images from the imaging module. It transfers images to the Image Workstations. It transfers images to the Print Workstations. It transfers images to and communicates with other SRM's which can be interconnected. Further, it sends copies of document identification data to the host computer and then also provides image and system file management services to the other hardware components of the system.

Each SRM has a minimum of two hard-disk drives and can support as many as eight disk drives. Additionally, the SRM can support as many as four Local Area Network (LAN) links, each of which can connect a maximum of eight image workstations and print workstations for the purposes of retrieving, manipulating, and printing stored images and data. Thus a total of 32 image workstations and print workstations may be supported by only one SRM.

The architectural configuration of the SRM includes multiple printed circuit board assemblies plus two disk drives (minimum) and a Multibus II backplane. The printed circuit board assemblies include a Point-to-Point Optical Link Controller board which receives image packets from the Imaging Module. The next element is the storage processor board which allocates space on the disk drives for storing image packets and holds the image packets until the data amount reaches a pre-established size. A concurrently operating unit processor board reads and buffers image packets from the disk before sending the packets on to the workstations. The unit processor is also responsible for providing the state control for the SRM such as ONLINE/OFFLINE.

The next printed circuit board is that of the disk controller board which prepares image packets for transmittal to the disk drives and handles all disk control functions and errors. The storage and retrieval module can have two disk controller boards that can support as many as four disk drives each. The unit processor board controls internal co through a Multibus II backplane.

The next board assembly is the LAN controller which enables communications between the SRM and the host computer, the workstations and other SRM's Each external connection has its own LAN controller.

The two disk drives are used to provide up to 1.2 gigabytes (GB) of storage capacity for each disk drive while the Multibus II backplane connects all of the various SRM boards. This backplane also provides data movement and interprocessor communications functions while also supporting arbitration, execution, I/O data movement and support for the printed circuit board configuration.

BRIEF DESCRIPTION Of THE DRAWINGS

FIG. 2A is a block diagram indicating the data flow between the hardware elements involved in the image and item processing system;

FIG. 2B is a block diagram of the Storage and Retrieval Module and its connection to the host computer;

FIG. 4A is a block diagram of the Storage and Retrieval Module (SRM);

FIG. 5C is a detailed block diagram of the storage processor;

FIG. 9A is a composite of FIG. 9AA and FIG. 9AB showing a diagram of the Storage/Retrieval Module Subsystem operation;

FIG. 9C is a composite of FIGS. 9CA and 9CB showing a list of items usable for the image header of FIG. 9B;

FIG. 12B illustrates the Index Record Structure;

FIG. 12C shows the Index File organization;

DESCRIPTION OF PREFERRED EMBODIMENT

Figure 3A:
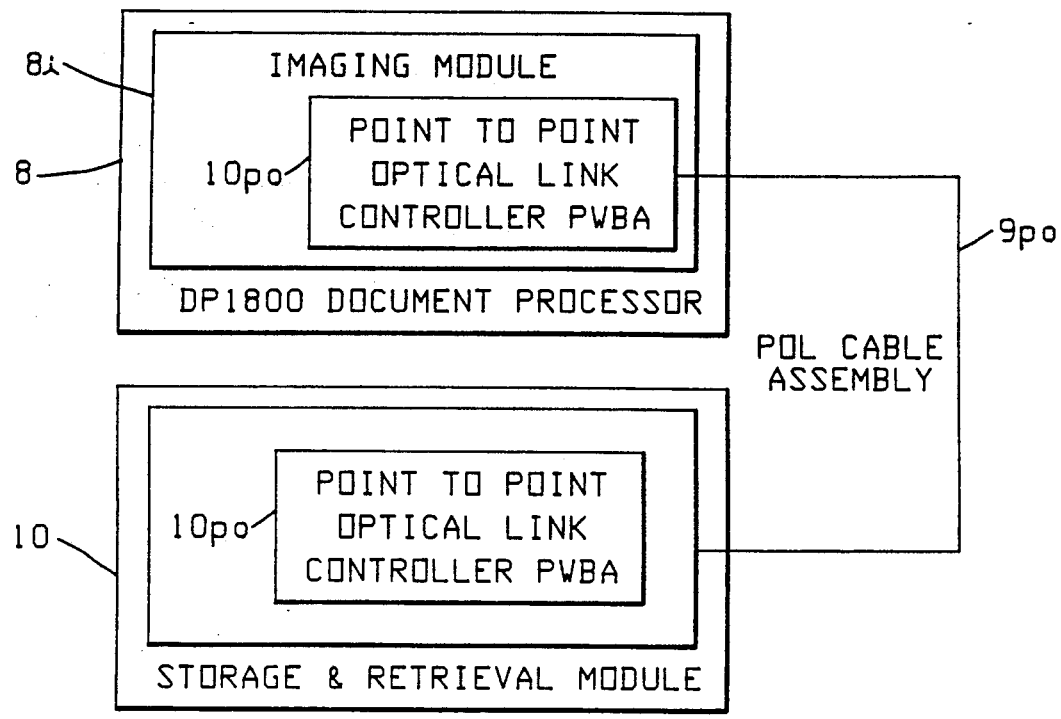
FIG. 3A is a diagram showing the Point-to-Point Optical Link between Imagining Module and the Storage and Retrieval Module.
Figure 3B:
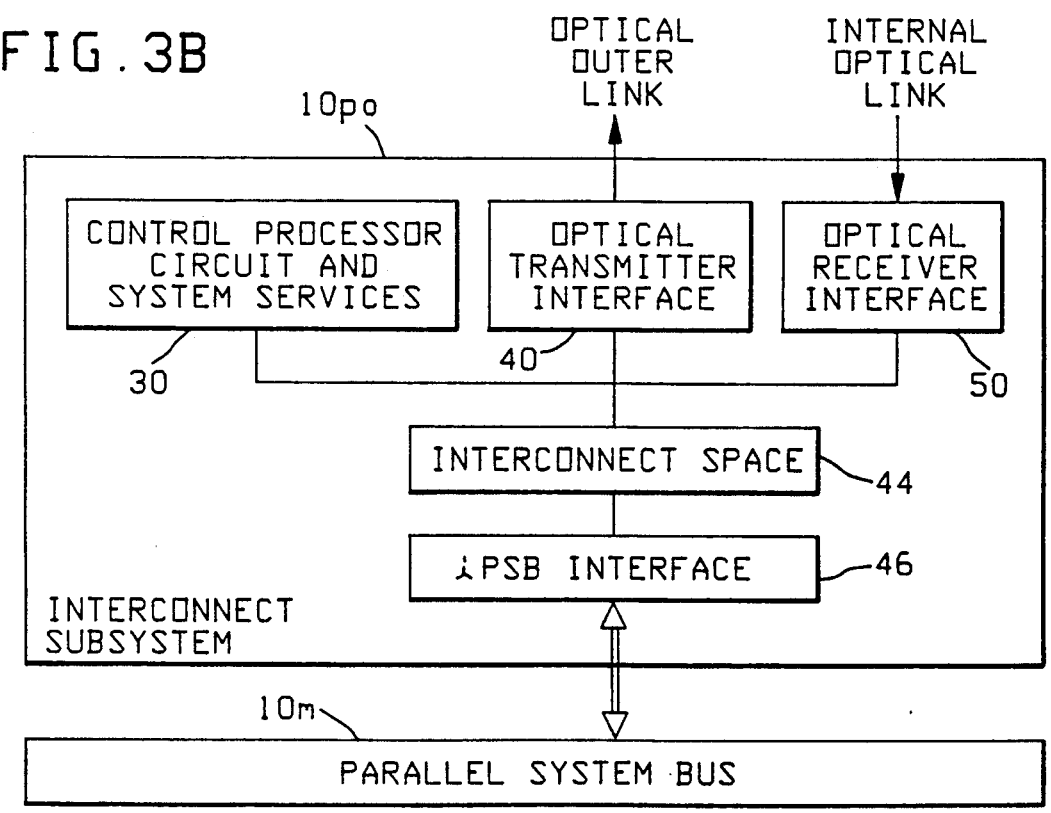
FIG. 3B is a block diagram of the Point-to-Point Optical Link Controller.

The image and item processing system uses a Point-to-Point Optical Link to connect an imaging module 8i to a Storage and Retrieval Module 10. Each document processor 8 (FIG. 1) has one imaging module 8i. A single Imaging Module 8i interfaces to a single Storage and Retrieval Module 10. This imaging module 8i also called the Image Capture Module or ICM. FIG. 3A illustrates the interconnection between the Imaging Module and the Storage Retrieval Module. The interconnection is accomplished through a POL (Point-to-Point Optical Link) cable assembly. Thus, there are seen Point-to-Point Optical Link (POL) controller boards which are used for each imaging module interconnection to the SRM. One of the Point-to-Point Optical Link controllers resides in the Imaging Module 8i and the other Point-to-Point Optical Link controller resides in the SRM 10. The Optical Link controller assemblies are linked through a fiber optic cable, called the POL cable assembly, which consists of a duplex, fiber optic cable with Fiber Distributed Data Interface (FDDI) connectors on both ends. FIG. 3B shows a simplified block diagram of the POL controller.

The SRM's may be enhanced by interconnecting them to each other to form a subsystem known as the Storage/Retrieval Subsystem (SRS). Each SRM interfaces to and supports the image storage requirements of the images being captured on the Image Capture Module (ICM) 8i of the document processor 8 where the storage is provided by use of high-performance magnetic disk drives.

A maximum of six SRM units may be clustered together via a high-speed data connection to provide a shared capture environment. The maximum capacity of the SRS is generally 12 SRM's or storage retrieval units.

In addition to providing the basic image storage capability, the SRM also supports retrieval of images from storage for transmission to the attached workstations, printers and to other SRM's.

There are additional functions which are provided by each of the SRM's 10 and these include: (i) image file management (ii) workstation and printer interface management, and (iii) system file management, and (iv) unit management.

Figure 4B:
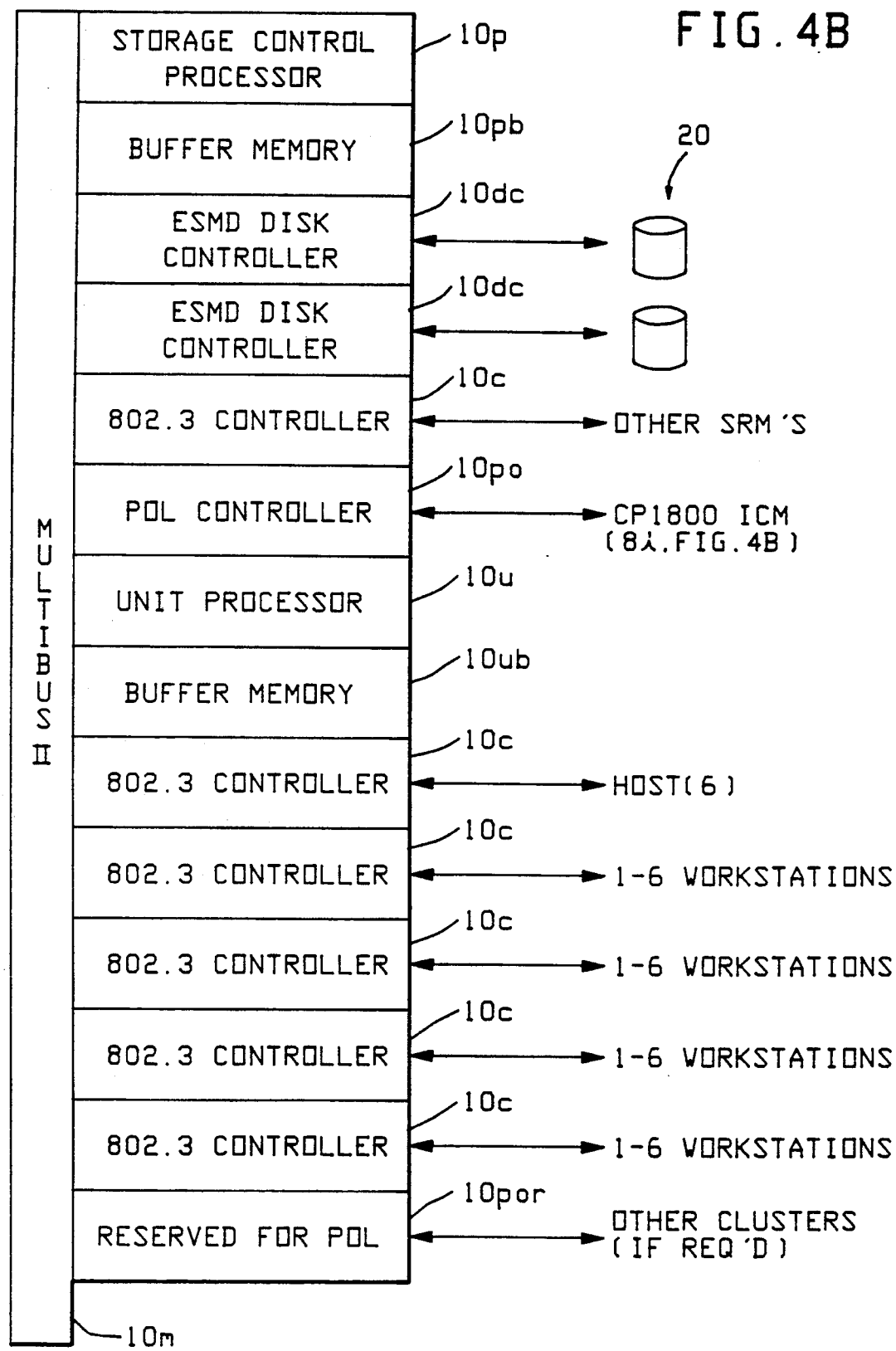
FIG. 4B is a diagram of one embodiment of the SRM indicating the printed circuit boards connected within.

As seen in FIG. 4B, there are a number of hardware functions provided by the SRM. These include:

(1) a magnetic disk write and read function which is implemented via an Extended Storage Module Drive (ESMD interface 10dc;

(2) an ESMD interface controller 10dc to the disks which are controlled by the SRM which operates at a data transfer rate of 2.5 MB per second. A maximum of 4 gigabytes of disk (formatted) may be controlled by each SRM;

(3) a LAN (local area network), (IEEE 802.3) controller 10c function used to connect workstation printers;

(4) a LAN (IEEE 802.3) controller 10c function for communication to the host processor 6;

(5) a LAN (IEEE 802.3) protocol controller 10c to interconnect the SRM's;

(6) a system bus 10m to allow the above functions to communicate to each other within the SRM itself.

FIG. 4A shows a generalized block diagram of the components of the SRM 10. All of the items are interconnected by the Multibus II 10m. The various components include the Storage Processor 10p, the disk controller 10dc, the unit processor 10u, the Point-to-Point Optical Link Controller 10po, the LAN Controllers 10c1, 10c2, and 10c3. Attached to the disk controller 10dc is a series of disk drives 20. The LAN controllers connect respectively to the host 6, the image workstation 12, and the auxiliary SRM's by means of LAN connections. The Point-to-Point Optical Link Controller 10po connects to the Point-to-Point Optical Link in the imaging module 8i.

SRM Data Flow: The image data and non-image data enter the SRM together in the form of an "image packet". The Imaging Module 8i sends the image packet and, after the image packet enters the SRM 10 through the Point-to-Point Optical Link assembly 10po, it is then sent over the Multibus 10m to the Storage Processor 10p.

The Storage Processor board 10p (FIG. 4A, 4B) allocates disk space for the packet. It buffers, via buffer memory 10pb, the image packets until there is enough data for a buffer transfer to be made to disk. Then it formats the data, prepares the disk space, and then transfers the data to the disk controller board 10dc.

The disk controller board 10dc receives the image packet and prepares it for transmittal to the disk drive location which was defined by the Storage Processor 10p. Data is then transferred from the disk controller board 10dc to the disks 20. The image packet is stored on the disk until the SRM module 10 receives a request to retrieve the selected image packet or group of packets. Image packets are retrieved through a read and transfer of the packet data. The image data which is stored on the disk is not altered or erased.

A message specifying the data to be retrieved is sent from the workstation 12 to the Unit Processor assembly 10u, FIG. 4A. The Unit Processor 10u forwards the request to the Storage Processor 10p. The Storage Processor 10p receives the request and translates it into a command to locate the disk space in which the particular data resides. The Storage Processor assembly 10p then sends the command back to the Unit Processor assembly 10u. The Unit Processor 10u sends the command to the disk controller assembly 10dc which then generates the command to retrieve the data from the disks. The data is retrieved from the disks and sent back to the Unit Processor 10u by means of the disk controller 10dc.

The Unit Processor 10u transmits the data to a workstation LAN controller 10c2 (FIG. 4A) and the assembly sends the data over the LAN to the image workstation 12 or the printing workstation 14 for which the request was processed.

Because the Storage Processor 10p and the Unit Processor 10u use the same disk controller assembly 10dc, the disk accesses by the processor assemblies are coordinated by the storage processor command sequencer. The Multibus II transport protocol also enables communication between the different controllers in the SRM.

It is possible to organize many different configurations in the SRM, each configuration of which is built from the basic configuration. The basic configuration consists of the SRM cabinet, a configuration of electronics gates and two disk drives. The minimum electronics gate configuration includes the Multibus II backplane, the Storage Processor 10p, the Unit Processor 10u, three LAN communication controller assemblies 10c1, 10c2, 10c3, and one Point-to-Point Optical Link Controller assembly 10po, plus one disk controller assembly 10dc that supports the two disk drives 20.

In FIG. 4B there is seen a configuration of the SRM 10 where a number of Ethernet controllers are used for communication to clusters of workstations. Also, additionally shown is the extended system magnetic disk controller and buffer memory section.

Multibus II Backplane: The Multibus II backplane connects all of the controller and processor printed circuit boards required for the SRM 10 in one backplane by using a common interconnection scheme. This interconnection thus provides a flexible, high-speed transfer mechanism between the printed circuit boards. The Multibus II supports multiple processor systems and multiple operating systems.

Point-to-Point Optical Link Controller Printed Circuit Board: The Point-to-Point Optical Link Controller circuit board is an assembly manufactured based on fiber optic technology. Optical links are required in order to support the very high data rates required for efficient imaging applications. The Point-to-Point Optical Link controller board provides a fiber optic communication interface, in addition to buffering the data being sent, and also handles all Point-to-Point Optical Link Controller communication errors. It provides central services modular functions required for the Multibus II parallel system bus, which services deal with system initialization, system clock generation, and system failure.

The SRM 10 communicates directly to the Imaging Module 8i and indirectly to the Document Processor 8 by means of a point-to-point optical link connection to Imaging Module 8i. This connection is terminated at each end by a point-to-point optical link controller board seen in FIG. 3A, and which is under the control of the SRM Unit Processor board 10u. The Point-to-Point Optical Link Controller assembly uses an Intel 80286 microprocessor for its central processing unit (CPU). This board handles duplex serial communication over a pair of serial fiber optic links.

Storage Processor Printed Circuit Board: Image packets of data are sent from the Imaging Module 8i to the SRM 10 over the Point-to-Point Optical Link shown in FIG. 3A. The Point-to-Point Optical Link Controller, shown in more detail in FIG. 3B, receives the data, processes it, and transmits the data to the Storage Processor 10p of FIG. 4A. The Storage Processor 10p stores or buffers the image packets received from the Imaging Module 8i by storing it in buffer memory, 10pb, FIG. 4B.

Figure 1A:
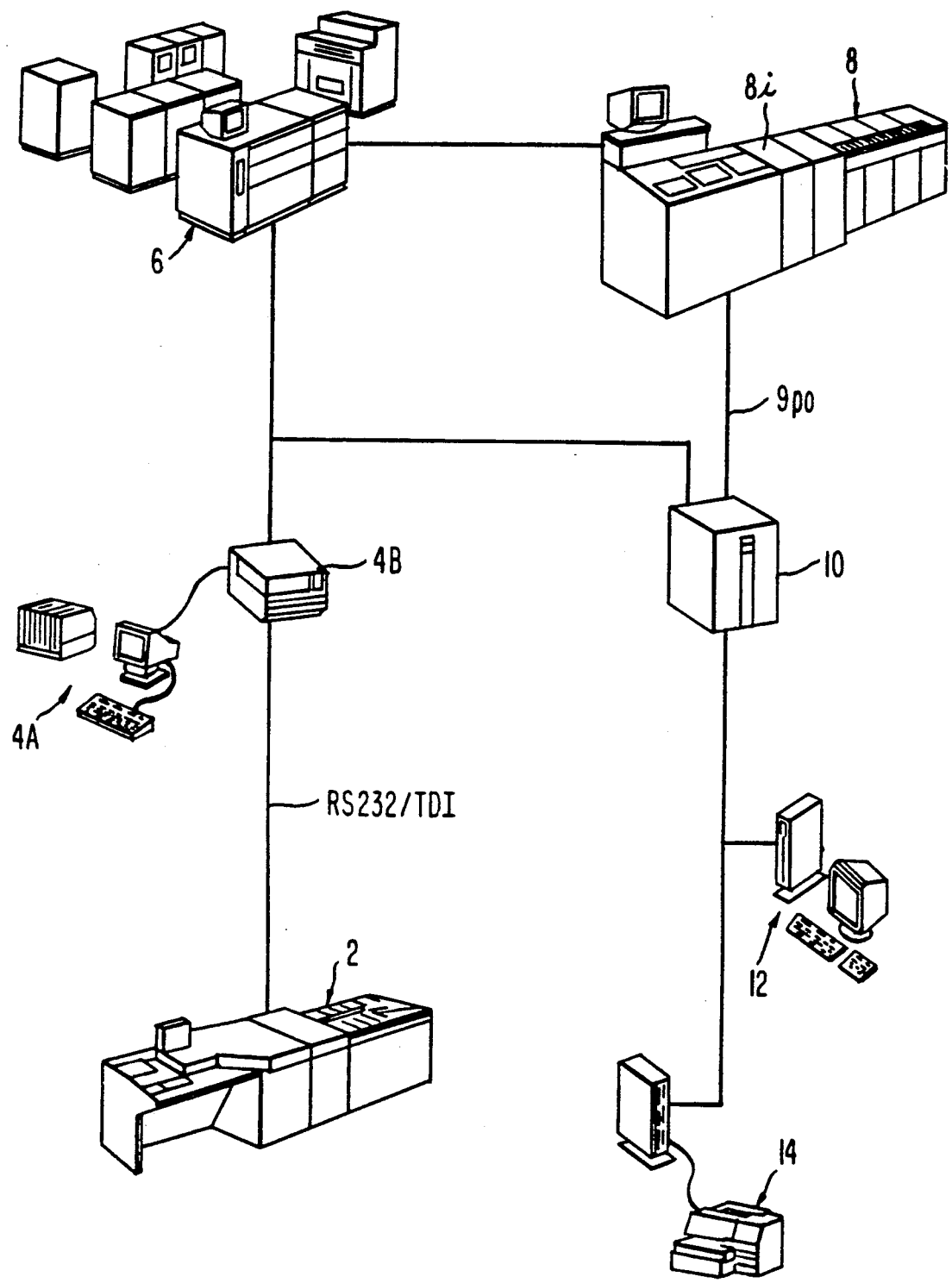
FIG. 1A is a schematic drawing of the overall hardware elements involved in the image and item processing system.

When the image data is fully buffered, the Storage Processor 10p board controls the writing of image data to disk storage and the building of files on the hard disks. The Unit Processor 10u reads image packets from the disks. It then buffers (via 10ub FIG. 4B) the image packets before sending them to the image or printing workstations 12 and 14 (FIG. 1A).

The central processor used within the Storage Processor 10p is the Intel 80386, Microprocessor which is a 132-pin device that fetches instructions and data from various resources such as the memory, the I/O controller and other modules connected to the printed circuit board interface.

Disk Controller Board and Disk Drives: The Disk Controller 10dc (FIG. 4A) is a Multibus II single-board computer that can handle as many as four disk drives such as 20, of FIG. 4A. The disk controller 10d buffers data and handles all disk control functions and errors. The disk controller 10dc board is made up of a processor, a memory system, and interface circuit groups.

The Disk Controller Board is based on the Intel 80186 Microprocessor which controls the disk drive hardware and manages the storage and retrieval of image packets to and from the magnetic disks. Since the Storage Processor 10p and the Unit Processor 10u both concurrently access the disk controller board 10dc, the disk controller 10dc coordinates disk accesses that read and write image packets to the disk drives. The 80186 Microprocessor provides the computing and I/O resources to control the disk drives.

The disk drives 20 of FIG. 4A provide high-capacity and high-performance storage for the image and item processing system. The SRM 10 provides disk space for "system" files, "structured" files and "sequential" files system services software which are described later herein. These storage services are provided to applications running on the host computer 6, the image (12) and printing (14) workstations, and the Imaging Module 8i.

The disk drives use a high-speed extension of the Storage Module Device (SMD) interface standards, and this interface is referred to as ESMD.

One disk controller 10dc can support from one to four disk drives and each disk drive is made up of two control boards, a sealed disk unit, and the power supply.

Each SRM 10 uses a minimum of two hard disk drives and can support as many as eight drives. The SRM cabinet can be expanded by adding an additional module in order to support more than four drives.

LAN Controller Printed Circuit Boards: A set of LAN controller boards provides communication between the SRM 10 and the host computer 6, plus additional storage and retrieval modules, and the image workstations 12 or printing workstations 14. The LAN Controllers (10c1, 10c2, 10c3), provide the physical interface to handle communication over the host-LAN Controller 10c1, over the SRM-LAN Controller 10c3 and the workstation-LAN Controllers 10c2.

The LAN Controller printed circuit boards are Intel iSBC 186/530 printed circuit board assemblies. The iSBC 186/530 printed circuit board assembly is designed to operate in and to support message-based, multiprocessor system architectures working in conjunction with the Multibus II parallel system bus.

The host-LAN Controller 10c1 with its connection to the communications processor 4B (FIG. 1A) allows the storage and retrieval module 10 to communicate with the host computer 6. The Unit Processor board 10u controls the communication activities to the host computer LAN.

The SRM-LAN Controller 10c3 allows the SRM to communicate with other SRM's such that these communications are controlled by the Unit Processor board 10u.

The LAN Controller 10c2 (FIG. 4A) enables the SRM 10 to communicate with the Image 12 and Printing 14 workstations. The Unit Processor 10u also controls communications to the LAN's of workstations.

Unit Processor Printed Circuit Board: The Unit Processor 10u controls communication by means of the LAN Controllers 10c. The Unit Processor performs buffering, state management, communications management and error handling functions. It uses specialized system software to initialize the hardware and the interconnects, to handle tests and error message, to allocate resources to applications programs, and to schedule various tasks to be accomplished. The Unit Processor 10u is an Intel 386/116 single-board computer and is located on the bus 10m of FIG. 4B.

Software Operations The software is installed at the host computer 6, and all code and date files are released on tape for loading into the host 6. The software downloads information to the SRM 10 from the host 6. Copies of the SRM 10 software operating systems reside on each SRM hard disk, enabling the SRM to boot the operating systems in the event of disk failure. Booting from the hard disks permits the SRM modules within the system to be initialized concurrently.

The SRM module 10 provides for the initialization of the Imaging Modules 8i, Image Workstations 12 and Printing Workstations 14 which are connected to it. It supports downloading of software from the host computer 6 for updates to itself, the Imaging Module 8i, and the Image Workstations 12 and Printing Workstations 14. Each SRM 10 has formatted disk drives and the system software for the SRM module 10, the Imaging Module 8i, and the Image Workstations 12 and Printing Workstations 14. The software operating within the SRM 10 resides in an Intel 80386 Microprocessor system environment. This includes Programmable Read-Only Memory (PROM) based firmware, which boots the full system software from the hard disk during booting.

The basic operating system in the SRM 10 is that of Intel's iRMXII which is a multi-tasking operating system that provides basic file management services such as the creation and maintenance of directories, file mapping and file integrity verification.

Software Architecture: The SRM module 10 uses a software set which consists of the Intel iRMX operating system and system services software. The iRMX operating system is loaded from the hard disks following the completion of the built-in self-test (BIST). There are four sets of system services which operate in the iRMX environment which include (i) the communication services; (ii) the file management services; (iii) unit management, and (iv) diagnostic services.

The SRM 10 stores and operates communication services and file-related service classes, the service classes being groups of related system service commands. The communication services reside in all the system modules of the image and item processing system in order to provide a common communication service set within the system. The "file-related" services reside only in the SRM 10.

Communication Services: These represent a basic and unified mechanism for message-based interprogram and intertask communication. These services are used to communicate among the various modules of the image and item processing system. These services can be used directly or as a base upon which more specialized mechanisms can be constructed. The communications services are installed in all of the modules of the image and item processing system.

File-Related Services: The SRM 10 runs a specialized set of file-related system services in order to manage the files stored in the hard disk drives. There are four classes of such file services:
 (a) file system,
 (b) common file,
 (c) sequential and system file,
 (d) structured file.

The file system services are used to manipulate and manage file systems. In this class, a file system is an information storage container where the contents and organization of the file are relevant. File system services are concerned with: (i) creating and deleting storage files, (ii) retrieving statistics and file attributes, (iii) allocating physical storage resources to files, (iv) storage subsystem management and administration.

The common file services are used to open and close files, rename and delete files, and modify file attributes. These services exercise the following capabilities:

(b1) a file association between the operator and a file;
(b2) deleting a file from a file system;
(b3) modifying attributes that are unique to each file, such as authorization;
(b4) changing the name of a file.

The sequential file services will access the contents of a stream or system file. Stream files contain codes and information required for printing. Sequential/system files consist of a sequence of bytes, typically no larger than 1 MB in length. Data transfer operations specify only the number of bytes to be transferred from the current position in the file.

The structured file services will access the contents of the system's structured file. A structured file is an information storage object consisting of a sequence of records. Each record is composed of an identical collection of fields. Individual fields may be of a fixed or a varying length and may include program-supplied data of arbitrary value, image files, or they may be empty.

Unit Management Services: These provide a means to manage the SRM by handling state control, statistics, error notification and error recovery.

Functional States: The SRM 10 communicates four functional states to other modules within the image and item processing system. These are:

(f1) the initializing state;
(f2) the off-line state;
(f3) the reserved state; and
(f4) the on-line state.

The on-line state (f4) is the normal operational state of the SRM 10. It supports the complete communication and file management capabilities of the Storage and Retrieval Module. The off-line state (f2) is that condition where the SRM 10 is capable of handling most of the external communication services requests, but it does not do file services required in the on-line state. In the reserved state (f3), the SRM 10 can support diagnostic-related functions where the SRM 10 can be logically disconnected from the other modules in the system for test purposes.

In the initializing state (f1), a sequence begins at power-on where all of the printed circuit boards in the SRM 10 will run built-in self-tests. Then extended built-in self-tests on these printed circuit boards are done, after which the Point-to-Point Optical Link Controller 10po, the Storage Processor 10p, and the Unit Processor 10u are used to boot the full operating system from disk. The sequence is completed by the Unit Processor 10u which completes the sequence by loading the LAN operating system from disk into the LAN Controller boards 10c.

Point-to-Point Optical Link Controller Board: As seen in FIG. 3A, the Point-to-Point Optical Link Controller 10pe provides the interface connections between the Imaging Module 8i and the Point-to-Point Optical Link Controller 10po in the SRM 10. As seen in FIG. 3A, there is one Point-to-Point Optical Link Controller in the Imaging Module 8i which connects to another duplicate Optical Link Controller 10po in the SRM 10. The Optical Link Controller handles communication over the POL, Point-to-Point Optical Link. It provides a fiber-optic communication interface, provides for buffering of data being transmitted and handles all communication errors between the optical link controllers.

Using an Intel 80286 Microprocessor, the Optical Link Controller handles duplex serial communication over a pair of serial fiber optic links at a rate of 20 MB per second.

FIG. 3B shows a block diagram of the Optical Link Controller which includes a control processor 30, an optical transmitter interface 40, an optical receiver interface 50, interconnect space circuitry 44, and the parallel system bus interface circuit 46 which connects to the parallel system bus 10m.

The Optical Link Control processor 30 of FIG. 3B manages all the protocol associated with transmitting and receiving data over the fiber optic link. The Intel 80286 Microprocessor has EPROM and dynamic RAM for storage of data and code. This control processor 30 also includes I/O circuitry, interrupt controllers, programmable timers, and serial communication controllers for system software and diagnostic support. In the preferred embodiment, the Optical Link Controller 10po provides 2 MB of dynamic RAM memory and 128K bytes of EPROM (Erasable Programmable Read Only Memory).

The interface circuit 46 of FIG. 3B is called the iPSB interface and is used to provide the logic needed to interface to the iPSB bus 10m. The parallel system bus (PSB) interface allows communication between the Optical Link Controller board and other controllers in the SRM 10. The interface circuit 46 is made up of three basic components: (46a) a message-passing coprocessor; (46b) an interconnect circuit; and (46c) the iPSB buffers.

The message-passing coprocessor 46a controls all of the references to the iPSB interface 46, the interconnect circuit space operations in 44, and the message-passing protocol for the memory and I/O circuitry. The message-passing coprocessor provides a data path between the local bus and the iPSB interface 46. It also supports the Multibus II message passing on the bus 10m. Message passing on the PSB bus 10m provides the direct transfer of data and command messages from one printed circuit board to another printed circuit board in a high-speed burst mode. Also, local bus communication is accelerated by the message-passing coprocessor. Additionally, the message-passing coprocessor provides for error detection and reporting, local bus handshake control and external address buffer control.

The interconnect circuit-portion (item 46b above) is shown in FIG. 3B as the interconnect space circuitry 44. This is a separate address space on the Multibus II, 10m, that allows for dynamic configuration of I/O in memory, remote diagnostic testing and reporting, and printed circuit board identification.

The iPSB dual-port buffers (of items 46c above) operate such that address information from the buffers and control information from the message-passing coprocessor are passed directly to the parallel system bus 10m.

Multibus II System Services: As seen in FIG. 4B, the Multibus II, 10m, is connected to all of the printed circuit board assemblies of the SRM 10. There is a control position in the middle of the Multibus 10m which is called "Slot 0". The printed circuit board assembly that resides in this Slot 0 is designed to hold a module called the Central Services Modules, and this position is used to identify each printed circuit board assembly on the Multibus 10m. Each printed circuit board assembly carries a unique signal indicating its assembly type and location.

The Point-to-Point Optical Link Controller 10po provides the central source for general purpose central bus functions which include system clock generation, system initialization, bus time-out detection and power fail handling, but this controller only provides these functions if it is located in Slot 0 of the parallel system bus backplane (located at 10m of FIG. 4B).

Optical Receiver Interface: The Optical Receiver Interface 50 of FIG. 3B, receives serial data from the Imaging Module 8i over the fiber optic link. The fiber optic receiver accepts the incoming optical signals and converts these into electrical signals which are then processed by a clock recovery circuit to generate a clock signal for the image data. The data is checked for framing to detect the start and stop of messages. All synchronization is removed from the signal to leave only the transmitted data.

Within the Optical Receiver Interface board 50 (FIG. 3B) there is control logic which decodes the received data and converts it to a parallel data stream. This data is stored in a FIFO (first-in first-out) buffer for later unloading by a direct memory access controller therein. Additionally, the Optical Receiver Interface 50 performs cyclic redundancy checks for messages to detect errors in transmission. The direct memory access controller has four channels and is configured to allow the reception of image data such that the Optical Receiver Interface 50 permits the reception of image packet data and control/status information.

Optical Transmitter Interface: The Optical Transmitter Interface 40 (FIG. 3B) of the Optical Link Controller 10po transmits serial data from the Imaging Module 8i over the fiber optic link where a fiber optic transmitter converts electrical signals to optical signals. The Optical Transmitter 40 receives parallel data from storage, serializes the data, encodes the data using Manchester encoding, and then transmits the serial data over the fiber optic link 9po (FIG. 3A). Internal control logic handles the encoding and transmission of data, which logic also generates a cyclical redundancy check to ensure that the transmitter data can be verified at the receipt point. Additionally, the logic frames the data being transmitted.

In the image item processing system of this disclosure, transmission of image data is accomplished with "packets". A packet is a block of data for transmission. Each packet holds compressed image data for one to 35 documents and has "header" information to correlate the image data to certain document information stored in the host computer 6. The image packets are buffered to allow for short-term variations in the transmission rate. The "image header" is part of the image packet containing information to correlate the image data to document information stored in the host computer 6 and to allow later retrieval of images. In this context the "image" is the digital representation of one side of a document, such as one side of a check or one side of a remittance slip.

Storage Processor Board and Processor Circuit: After receiving the image packets from the Imaging Module 8i, the Storage Processor board 10p executes file management functions by organizing and ordering the image packets into files. These functions are performed by the processor circuit 60 of FIG. 5A.

The processor circuit 60 provides central management to the activities of the Storage Processor 10p and to the entire SRM operation. The processor circuit 60 controls image and document data sent to the Storage Processor 10p from the Image Module 8i.

Figure 5A:
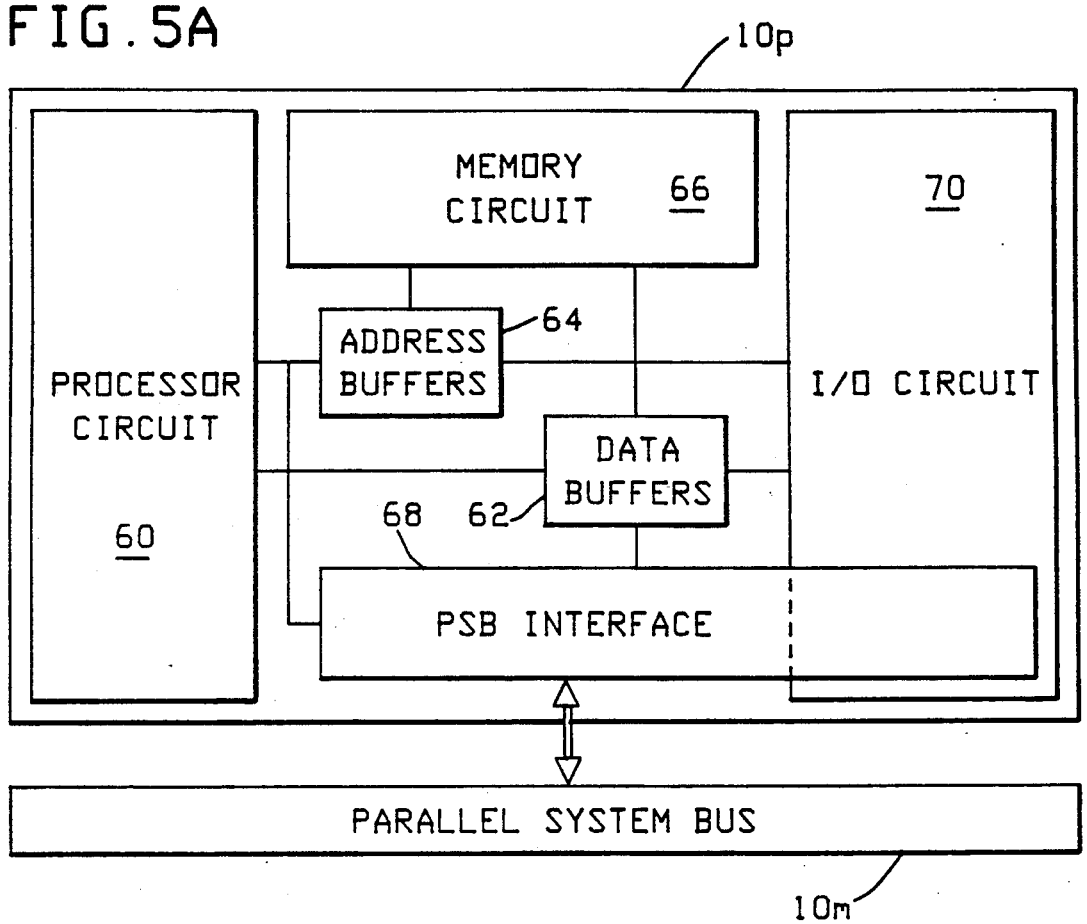
FIG. 5A is a block diagram of the storage processor board.
Figure 5B:
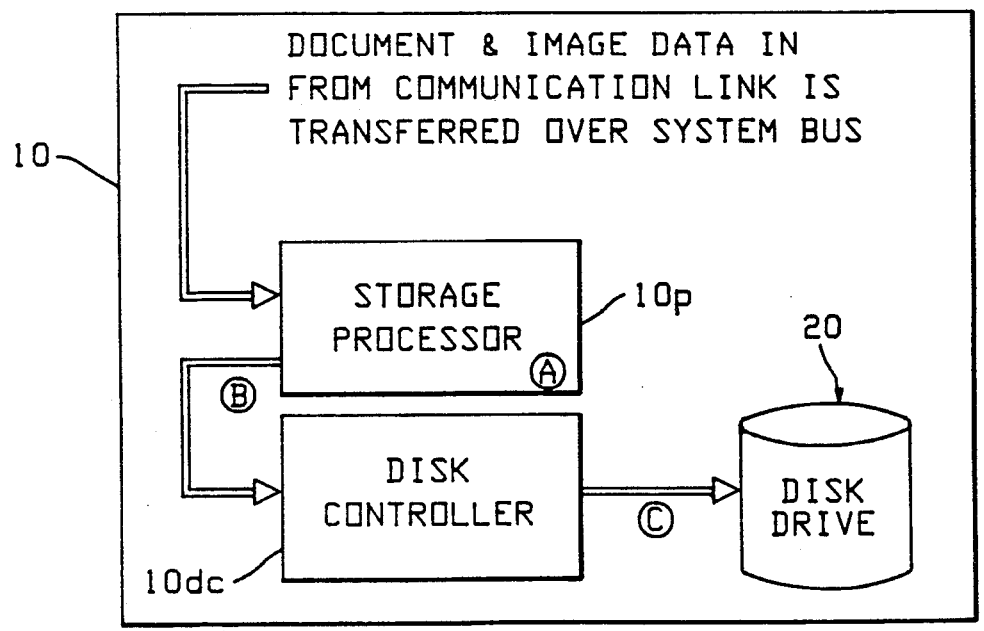
FIG. 5B is a diagram indicating data flow of document and image data.

FIG. 5B shows the disk management role of the Storage Processor circuit 60, where it organizes and orders the data into files and transfers these files for writing on the disk drives (20). The disk controller 10dc (FIG. 4A) recalls the files upon request of the Storage Processor 10p.

The processor circuit 60 of 10p controls the writing of image packets to disk storage and the subsequent building of files on disks by buffering the data, forming it into files and preparing it for storage on disk as seen at item A on FIG. 5B. The processor circuit 60 then manages the transfer of data to the disk controller 10dc as seen by the channel B in FIG. 5B. The disk controller board 10dc then transfers the files to the extended storage module disk drive 20 for storage as seen in channel C of FIG. 5B.

The processor circuit 60 consists of the Intel 80386 processor CPU and an advanced direct memory access controller (ADMA) and direct memory access (DMA) data buffers.

The Intel 80386 Microprocessor 60 (FIG. 5C) operates to fetch instruction data from various of the resources such as memory, I/O and boards connected to the parallel system bus interface 10m. The microprocessor has 4 gigabytes of address space in a 32-bit data path. The microprocessor also allows space for up to 256 different interrupt vectors.

The ADMA (61, FIG. 5C) for the direct memory access capability of the Storage Processor board 10p. It provides for independent direct memory access channels and can transfer data at rates up to 10.7 MB on an 8 MHz clock. It is capable of performing 32-bit, single-cycle data transfers to and from the parallel system bus interface to support message passing. The storage processor board also has two channels of advanced direct memory access configured to handle the message-passing coprocessor, 68p of FIG. 5C.

The ADMA controller 61, FIG. 5C, supports both synchronized and unsynchronized direct memory access operations with command and data chaining. The ADMA connects up to 16 MB of memory or I/O space regardless of which operating mode the 80386 Microprocessor is in. Direct memory access works by transferring data directly between memory and the I/O devices without involving the Microprocessor which results in higher speeds for data transfer operation.

The address buffers 64, FIG. 5C, are used to buffer addresses for use by the ADMA controller and the 80386 Microprocessor which both share the local bus.

FIG. 5C illustrates the basic components of the storage processor 10p in greater detail than that of FIG. 5A.

Referring to FIG. 5C, the processor circuit 60 is made up of a processor central processing unit (CPU) 60p, the advanced direct memory access controller 61, and the DMA address buffers 61b.

The memory circuit 66 has a tag memory 66t, a cache memory 66c, an erasable PROM 66m and a Dynamic RAM 66d.

The I/O circuit 70 is provided with a set of timers 70t, an interrupt control circuit 70i, and an IBX circuit 70x.

The iPSB (parallel system bus) 10m provides connection to a message passing coprocessor 68p, dual port buffers 68b, and a serial I/O microcontroller 68c.

The Dynamic RAM 66d of the memory circuit 66 is connected to a set of data buffers 66b and an address circuit 66x.

The address buffers 64 are connected to the memory units 66t, 66c, 66m, and the address circuit 66x. Additionally, the address buffers are connected to the CPU 60p and to the timers circuitry 70t.

The data buffers 62 are connected to the CPU 60p and also to the cache memory 66c, the dual port buffers 68b and the data buffers 66b.

The memory circuit 66 of the Storage Processor board 10p buffers incoming image packets received from the Imaging Module 8i in its memory circuit group. A memory circuit group 66 includes the tag 66t, the cache 66c, the Erasable PROM 66m, and the Dynamic RAM 66d.

The tag memory 66t optimizes the cache memory operations. Once the CPU 60p requests data, the data that is received is tagged with an address and stored in the cache memory 66c. After this all data requests are passed by the tag memory to see if the data is available in the cache memory 66c.

Data requested by the CPU 60p is kept in the cache memory 66c. When a specific piece of data is requested, the tag fields are read and if the address field matches, the request goes directly to the high-speed cache memory instead of the slower Dynamic RAM memory 66d, thus speeding data access.

The cache memory 66c allows zero weight-state read accesses to memory when the data requested is resident in the cache memory. The 64K byte Static RAM cache memory 66t has 16K, 4-byte entries. Each entry consists of a 32-bit data field. Each 32-bit word in the Dynamic RAM (DRAM) 66d maps to exactly one entry in the cache memory 66c. A tag field is used to determine which four bits of DRAM 66d currently reside in a cache entry. The combination of a direct-mapped cache array and tag fields insures data integrity and accurate identification of cache "hits". On a write cycle, data is written to both the cache memory and the DRAM memory array. Cache "misses" (involving memory reads not found in the cache) cause the data field of the cache entry corresponding to the addressed memory to be filled from the DRAM array 66d.

In FIG. 5C, there are two 32-bit EPROM site 66m which allow 256K bits of erasable memory which supplied for the Storage Processor 10p. These sites are reserved for EPROM and are used for the built-in self-test diagnostics (BIST) and the boot loader resident on the board assembly.

The DRAM 66d uses a daughterboard assembly to provide additional DRAM memory. This Storage Processor daughterboard provides an additional 12 MB of memory. DRAM provides byte parity for error detection since parity is used to check to see if data has been transmitted correctly. A non-maskable interrupt to the CPU microprocessor 60p is generated upon detection of a parity error Although the DRAM memory 66d is physically located on another board assembly, it is accessed by the Storage Processor assembly 10p as if it were located on the main storage Processor board 10p. The DRAM 66d is dual-ported to allow access from either the on-board processor 60p and the advanced direct memory access controller 61, or by other board assemblies connected to the iPSB interface circuit 68.

As seen in FIG. 5C, the I/O circuit group 70 includes timers and interrupt controllers used for general functions. A programmable interval timer (PIT) 70t includes three independent, programmable, 16-bit interval timers/counters. The input to all three timers is a 1.25 MHz clock signal. Outputs from these timers are routed to the inputs of the interrupt control 70i. Access to the PIT by the Microprocessor CPU 60p requires seven wait states.

The interrupt control circuit 70i involves Programmable Interrupt Controllers (PIC's) which are used in a master-slave configuration for processing on-board interrupts. These two programmable interrupt controller devices 70i provide 15 independent levels of interrupt priority.

The iSBX interface circuit 68 of FIG. 5C provides one 16-bit connector for further I/O expansion. The iSBX interface circuit 68 operates with seven wait states for the Microprocessor 60p. This interface is not used in normal operation, but is used during system debug.

The iPSB interface circuit 68 uses a message-passing coprocessor 68p which supports the Multibus II message passing. Message passing on the iPSB bus 10m provides direct transfer of data and command messages from one board to another board in a high-speed burst rate. The message passing coprocessor 68p accelerates local bus communication and allows the transfer of messages at a speed independent of the speed of individual processors or controllers. The message-passing coprocessor 68p provides a 32-bit data path between the local bus and the iPSB interface circuit 68. The coprocessor 68p also functions to provide interface arbitration and transfer control, error detection and reporting, local bus handshake control, external address control and interconnect operations (interconnect space).

On the Multibus II, 10m, there is provided an "interconnect space" which is a separate address space that allows dynamic configuration of the I/O circuitry and memory, remote diagnostic testing and reporting and printed circuit board identification. This interconnect space is controlled by an I/O microcontroller 68c. Most of these configurations options are communicated to the microcontroller 68c through interconnect space over the message-passing coprocessor 68p. The microcontroller 68c also performs initialization of the Storage Processor board, 10p.

In the iPSB interface circuit 68, there is a set of dual-port buffers 68b so that the iPSB interface can handle dual-port accesses to the on-board DRAM address space. This interface provides start and ending address decoding as well as all iPSB protocol control.

Disk Controller Board and Disk Drive: After the Storage Processor board 10p formats the image packet data and prepares the disk space, it transfers the data to the disk controller board 10dc (FIG. 4A).

In FIG. 4A, the disk controller 10dc connects to a cluster of disk drivers 20 on one end and connects to the Multibus II, 10m, on the other end. After the Storage Processor 10p formats the image packet data and prepares the disk space, it transfers the data to the disk controller 10dc. The disk controller receives the image packet and prepares it for transmittal to the storage processor-defined disk drive location. Data is then transferred from the disk controller 10dc to the disks 20. The image packet is stored on the disk until the SRM 10 receives a request to retrieve the selected image packet or group of packets. Image packets are then retrieved through a read and transfer of the packet data. The image data stored on disks cannot be altered and it remains in disk storage until the application program requests its deletion.

The image workstation 12 sends the Unit Processor 10u (FIG. 4A) a message that indicates the specific data to be retrieved. This request is transmitted to the workstation LAN controller board 10c1 in the SRM 10. The message is passed on to the Unit Processor board 10u which forwards the request to the Storage Processor board 10p. Storage Processor 10p receives the request and translates it into a command to locate the disk space in which the data resides. The Storage Processor 10p then sends the command back to the Unit Processor 10u. Because the Storage Processor 10p and the Unit Processor 10u use the same disk controller board 10dc, then disk accesses by the processor boards are coordinated by the Storage Processor 10p.

Disk Controller Board: The Disk Controller 10dc is a Multibus II, single-board computer that controls the disk drive hardware. It manages the storage and retrieval of data travelling to and from magnetic disk storage. The Disk Controller operates to buffer data, to coordinate disk control functions, and to handle disk errors. The Disk Controller 10dc is made up of a processor, a memory, a disk interface, and parallel system bus interface circuit groups.

The disk controller processor circuit in the controller 10dc functions to control the disk drives, to manage disk requests from the system, to manage caching functions and to control the interconnect space. The disk controller processor controls the disk drive hardware and manages the storage and retrieval of data to and from magnetic storage. Since the Storage Processor 10p and the Unit Processor 10u access the disk controller board 10dc concurrently, the processor circuit of the disk controller coordinates disk accesses that read and write image packet data to the disk. The Disk Controller processor also manages the caching functions, plus disk requests from the system, by using algorithms that optimize controller operations.

The disk controller processor in the Disk Controller 10dc is based on the Intel 80186 Microprocessor. This processor provides the computing and I/O resources to control the disk drives, plus the other functions of cache management, handling disk requests and executing the algorithms involved. The 80186 is a 16-bit processor with two independent channels of direct memory access, a programmable interrupt controller, three 16-bit timers, a programmable memory and peripheral chip-select logic of which the interconnections and circuitry blocks are shown in FIG. 6.

Figure 6:
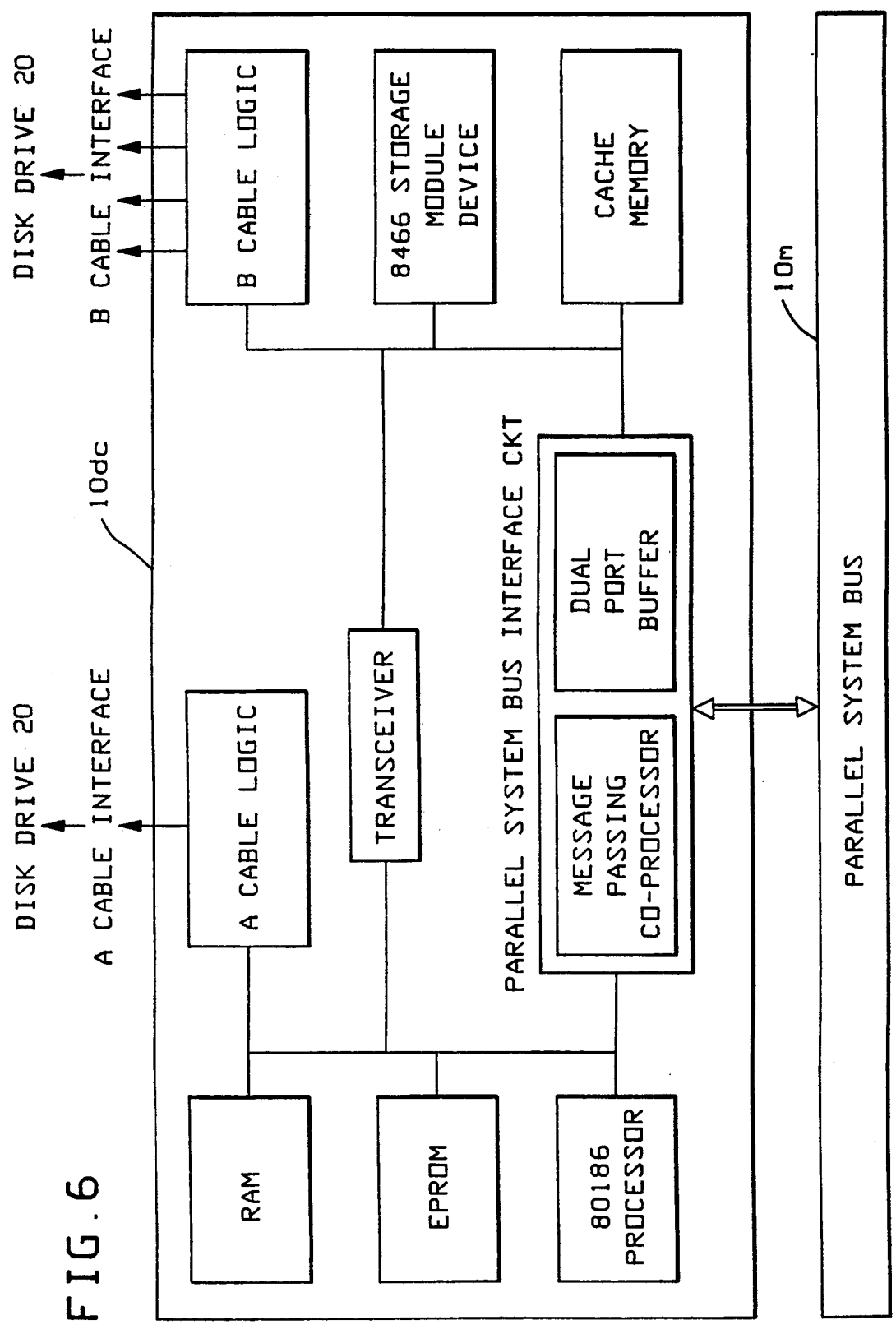
FIG. 6 is a block diagram of the disk controller board.

The two DMA direct memory access channels in the Intel 80186 processor are used to support message transfer between the local memory and the message-passing coprocessor of FIG. 6. Direct memory access operates to transfer data directly between the memory in FIG. 6 and the I/O devices without requiring interaction with the CPU of the processor 60p of FIG. 5C. The central processor is bypassed in the data transfer allowing high-speed data transfer operations.

In order to read from or to write to a memory chip, it is necessary to signal the device that is being addressed. This is done by the chip select logic which formulates the chip select signal which selects one memory chip among the various chips available. It is necessary to supply the address of the selected data within the memory. Chip select logic selects the controller chip and also selects the I/O on the disk controller board 10dc.

Memory Circuitry of Disk Controller 10dc: The memory circuit in FIG. 6 provides DRAM, EPROM and cache memory. The DRAM is used for data handling and buffering; the EPROM is used for firmware storage and the cache memory is used to speed memory access. There are 64K bytes of onboard DRAM for the 80186 Microprocessor code and data storage. The EPROM memory has 64K bytes used to store firmware for the disk controller board 10dc. The cache memory in FIG. 6 provides a buffer storage of 512K bytes. This allows multiple tracks of data to be placed in controller-resident memory. The caching enables data to be accessed in the memory much more rapidly.

Disk Interface Circuit: This provides a disk controller chip and buffers for the interface. It handles all the control status and data signals from the disk drive and provides the DMA channel to move data between the disk and the cache memory.

The Disk Controller 10dc has a parallel system bus interface circuit shown in FIG. 6 which provides communication between the disk controller board 10dc and other controllers in the SRM module 10. The disk controller board interfaces to the parallel system bus 10m through a message-passing coprocessor, interconnect space and buffers.

The message-passing coprocessor of FIG. 6 controls all references to the iPSB interface circuit, interconnect space operations and message-passing protocol for the memory and I/O circuits. The message-passing coprocessor of FIG. 6 supports the Multibus II 10m message passing. Message passing on parallel systems bus 10m provides the direct transfer of data and command messages from one board to another board in a high-speed burst rate. The message-passing coprocessor also enables disk data to be burst across the bus while consuming a minimal amount of bandwidth. Commands, status information, and data are exchanged between the controller and the host 6 using the message-passing coprocessor. The parallel system bus interface circuit has dual-port buffers. This enables the iPSB interface of FIG. 6 to handle dual-port accesses to the onboard DRAM address space providing start and end address decoding as well as protocol control.

Disk Drives: The disk drives 20 of FIG. 4A provide high-capacity, high-performance storage for the image and item processing system. Disk space is provided for operating system software, for system services software, for image workstation applications software, and image data packets, as will be shown in connection with FIG. 13. The disks may also be used for application software that runs on image workstations, printing workstations 14 and Imaging Module 8i.

The drives use a high-speed extension of the SMD (Storage Module Device) interface standards and this interface is referred to as ESMD. The ESMD hard disk drives are 8-inch, magnetic drives containing 14 platters. Each disk drive provides an unformatted capacity of 1,000.2 MB. Each disk drive is made up of two printed circuit boards, the sealed disk drive unit and power supplies. As seen in FIG. 6, signals are passed from the disk controller 10dc board to the main control board by way of the A and B cables. The disk controller board 10dc connects to the disk drive itself by means of A and B cables. The A cables interface carries disk control signals. The B cables interfaces carry data signals to and from disk drives. Disk cable A is an internal interconnection from the disk controller 10dc to as many as four disk drives. The A cable carries control signals while the B cables are point-to-point connections from the printed circuit board assembly to the drives. The cable A is daisy-chained between each of the four disk drive connectors.

The disk drives are mounted in drive modules within the Storage and Retrieval Module 10. The drive modules are in self-contained drawers wherein each drawer houses two disk drive assemblies and their power supplies. A control circuit board in the disk drives functions to provide interface control, drive status control, read/write control, head positioning servo control and disk rotational speed control.

Figure 7:
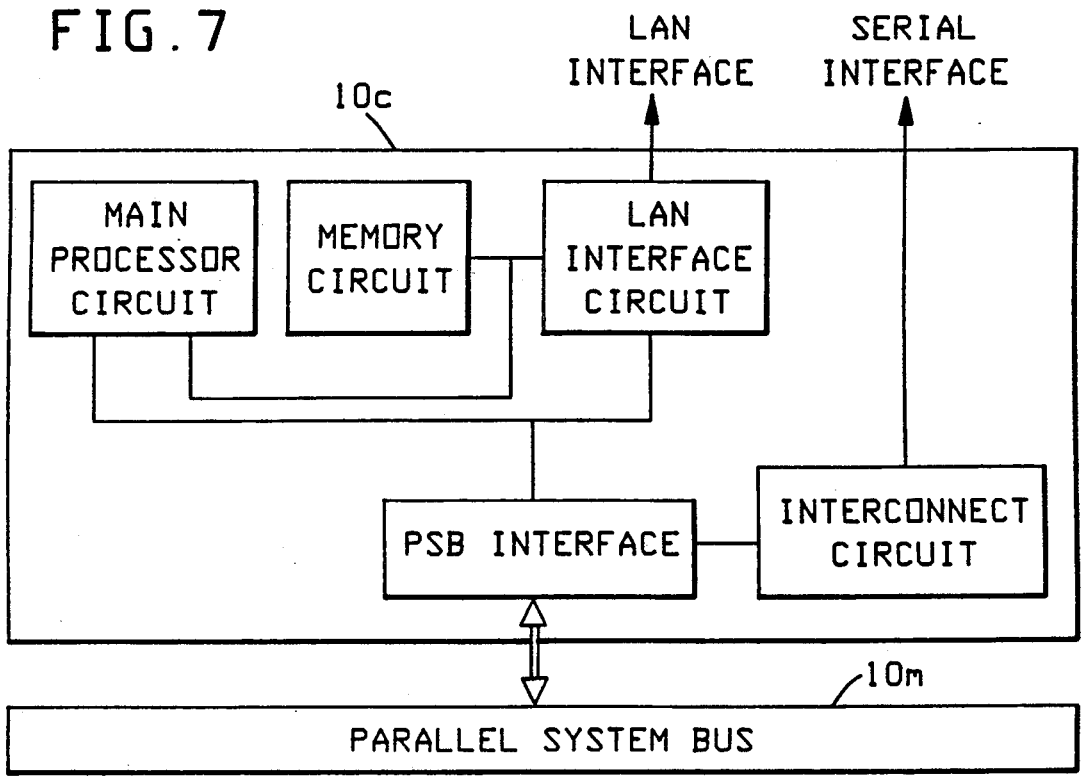
FIG. 7 is a block diagram of the LAN controller board.

Local Area Network Controller Board: FIG. 7 shows a block diagram of the LAN controller 10c. This board assembly involves Multibus II, single-board computers that handle communications over local area networks. The SRM 10 uses the LAN controller 10c to control and provide physical communication interfaces for the three separate controller shown in FIG. 4A which are the host-LAN controller 10c1, the image workstation-LAN controller 10c2 and the SRM module-LAN controller 10c3.

One host-LAN controller 10c1 is required in each SRM 10. A minimum of one and a maximum of four workstation-LAN controller boards, such as 10c2, can be installed in the SRM 10. Each one can communicate with one to eight image and printing workstations. The SRM-LAN controller board 10c3 is used in systems which require transfer of data between multiple SRM modules. Thus the SRM 10 contains a unique LAN controller for each local area network in the image and item processing system. The LAN control boards in the SRM 10 will have counterparts in the host computer 6, the workstations 12 and other storage and retrieval modules interconnected in the system.

The SRM 10 communicates with the host computer 6 using the host LAN controller board 10c1 which is connected to the unit processor 10u. The Unit Processor board 10u controls the host-LAN communication activities. The workstation LAN controller board 10c2 enables the SRM 10 to communicate with the image 12 and printing 14 workstations. Again, the Unit Processor 10u board controls the workstation LAN communication.

As seen in FIG. 7 which a block diagram of the LAN controller boards 10c. The processor circuit initiates and controls the con board operations. It includes an 80186 Microprocessor and support latches and transceivers, so that the controller can support the LAN functions required in message-based multiprocessor systems. The processor is a 16-bit, 8 MHz Intel 80186 Microprocessor with two direct memory access channels, three interval timers, a clock generator and a programmable interrupt controller.

In the LAN Controller of FIG. 7, the Microprocessor direct memory access channels support message transfer between local memory and the message-passing coprocessor, and the direct memory access channels are controlled by direct memory access requests sent by the message-passing coprocessor. The 80186 Microprocessor has two multiplexed address and data lines which are sent to sets of buffer and transceiver chips in the controller processor circuit. The demultiplexed output of these buffers and transceivers become the local memory bus. This connection to the bus is the link between the control processor circuit and other elements of the LAN controller board.

The LAN controller board 10c has one LAN communication channel. The device on the other end of the LAN cable is a LAN transceiver which uses the IEEE 802.3 interface which is implemented by a LAN coprocessor and a IEEE 802.3 serial interface device.

The IEEE 802.3 serial interface component performs Manchester encoding and decoding of the transmit and receive frames. It also provides the electrical interface to the IEEE 802.3 transceiver cable. Either the Intel 82501 Ethernet serial interface chip or the SEEQ 8023A Manchester code converter chip may be used to serve as the interface device. The serial interface also provides collision detection, receive clock recover, and data modulation functions. The LAN coprocessor manages all transactions over the LAN interface. The coprocessor is a highly integrated device which provides the framing, the link management, and network management functions required for Ethernet communications.

The LAN controller 10c of FIG. 7 has a memory circuit consisting of a large DRAM array and a set of ROM/EPROM memory facilities. The DRAM in the memory circuit of FIG. 7 has 512K bytes of memory capability. The RAM memory contains code and data. The EPROM involves devices from 8K bytes to 64K bytes per device and acts to receive address information directly from the local address bus and provide data to the local memory bus. The EPROM memory contains code and data.

The interconnect circuit block of FIG. 7 is basically an I/O subsystem which provides timers, interrupt controller, and an RS232C serial port for debugging and testing. The PSB interface in FIG. 7 is the parallel system bus interface circuit which gives the LAN controller 10c the capability for access to other boards on the bus 10m. The PSB interface circuit includes its main component which is a message-passing coprocessor chip. The message-passing coprocessing chip provides for full message, memory, I/O, and interconnect access to the parallel system bus 10m. The iPSB interface circuit of FIG. 7 provides logic needed to interface to the bus and includes the message-passing coprocessor, interconnect circuitry and iPSB buffers.

The message-passing coprocessor controls all accesses to the iPSB interface circuit, and controls interconnect, space operations, and message-passing protocol for the memory and I/O circuits. It provides a data path between the local bus and iPSB interface circuit. The coprocessor supports Multibus II message passing. This message passing provides the direct transfer of data and command messages from one printed board assembly to another in high-speed burst mode. The iPSB interface of FIG. 7 which also handles dual-port accesses to the onboard DRAM address space in the memory circuit. It provides start and end address decoding as well as iPSB protocol control.

Unit Processor Board: As seen in FIG. 4A, the Unit Processor board 10u is connected to the Multibus II, 10m. Now, with reference to FIG. 8, there is shown a block diagram of the Unit Processor 10u. The Unit Processor handles internal SRM module communication by coordinating the message passing and image retrieval within the SRM. When, for example, the image workstation 12 requests retrieval of image packets, the message-specifying-data-to-be-retrieved travels to the Unit Processor 10u. The Unit Processor then forwards the request to the Storage Processor board 10p. The Storage Processor Board translates the request into a command to locate the disk space in which the data resides. The retrieval of data continues when the Storage Processor 10p returns the command to the Unit Processor 10u. The Unit Processor 10u sends the retrieval commands to the disk controller board 10dc which then accesses the disk and retrieves the data. The data is retrieved from the disk and then sent back to the Unit Processor 10u via the disk controller 10dc.

The Unit Processor 10u transmits the data to the workstation LAN controller 10c and the workstation controller sends the image packet over the workstation LAN to the image workstation 12 or the printing workstation 14 for which the request was processed.

Figure 8:
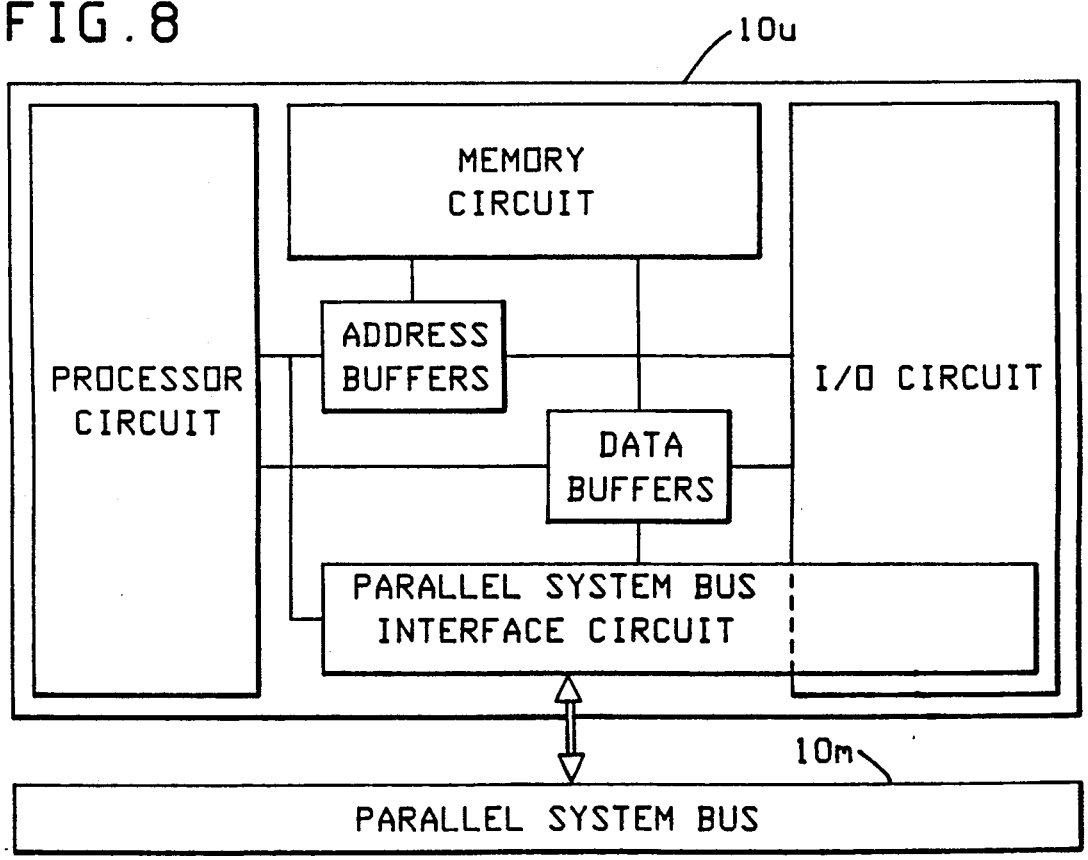
FIG. 8 is a block diagram of the Unit Processor Board.

As seen in FIG. 8, the Unit Processor 10u is a Multibus II, single-board computer that performs data buffering, communication management, state control and error handling for the SRM communications. As seen in FIG. 8, the Unit Processor board 10u includes the processor circuit, the memory circuit, the I/O circuit and the parallel system bus interface circuit in addition to address buffers and data buffers.

Functionally, the processor circuit of FIG. 8 provides central control for management of SRM communications, it monitors the activities of the LAN controllers on the parallel system bus 10m, and it receives communication messages from the LAN controllers. The processor circuit monitors communications and passes them on to the appropriate boards over the bus 10m in addition to managing the processor sending messages and data out of the SRM. The processor circuit uses an Intel 80386 processor (CPU), an advanced direct memory controller, and direct memory access data buffers. The 80386 Microprocessor (Intel) fetches instruction data from the various resources such as memory, I/O, and other boards on the bus interface. It operates with a 32 MHz clock that is divided by two in order to achieve the 16 MHz system clock rate. The Microprocessor provides 4 gigabytes of address space in a 32-bit data path.

The Advanced Direct Memory Access controller similar to element 61 of FIG. 5C in the processor circuit of FIG. 8 provides the direct memory access capability of the Unit Processor 10u. It has four independent, direct memory access channels and can transfer data at rates up to 10.7 MB per second on an 8-MHz clock. It can perform 32-bit, single-cycle data transfers to and from the iPSB interface to support message passing. The ADMA controller supports both synchronized and unsynchronized direct memory access operations with command and data chaining, and these features are programmable by use of the internal ADMA registers. The ADMA device can access up to 16 MB of memory or I/O space regardless of which operating mode the 80386 Microprocessor is in. The direct memory access works by transferring data directly between memory and I/O devices without involving the Microprocessor and thus allowing higher speed for data-transfer operations.

In FIG. 8, the memory circuit is used to buffer communication and transfer of image data from the disk drive. Images are retrieved and held in the buffer until a full image packet is accumulated. The image packet is then transferred out over the workstation- LAN 10c or the SRM-LAN controller 10c3. Included in the memory circuit group are a tag memory, a cache memory, EPROM memory and DRAM memory similar to the element 66 of FIG. 5C.

The tag memory optimizes the cache memory operations. Once the 80386 Microprocessor requests data, it is tagged with an address and stored in cache memory. Following this, all data requests are passed by the tag memory to see if the data is available in the cache memory. Data requested by the 80386 Microprocessor is kept in the cache memory and the next time that a specific piece of data is requested, the tag fields are read and the request goes directly to the cache memory instead of the larger memory. The 64K byte SRAM cache memory has capacity of 16K, with 4-byte entries. Each entry consists of a 32-bit data field and each 32-bit word in the DRAM array maps to exactly one entry in the cache memory. A tag field is used to determine which four bytes of DRAM currently reside in a cache entry. The combination of a direct-mapped cache array and tag field ensures data integrity and accurate identification of cache "hits". On a write cycle, data is written to both the cache and to the DRAM array. When cache "misses" occur, this causes the data field of the cache entry (corresponding to the address memory) to be filled from the DRAM array.

The DRAM memory in the memory circuit of the Unit Processor 10u uses a daughterboard to provide additional room for DRAM. The daughterboard provides an additional 4 MB of memory. The DRAM is dual-ported in order to allow access from either the onboard processor and the Advanced Direct Memory Access or by other boards on the parallel bus interface. The data buffers shown in FIG. 8 accept data and hold it until it is released to the disk controller board 10dc. The Unit Processor board 10u can buffer image packets up to one-half cylinder or 400K bytes in size.

The I/O circuit of FIG. 8 conveys data to the Disk Controller 10dc. This circuit also supports the operating system by scheduling the operation of software processes such as memory management and interrupt procedures. Included in the I/O circuit of FIG. 8 are timers and interrupt controllers needed to coordinate message-passing and data-transfer activities.

In FIG. 8, the parallel system bus interface circuit provides the logic needed to interface to the parallel system bus 10m. The interface subsystem is made up of a message-passing coprocessor, an interconnect circuit, a dual-port controller and a set of buffers as indicated in FIG. 5C. The message-passing coprocessor in the interface circuit of FIG. 8 also supports the Multibus II address spaces by initiating message passing. Message passing on the bus 10m provides the direct transfer of data and command messages from one board assembly to another. The message-passing coprocessor provides a 32-bit data path between the local bus and the iPSB interface. It also provides for interface arbitration, transfer control, error detection reporting, local bus handshake control, external address buffer control and interconnect operations.

Figure 10:
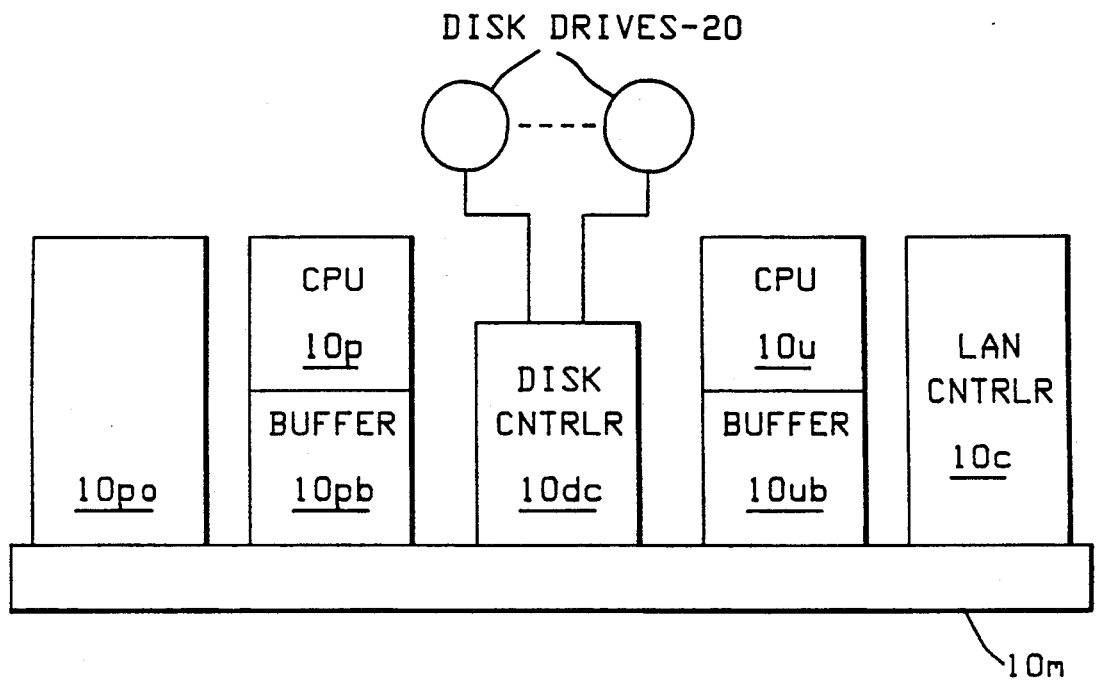
FIG. 10 is a simplified block diagram of the Storage/Retrieval Module.

Referring to FIG. 10, there is seen a schematic drawing of the Storage and Retrieval Module system with all its PC boards interconnected to the Multibus II system 10m. There are basically two operating CPU's which can operate "concurrently" to provide storage and retrieval services.

The Storage Processor 10p operates in order to provide for the storage of data on the disk drives 20. When the flow of captured image data from the image module 8i provides a bit stream of 2 MB per second, this is received by the point-to-point optical link controller, 10po and is conveyed for handling to the Storage Processor 10p which processes it for conveyance to the disk controller 10dc where it can then be stored on the disk drive 20.

Simultaneous and concurrent retrieval operations for transmitting images to the workstations can be effectuated by use of the second processor CPU 10u, called the Unit Processor 10u. The Unit Processor 10u communicates via the Multibus II with the Disk Controller 10dc in order to retrieve data from the disk drive 20 where data can then be conveyed to the Ethernet and LAN controllers 10c which can convey them to the requesting workstations.

From the viewpoint of the entire financial image system, the SRM 10 is a buffer between the image capture module (ICM, 8i) and the workstations 12 which are used to view the images generated by the ICM.

The SRM 10 will accept document packets from the ICM 8i and can temporarily save them in its buffer memory or on its disk drive 20 and subsequently can send these document packets on to workstations 12. FIG. 10 illustrates the simplified version of the SRM 10 and how the flow of image data can occur from the ICM 8i to storage on the disk drives and also for retrieval from the disk drives to the workstations 12.

The data, which may reach 2 MB per second, arrives from the ICM 8i into the point-to-point optical link controller as a document packet. The document data is moved from the point-to-point optical link controller to the buffer in the Storage Processor 10p of FIG. 10. Then when enough data is accumulated to fill a disk cylinder, the data is moved to the disk controller 10dc and written onto a disk 20.

The basic unit of storage in the SRM 10 is a "Record", as viewed from the application services. For the image processing applications, the usage is such that a "block" of Records (up to 3,000 Records) may be grouped into a file for subsequent balancing purposes. The SRM 10 can file approximately 2.5 images per disk track, which is approximately 65 images per cylinder. Buffer memory is provided to buffer a complete cylinder amount of data, and then execute a full cylinder "write" to disk. Normally, an entire block of image data would take up more disk space than one cylinder. Image data on disk is accessed by reading the "header information" (in its standard format), wherein the header contains all the detailed information about the particular image such as its length, its pixel data, its compression condition and any algorithms used with it. The header information will then permit the system to find the relevant addresses for separating the image data field from the entire Record.

It might be indicated that each check document has a "code file" reference which is encoded in magnetic ink at the bottom area of each check. Additionally, when documents are placed in a sorter such as document sorter 8, they are given a block number identification and additionally are given a sequence number according to their sequential position in that block of documents. The information regarding the code file, the block identification, the sequence number and also the monetary amount of a given check or document, are all types of information which are passed between the host computer 6 and the image workstations 12 by means of application programs and are not passed to the storage/retrieval module 10 from the document sorter 8 via the point-to-point optical link 9po.

When some number of images are required by a workstation 12, the appropriate data is read from a disk 20 into the disk controller 10dc and moved to the buffer on a second CPU designated the Unit Processor 10u. Then at the appropriate time, the image and any associated data is moved from the second CPU of the Unit Processor to an Ethernet controller 10c for transmission to the requesting workstation 12.

In order to manage and control all the disk activity, the first CPU (the Storage Processor 10p) uses the disk storage controller 10dc, and this manages all of the disk Read/Write operations. The second CPU (Unit Processor 10u) uses the Lan-workstation controller 10c and this manages all the data transfers to and from the workstations, 12.

In order for the first CPU (Storage Processor 10p) to perform its own disk data transfer operations, there is used a File Management System (FMS) which resides on the Storage Processor Board 10p. Additionally, the FMS has a Remote Module (RM) executing on the second CPU (Unit Processor 10u). When a system or application module requires a disk operation, it calls one of the interface routines in the Remote Module (RM) of the FMS. This RM communicates with the main FMS module on the first CPU board (Storage Processor 10p) and then performs its own disk transfer. Using this operation, it is possible not to overburden the bandwidth of the first CPU (Storage Processor 10p) by requiring all disk data to pass through it. The control commands used in the FMS have an insignificant effect on the overall transfer rate since the number of commands for each image is very small compared to the number of 32-byte data messages required to transfer a 20K byte image.

File Management System (FMS): The FMS includes a complete set of procedures through which all the application programs can create, read, write, and otherwise manipulate disk files. The FMS is the interface through which all application programs access the disk storage modules which are connected to the Storage/Retrieval Module (SRM) 10. The FMS is constructed above the Intel standard RMX Nucleus and Basic I/O System (BIOS). The RMX Nucleus and modules involve the software and firmware used for Intel processors and are available as a commercial item. Whenever possible, the functionality of the RMX modules are used to directly implement functions in the FMS.

Figure 11:
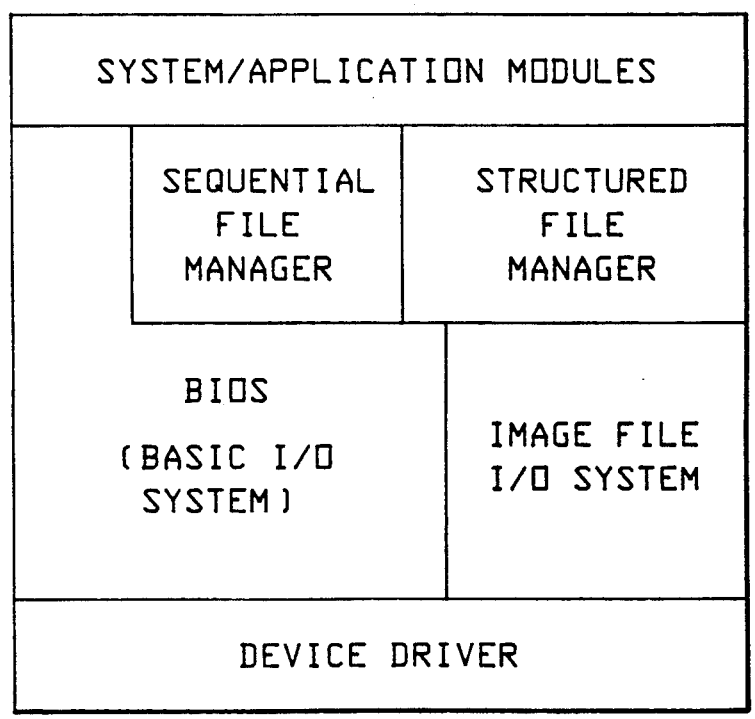
FIG. 11 is a drawing of related parts of the File Management System modules.

As seen in FIG. 11, the FMS is organized to have a Sequential File Manager (QFM) and a Structured File Manager (SFM), and, as seen in FIG. 11, contains the following major modules:

(a) Sequential File Manager (QFM);
(b) Structured File Manager (SFM);
(c) Image File I/O System (IFIOS)
(d) Basic I/O System (BIOS);
(e) Device Driver (DD).

File Systems: The disk storage space connected in an SRM 10 is partitioned into a certain number of areas, each of which area is called a "File System". Each File System encompasses one or more disk drives. Each file maintained by the FMS is contained within exactly one File System.

Each File System is denoted by a File System Name and can contain an arbitrary number of Sequential Files and an arbitrary number of Structured File Sets. Each of the Structured File Sets can contain the standard RMX Data Files, Image Data Files, and Index Files.

The storage and retrieval module SRM 10 may be considered as a multi-bus tube design. The dual processor architecture basically provides a data management system for handling image data packets.

The software operating system is a system designated RMX by Intel Corp. of Santa Clara, California. It involves the Intel network architecture software which does networking at a base level and which is used to drive the modules in the Storage/Retrieval Module 10. This software initializes itself in an efficient manner and can talk to the host computer 6. It also provides services to the other storage and retrieval modules so that it is possible to provide image data management.

As was previously discussed in connection with FIG. 10, the RMX software provides the features of allowing reads and writes simultaneously plus simultaneous storage, and high-speed image storage of images from the sorter plus high-speed retrieval of these images making use of the two processors, that is the Storage Processor 10po and the Unit Processor 10u.

The image data comes from the Image Module 8i of the document sorter 8 and winds up on the high-speed disks in order to provide a data base. The RMX software controls all of the retrieval of images from the disks. Coordination is effectuated by the use of the Point-to-Point Optical Link Controller 10po which can talk to the Image Module 8i and provide control signals between the SRM 10 and the Image Module 8i. The point-to-point optical link controller can be considered as a high-speed multi-bus tube having a fiber optic base which provides a multi-bus optical tube connection between the image capture module 8i of the document sorter 8 and the storage and retrieval module 10. The data transmission over this point-to-point optical link is on the order of 2½ megabytes per second.

The parallel processing arrangement between the two CPU's, that is the Storage Processor 10p and the Unit Processor 10u, provides a parallel processing function where one CPU is dedicated to handling the storage of image and item data while the other CPU is dedicated to handling the retrieval. The Multibus II, 10m, allows parallel transmission and can support up to 30 megabytes of data per second, thus permitting the first and second CPU to operate in a simultaneous fashion for both storage and retrieval.

The file system functionality is highly organized toward image data management. Thus the type of documents used in this system, such as checks, will have images of the front side and also the back side. The file system lends itself to any application software writer so that when a file is created, it can identify images so that it is possible to see the fronts of the checks, if desired, and also to see the backs of the checks, if desired. Additionally, it lends itself to seeing both fronts and backs with the MICR data, or without it, so there is considerable flexibility in structuring. The file system constitutes a platform which supports a wide window of applications.

One efficacious feature of the financial imaging system used with the storage and retrieval module is that the system is highly distributed. Various functions are handled and provided through individual modules such that not many applications need to interrupt the mainframe, thus speeding the operations of the system.

The file management system has the unique feature in that it logically organizes images and documents via high level service applications that allow for optimal processing where speed is a major factor. Thus, as previously mentioned, there are separate files for the front of checks and separate files for the back of checks and separate files for the MICR information, and so on. This allows operators to access all of this information, or only such selected information as is required at any given time.

Thus this system provides means for application programs to store and subsequently retrieve images. The stored images are organized in terms of named, ordered aggregations, or sequences, of images. Also, individual stored images are identifiable by specification of the name of the sequence within which an image is resident, or by system-supplied identifiers, record numbers and/or application-supplied "key values". Thus, to any sequence of stored images, an application program would be able to: create and designate the name of the sequence; designate or ascertain the locale within the system where the sequence is to be stored; copy images from one sequence to another; determine the number-identities and storage size of images stored within a sequence; append images to the end of a sequence, specify identifying key values; retrieve images from a sequence in order of storage (randomly or in key order); delete sequences no longer needed; obtain exclusive access to a sequence.

The storage and retrieval subsystem can include one or more Storage/Retrieval Modules 10. The SRM collects the compressed image data from the imaging module 8i and temporarily stores it on high speed magnetic disks 20. Once the data is stored, then the image work station operators and printer work stations can retrieve this data from the SRM 10. In general, the SRM performs the following functions:

(a) receives and stores images from an imaging module 8i;
(b) transfers images to image work stations 12;
(c) transfers images to print work stations 14;
(d) transfers images to and communicates with other SRM modules;
(e) sends copies of document identification data to the host 6;
(f) provides image and system file management services to other modules in this system.

Each SRM 10 provides from 2.4 to 9.6 gigabytes of storage capacity. In operation, any image work station operator can retrieve image data from any one of the storage/retrieval modules in the system. Each SRM is capable of storing as many as 60 images per second (or 30 front images and 30 back images) and retrieving them at a rate of 22 images per second. This is considered more than adequate to keep up with requests of operators working at the image work stations 12.

As seen in FIG. 9A, a variety of system software modules are provided within the Storage/Retrieval Module 10. These have been designated with various block numbers for differentiation. The Initialization Services 150 causes the hardware and software environment to be configured in the manner that permits the storage and retrieval module operating system to be loaded from disks and started. A Disk Initialization Service provides the capability to selectively initialize portions of the SRM disks 20. A System Loader resides in EPROM within the SRM 10 and provides functions to load the SRM-operating system code files from the SRM disk or via a IEEE 802.3 communications link. In FIG. 9A, the SRM Communications Handler 105 supports the processing of a restricted set of system service messages. It transmits only those messages that support the initialization or diagnosis of the SRM 10. It also controls the segmentation of system messages so that outbound messages are divided into segment packets that are consistent with requirements of the Interface Driver. Inbound message packets received from the Interface Driver are assembled or concatenated into messages. The SRM Communications handler 105 finally processes all SRM, messages communicated to or from the host 6. The host IEEE 802.3 driver (item 131) provides the device level control of the communications link. The host Initialization Service 132 establishes the communications link between the storage/retrieval module 10 and the host 6.

The following software functions are included in the Storage/Retrieval module on the disk-based operating system. Once the SRM operating system commences, it initializes the local environment to support the execution of multiple processes. The SRM Communications Handler 105 (FIG. 9A) performs the routing of system service requests and responses within the Storage/Retrieval Module 10. The Image Command Services 106, in FIG. 9A, provides access to disk storage and retrieval functions. These functions are supported by the System Disk Handlers and the ESMD Driver. An Exception Services module 152 performs all status and statistics data collection and recording functions. This data is retained in both RAM memory and on disk and is periodically transmitted to other units within the overall system. Transfer of this data occurs after receipt of systems service requests which are initiated by other units.

Communications with other Storage/Retrieval Modules in the system are handled by the SRM-SRM Services module 140. This module supports communications to the other storage and retrieval modules within this same cluster by means of the IEEE 802.3 local area network. The Image Command Services 106 handles all disk-related processes, including image and standard system file management and local disk directory management. The Workstation Services 116 modules handle communications to and from the Storage and Retrieval Module to both the image workstations 12 and the image printers 14. These functions include providing direct control over Ethernet lines, IEEE 802.3) to which the workstations are connected, plus initial processing of systems service requests from the workstations and the routing of messages to workstation destinations.

The image capture module software of ICM services 104 consists of an ICM Message Server 103b, an Image Data Packet Queuing Manager 103a, and point-to-point optical link driver 102, which provide the functionality for the Storage/Retrieval Module 10 to communicate with the image capture module 8i (Item 101 in FIG. 9A). A Local Logs module keeps track of the logs defined by the system and is responsible for collection and reporting of the data requested by the applications and the system.

The point-to-point optical link (POL) controller synchronous interface, 10po, as seen in FIGS. 4A and 4B operates at a data rate of 20 megabits per second and is used to communicate to the associated image capture module ICM 8i. Additionally, the POL is also used for communication between various clusters of Storage Modules 10. An IEEE 802.3 local area network controller 10c3, FIG. 4A (LAN) supports communications to the other SRMs within a cluster. A similar local area network supports communications with the workstations 12, and a separate local area network controller supports communications with the host 6.

A more detailed discussion and examples of usage regarding FIG. 9A is presented hereinafter, after a discussion of the various filing structures used in storage of and retrieval of data packets.

The Storage/Retrieval Module 10 involves files and file systems including certain types of file structures and classes of systems services that manipulate the files and the file systems. The classes involved are: (i) file system services; (ii) common file services; (iii) sequential file services; (iv) structured file services.

The "File Systems services" are used to manipulate and manage file systems. A file is an information storage container used such that the contents and organization of the file are not particularly relevant. The "File Systems services" are concerned with problems such as creating and deleting storage systems, systems retrieval of statistics and file attributes, allocation of physical storage resources to files, and storage system management and administration.

The Common File services are used to open and close files, to rename and delete files and to modify file attributes.

The "Sequential" and "Structured File" services involve two different methods of accessing the contents of files such that each presents a different view of how the contents of a file are organized.

The actual physical storage resources are divided into "file systems". Each file system uniquely controls the storage space allocated to it and storage space is not shared among file systems.

Figure 13:
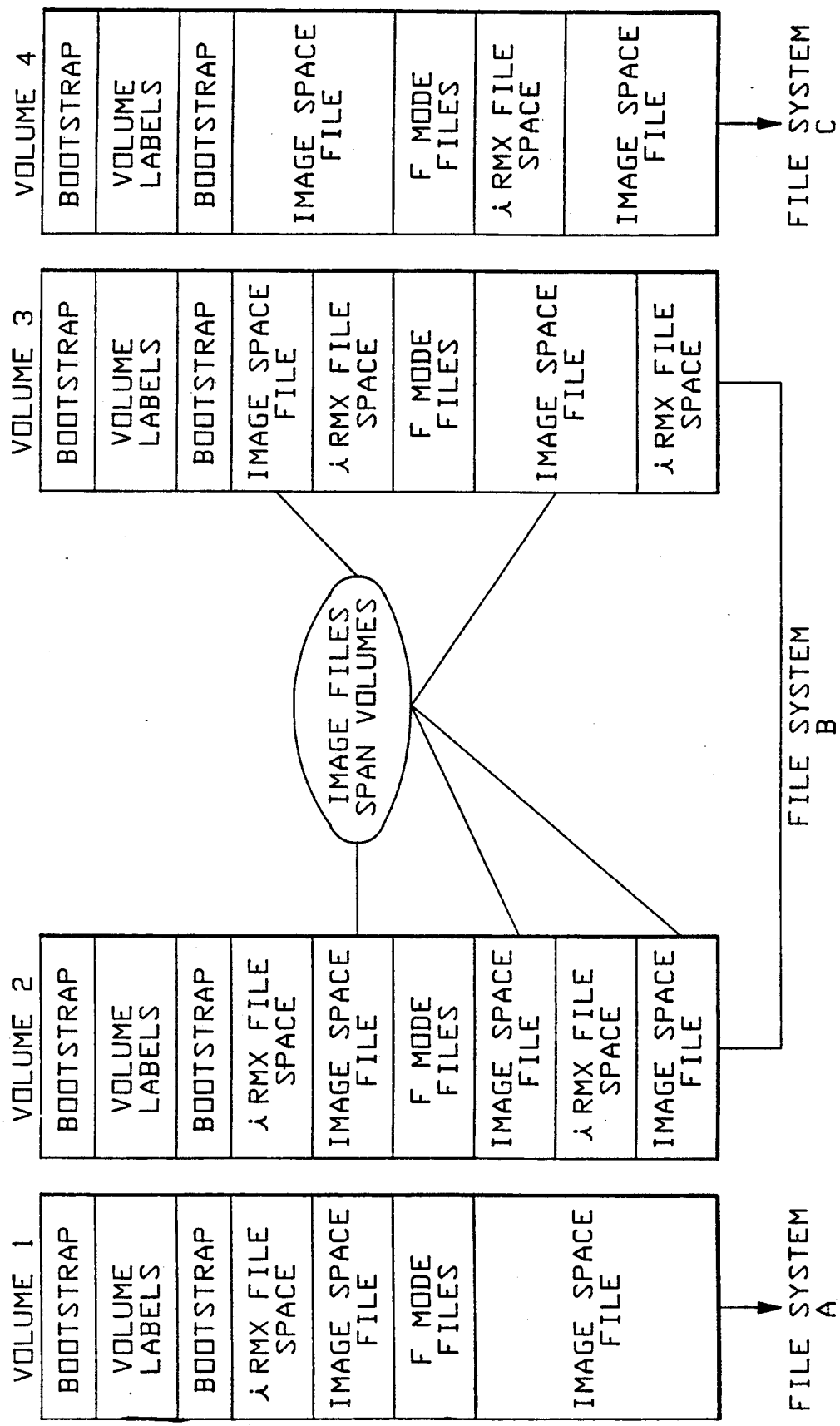
FIG. 13 is a schematic drawing of the volume structure used by the Storage Retrieval Module on disk space.

A "file system" is composed of one or more "volumes" (FIG. 13). A volume is a quantity of storage space that is available for allocation to individual files and "file systems" may contain from one to eight volumes.

A file system is a "named object" in the system directory and a "file name" identifies a particular file within a file system, but it is not an object in the system directory. The file systems possess properties which are maintained in the System Directory. The System Directory services retrieve and maintain file system entries in the System Directory.

File Types: There are two basic types of files in this system environment and these are (i) sequential files and (ii) structured files.

(i) A "sequential file" is an information storage object consisting of a sequence of bytes but typically no larger than one megabyte in length. Data transfer operations specify only the number of bytes to be transferred to or from the current position in the file. The current position is marked by a zero-based file pointer. The file pointer is positioned within the file by performing seek operations.

(ii) A "structured file" is an information storage object consisting of a sequence of records. Each record is composed of an identical collection of fields. Individual fields may be of a fixed or varying length. They may include images or program-supplied data of arbitrary value or they may be empty.

A "record" must have one key field. The key field houses a supplemental data structure called an "index".

The "index" is used to identify a particular record within a structured file. Indexes are maintained by this system in an index file. The "index file" is set up by the file management system when the structured file is created. The system software maintains an index file based on information supplied by the application through File System and Structured File services.

From an applications viewpoint, a structured file appears in terms of record, field, and index structures. This logical view is mapped, under application control, into one or more physical data files. The physical data file, defined by File System services, provides the actual storage resources for a structured file, and is accessed by the system in response to retrieval requests. Each physical data file is defined so as to house one or more structured file fields. Record fields may be replicated among multiple physical data files in order to enhance performance or to improve availability during retrieval operations.

Structured File services are used in conjunction with an "association" established between an application program and a structured file. The association is established when a structured file is opened. It is terminated when the structured file is closed. The association provides a framework for managing services performed on a structured file. It is also a repository for information such as the next occurrence of a record to be "read from" or "written to". Each association exists between exactly one program and exactly one structured file and is independent of all other associations.

Data retrieval of a structured file is performed in a defined retrieval sequence or it can be done randomly. A retrieval sequence is a subset of the records within a structured file. It may be either a range of key values or an orderly sequence of random key values. After a retrieval sequence has been specified for an association, services can be invoked to retrieve the individual records and the fields that make up the sequence.

To retrieve an image, the storage/retrieval module needs the following information: (a) the file system name; (b) the file name; (c) the retrieval index (RIX); (d) the appropriate authorization.

The file system name is the name of the file system that the particular file is located in. This is a disk organization parameter configured into the system. The file name is the name of the file the image or images are stored into. This is the "structured file" type. There can be many files defined or created within a file system. The retrieval index (RIX) is the identifier of the specific record within a file, and is used for retrieval purposes. This is sometimes referred to as the record "key". The financial information system (FIS) "system directory", which resides in the host 6, is configured with several authorizations, some of which define and specify which users or programs can access images. This information is loaded into a storage/retrieval module for verification when needed. Generally, the information required for retrieval would follow sequences such as: FILE SYSTEM; FILE NAME; RIX; PROGRAM NAME.

The application program will provide images to a workstation operator so that the operator may check balances and prove out various information and sums. There are various layers of software interfaces which provide the functions to actually get an image for a workstation.

File System Services: These services manage and maintain the resources of file systems and include such services as: create file system, delete file system, get attributes file system, get statistics file system, search file system, set attributes file system, synchronize file system.

An "attribute" is a characteristic about a file system that can be selectively retrieved and modified. File system attributes provide information about the operational state of a file system.

File system attributes include such characteristics as: change authorization, delete authorization, image space available, space available, space in use, and other useful types of attributes.

Common File Services: The common file services provide a group of tools that manipulate both sequential files and structured files. These services provide the capability for creating a "file association" between the user and a file, and for modifying attributes that are unique to each file, and deleting a file from a file system, and for changing the name of a file. These types of common file services includes: close file, delete file, open file, rename file, set attributes file, verify file integrity.

The file attributes make information about the files selectively available within a file system. Commonly used file attributes are such items as: access time, file type, last record, owner's name, space allocated, space available, and a number of other types of attributes.

Sequential File Services: These sequential file services manipulate and provide access to sequential files to provide for such items as: create sequential file, get statistics sequential file, read sequential file, seek sequential file, write sequential file.

Structured File Services: The structured file services manipulate and provide access to the structured files. These services include: copy structured file records, create structured file, delete from structured file, find structured file, get statistics structured file, read next structured file, select structured file, write structured file, and a number of other useful services.

The present system uses the structured file services which provide the flexibility often associated with data base management systems. A salient feature is the ability to maintain a relatively abstract and simple-to-use view of data, despite a complex mapping onto physical storage resources.

Structured file services do not incur the same level of complexity associated with fully developed data management systems. The structured files are "write-once" if they contain variable-length records. These records are appended to a structured file, but once written, a record cannot be updated. The intent is to provide an information storage facility both reasonably simple and yet adaptable to meet varying application and physical storage environment needs.

In a logical view of a structured file, it may be considered an information storage "object" that consists of a sequence of records. Each record is composed of an identical collection of fields. Individual fields may be of a fixed or varying length and may contain programmatically supplied information of arbitrary value, or they may contain an image or they may be empty.

In those fields containing program-supplied data, one "key" field is required. Each key, which consists of all the data within a field, gives rise to a supplemental structure called an "index". The existence of an index for a key allows searches for records with particular key values to be performed in an optimized fashion. Indexes are automatically maintained by the system in an index file. The index file is created by the file management system when the structured file is created.

In regard to applications using structured files, a structured file appears in terms of records, fields, and indexes. This logical view is mapped, under application control, onto one or more physical data files. The physical data files, which are defined by file services, are used to provide the actual storage resources for a structured file. Each physical data file is defined to contain one or more of the structured file fields.

Fields may be replicated as needed among multiple physical data files for the purpose of enhancing performance or of improving availability during storage and retrieval operations.

The programmer's view of a structured field is in terms of the structured file's record, field, and index structure. Physical data files are accessed automatically by the system in response to retrieval requests.

Many of the services supplied for structured files are intended to be used in conjunction with an "association" established between a program and a structured file. An association is established when a structured file is opened and is normally terminated when the structured file is closed. The association provides a framework for managing services performed on a structured file and is a repository for such information as the next record to be retrieved or written to. It can be noted that an association exists between exactly one program and exactly one structured file and is independent of all other associations. Restrictions are not imposed on how many associations an application can maintain with a single structured file. Multiple associations could be used to achieve the effect of multiple paths found in data base systems.

Retrievals from structured files are performed in terms of "retrieval sequences". A retrieval sequence is a subset of the records within a structured file and might be either a range of key values within an index file or a sequence of random key values. After a retrieval sequence has been specified for an association, services can be invoked to retrieve the individual records/fields that make up the sequence.

The characteristics of all the file systems on a Storage Retrieval Module 10 are described by the contents of a constructed File System Route Directory, which directory contains files for (a) system names, (b) unit names, (c) attributes.

The System Names file is the means by which external File System names are translated to the actual RMX File System Directory path name. The Unit Attributes file allows the system to reconfigure the drives connected to an SRM 10 without affecting any application programs.

File System Directory: Each File System is described by a File System Directory which contains the following data files and directory files: (a) Unit Attributes which contains information as to the cylinder size and bytes per cylinder plus the number of cylinders per disk drive, (b) attributes, (c) sequential directory, (d) structured directory, (e) standard directory, (f) index directory, (g) image directory.

Sequential Directory: All of the sequential files in a File System are contained in the Sequential Subdirectory of the File System Directory associated with the file system. The Sequential Directory contains the following data files: (a) File Names, (b) a sequence number connecting one RMX file for each Sequential File named in File Names, (c) attributes.

The File Names file is the means by which the external File Names are translated to actual RMX File Names.

Structured Directory: The Configuration Files for each of the Structured File Sets in a File System are contained in a structured subdirectory of the File System Directory associated with the File System. The Structured Directory contains the following data files: (a) File Names, (b) Structured File Set attribute and there is one such RMX file for each configuration/attribute file which is named in the File Names file.

The File Names file is the means by which external Structured File Set Configuration File names are translated to the actual RMX file names.

Standard Directory: All of the standard RMX Data Files in the Structured File Sets in a File System are contained in the standard subdirectory of the file system directory associated with the File System. The Standard Directory contains the following data files: (a) File Names, (b) data on one such RMX file for each standard file named in File Names.

The File Names file is a means by which external standard file names are translated to actual RMX File Names.

Index Directory: All of the Index Files in the Structured File Sets in a File System are contained in the index subdirectory of the File System Directory associated with the File System. The Index Directory contains the following data files: (a) File Names which contain, for each index file, a line showing the logical index file name related to the RMX file name, (b) an index number such that it is one such RMX file for each Index File named in the File Names.

The File Names file is the means by which external index file names are translated into the actual RMX file names.

Image Directory: All of the Image Files in the Structured File Sets in a File System are described by files in the Image Subdirectory of the File System Directory associated with that File System. The Image Files themselves are allocated from the image space (FIG. 13) associated with the File System. The Image Directory contains the following data files: (a) Space Label which specifies the number of cylinders used for image cylinders in this File System, (b) Space Files which contain information on number of space files and a number of image space files plus the space file name and image space file name, (c) Space Map which contains one bit for every cylinder in the image space and is used to manage the image space allocation, (d) File Names which contains a line for each image file giving the logical image file name related to the RMX file name, (e) Node which indicates one type of RMX file for each Image File named in the File Names. Each Node is used to determine the location of the image data of the associated image file and contains information regarding the size and bytes, the total number of cylinders involved, the block count, and other information.

The Image Space associated with the File System is the total space in the Image Space Files named in the Space Files file.

Each Image File in the File System is associated with exactly one RMX Node file which contains the location of the data in the associated Image File. Additionally, the access rights of the Node file are used as the access rights of the associated Image File. Logically, each Image File can be considered to be its associated Node file, with regard to creating, reading and writing.

The File Names file is the means by which the external Image File names are translated to actual RMX File names.

Figure 12A:
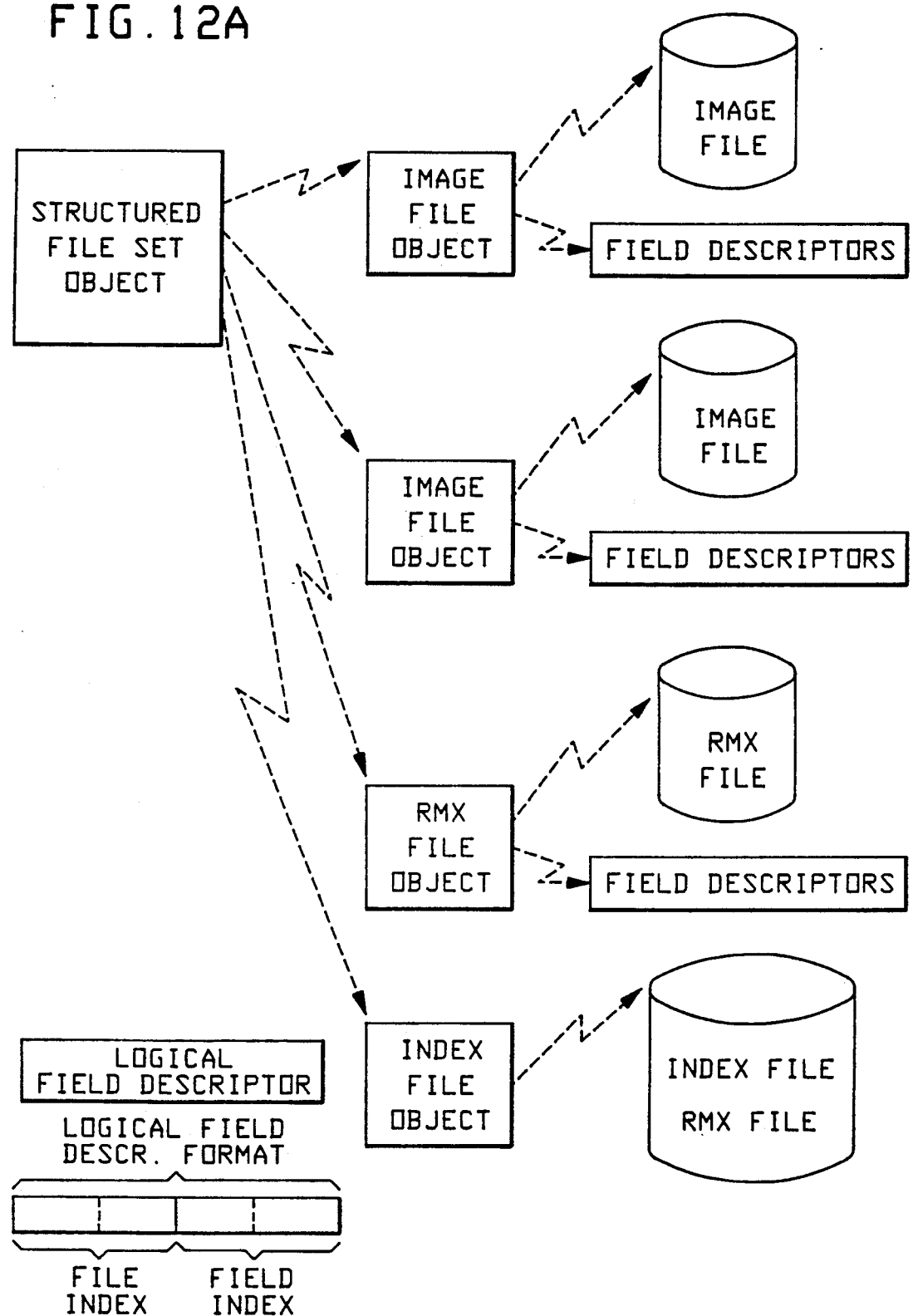
FIG. 12A is a schematic of the Structured File Set Object Organization.

Structured File Manager: The Structured File Manager (SFM) operates on "objects" called Structured File Sets (FIG. 12A). A Structured File Set is a Composite Object which contains an arbitrary number of Image Files, an arbitrary number of standard RMX files, and an Index File to access the data in the SFS.

The chief purpose of introducing the Structured File Set mechanism is to allow an application to manipulate data as elements of logical records and of logical structured files, independent of how and where the data is physically stored. By divorcing the logical view of the data from its physical representation, the system gains the ability to modify the configuration of its system operation without modifying the application programs.

Each Structured File Set consists of a number of files. Each of these files contains Structured Records, each of which has a unique Record Number which can have a value of 1 to n, where n is the number of records in the Structured File Set. Each Structured Record contains one or more fields, which contain the actual data operated on by the application. From an application point of view, a Structured File Set is one structured file, containing "n" (logical) structured records, each of which contains a set of fields of data. The fact that all of the fields do not reside in the same physical file, and in fact might not even reside on the same drive, is immaterial to the application. The actual configuration of the Structured File Set (SFS) is determined when the SFS is created and is based on its expected type of usage. One reason for using the FS concept is that "Image Data" is collected on a document-by-document basis, but is normally retrieved on an image-by-image basis. Since records in a Structured File have variable sizes, the Structured Record organization permits greater ease of recovery from error situations.

Index File Structures: An Index File contains Index Records which is a structure providing information as to the record index, size, the number of fields, the record index number, the field directory entry for a series of fields from a first field through the nth field. Then each index record structure can be organized into a graph of index structures which start from a low value and continue on to a high value for the nth index number. This allows data records to be located by means of a key value which is normally a part of the data record itself.

Sometimes it is required to locate data records, not by a Key value, but by the "number" of the records in the file. In this case there are two possible conditions which exist: —(i) the records in the file are all of the same fixed length, or (ii) the records have variable lengths unrelated to each other. If each of the records in a data file have a fixed length, k, then the location of the beginning of the record n is merely n*k bytes from the beginning of the file.

If all of the records in a data file are of variable length, a special kind of Index File is used to locate an arbitrary record by its record number. This type of Index File is given the term "Record Index File" and it contains index records with no Key value. In this case the record "n" is located in the Data File by first locating the nth Index Record in the record index file and then using the contents of this index record to locate the data record.

Record File Services: A Structured File Set (FIG. 12A) will normally consist of one or more Data Files and one or more Index Files. Additionally, the Structured Records in a Data File normally consist of one or more Fields. In the narrow case where the Structured File Set contains exactly one Data File, and each record in the Data File contains exactly one Field, it is possible to operate on the Structured File Set as if it were a Record File. This makes it possible to support multiple data files and fields.

When the Record File (FIG. 12B) is created, it can be done with either a fixed record size (with no associated index file) or with a variable record sizes, with an associated Record Index File (RIX), FIG. 12C.

FIG. 12A is a schematic drawing showing the organization of the data structures which describe a Structured File Set Object.

FIG. 12B shows the structure of one record in the Index File.

FIG. 12C shows the organization of the records in an Index File. Since the RIX values (RIX is the record retrieval index) are organized in ascending sequence, then for a 5,000 record Structured File Set, at most only 12 comparisons will be required to probe the index to indicate the correct index record.

Configuration File Format: When a Structured File Set is created or open, the Structured File Set (SFS) must be given information regarding all of the files which comprise the Structured File Set, and the characteristic of those files. This information is contained in a Text File called the Structured File Set Configuration File. The access rights to the entire Structured File Set (SFS) are identical to the access rights of the Configuration File. The Structured File Set Configuration File contains information of the following nature:

(a) name of the structured file set;
(b) field with the field name and the data file name;
(c) the data file name and the data file type;
(d) the index file name and the field name.

With reference to FIG. 13, there is shown a schematic drawing of the "volume structure" of the storage and retrieval module, SRM 10. It may be noted that for each individual SRM, a file system will contain an integral number of volumes from one to eight. Each volume has a capacity of 1.2 gigabytes unformatted and there are 745 cylinders per volume and 27 tracks per cylinder providing for 49,728 bytes per track. There are four volumes allocated to each disk controller 10dc and each Storage/Retrieval Module 10 may have one or two controllers to service it. In FIG. 13 it may be noted that volume #1 is allocated to the file system A and provides a number of storage spaces as indicated by the file names thereon. The File System B can be seen to involve two different volume structures, i.e., volume #2 and volume #3 whereby the image files are placed on two different volume structures. The File System C is handled by the Volume #4 memory space as indicated in FIG. 13.

Image File I/O System: The Image File I/O System (IFIOS) is provided to efficiently store data and retrieve data in image files. When the SRM disk system is initialized, one or more large RMX files are pre-allocated on each volume. These files are called Image Space Files (FIG. 13) and the total space occupied by them is denoted as Image File Space. Since the Image Space Files are pre-allocated (and never get de-allocated during system operation), they are completely disassociated from any basic I/O system (BIOS) operations. From the viewpoint of the BIOS, it is as if the space contained in these files did not exist since they will never be used for any standard file storage. This permits the system to be partitioned where each volume is partitioned into two logical units: one unit comprising all of the space that the BIOS can allocate and modify, and one unit comprising the space in the Image Space Files.

Traditionally, the partitioning of a volume into multiple units is done by defining a disk address threshold. However, in the SRM partitioning scheme, this is done by logical equivalency. No additional data is required to be given to the BIOS (Basic I/O System) to make it aware of the "other unit" on a device since its own file allocation structures define the extent of the "other unit".

The space contained within the set of Image Space Files is denoted as the Image Space Unit on the volume. A feature about this allocation mechanism is that the size of the Image Space Unit on a volume can readily be changed, merely by re-allocating a new set of Image Space Files during system initialization.

All Image Files (I Files) are allocated from the Image Space Unit on a volume. The IFIOS (Image File I/O System) file allocation structures are similar to the BIOS structures, except that the volume granularity is one track (36 kilobytes) and the file granularity is one cylinder (550 kilobytes). This means that data is transferred to and from the disk in track-size blocks and the I Files are allocated as an integral number of cylinders.

This type of organization allows for good balance between the size of the I File records, the size of the disk buffers required for reading the I File records, the transfer characteristics during the transfer of multiple I File records, and the size of an entire IFILE. It may be noted that since the IFILE granularity is one cylinder, then complete cylinders can be written to and read from, with maximum efficiency.

The allocation of space in the Image Space Unit does not affect the allocation of the Image Space Files on the volume. The Image Space Unit is, logically, a contiguous area which always exists. Space for the IFILES is allocated from it and the IFILE space is returned to it upon de-allocation. Logically, an Image Space Unit can be considered as a distinct storage volume. All of the Image Space Units on the disk drives connected to one SRM 10 are logically concatenated to form the SRM Image Space. This allows the IFILES to span disk drives.

Sequential File Manager: Within the File Management System, a Sequential File is a disk file which has no intrinsic internal structure. It is viewed by the system as merely a sequence of bytes. The Sequential File Manager (SQFM) allows primitive files to be created, to be written to, to read from, and/or otherwise manipulated.

All Sequential Files in the File System are contained in the Sequential Directory of the File System and are always standard RMX files and never Image Files. The name of a file can be any sequence of non-blank alphanumeric characters, which is automatically translated to an RMX file name.

Device Driver: The Device Driver (FIG. 11) the disk system has been enhanced with the following features:
(a) The Device Driver transfers data to/from contiguous data buffers in the host memory of host 6. The driver is enhanced to allow a host buffer to be a data-chain block, as permitted in the RMX systems;
(b) The Device Driver allows for a new image space device and data structures;
(c) and the driver allows concurrent access from both the BIOS and the IFIOS Buffer Management: One uniquely distinguishing characteristic of the storage and retrieval module, SRM 10, as compared with other real time systems, is the large amount of data which must be manipulated. Thus, optimization of the data movement is the salient characteristic of the SRM. Since resources are finite, there is a fixed amount of buffer memory and there is a maximum bandwidth removing data within a CPU board and from board to board and there is a maximum data transfer rate to and from the disk drive, plus there is a finite time length required to move from one disk cylinder to another. In view of these considerations, this system operates to minimize the amount of data actually moved, it minimizes the amount of wasted buffer space, and maximizes the amount of data transferred to the disk at each ON position while consistent with the size of the available buffers.

It is possible, for example, to have 28 RW heads in simultaneous operation upon the disks doing reading and writing operations.

Memory Pool Structure: During the course of operation of the SRM, data buffers of greatly varying size are created, used and discarded. As a result, the data buffer design provides allocation for the following conditions so that (a) the size of the buffer memory allocated is never much larger than the actual size requested so that wasted space is minimized; (b) no garbage collection operation is used which would rely on data copying since this could adversely affect system performance; (c) if there is enough free space in the memory pool to satisfy a request, this request must not fail due to fragmentation; (d) the allocation must be done efficiently both during allocation of space and de-allocation of space.

With this consideration, the memory pool is partitioned into one-kilobyte physical buffer blocks. A bit map is used to keep track of the allocated and the free buffer blocks and all the buffers will be organized as Data Chain Blocks as defined in the RMX 286 system. This insures that the average wasted space will be 512 bytes per buffer but that the data buffers will be consistent with those used by RMX 286 buffer pools.

Data Buffer Object: In order to reduce the amount of data copying, while still retaining the flexibility of a memory pool composed of many small physical buffer blocks, a concept was devised of a "Data Buffer Object". A Data Buffer Object describes a (logical) data buffer of a specific size. It has an associated Data Block, within which resides the actual data buffer. This permits reference to various portions of a large block of data without actually moving the data involved to its own buffer. Since all of the file management routines accept Data Buffer Objects as parameters, this permits actual data copying to be significantly reduced.

The Data Buffer Object is described by a data buffer object descriptor which provides the parameters and information required to describe the Data Buffer Object. The Data Buffer Object contains an area of private fields which are manipulated by the user of the Data Buffer Object to store information associated with the data contained in the Data Chain Blocks or the buffer area.

A Logical Data Block can be either: (a) contiguous buffer area in memory, or (b) Data Chain Block which points in turn to many physical data blocks similar to the RMX system.

Since the described Data Chain Block is identical to the RMX data chain block, they can be used directly when sending or receiving data with the message-passing mechanisms.

FIGS. 14A through 14D are schematic drawings illustrating the relationships between index files (for the RMX software system) in relationship to the physically structured data files and the logically structured files.

Figure 14A:
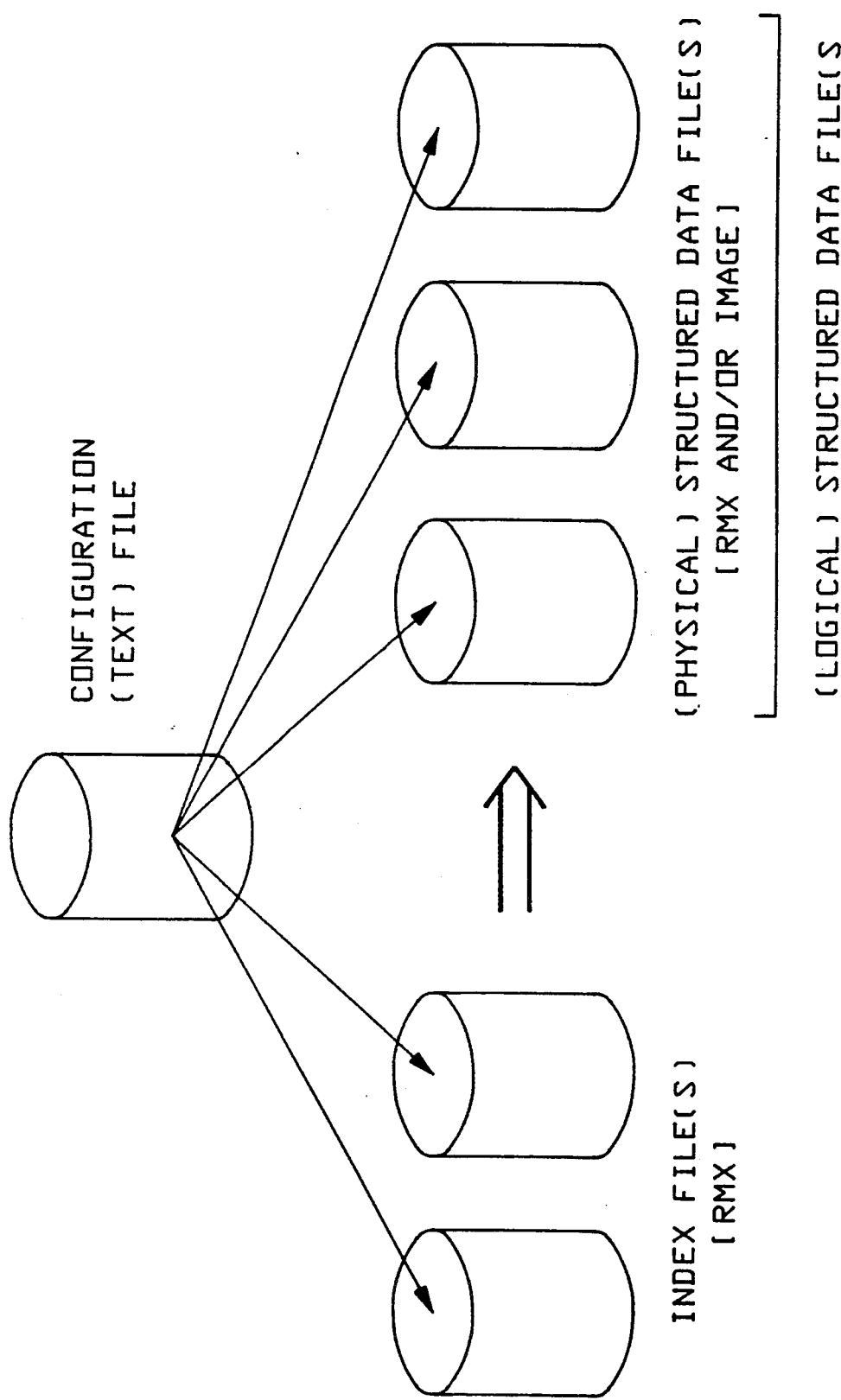
FIG. 14A illustrates a Structured File Set.

The Structured File Set (SFS) of FIG. 14A shows how the configuration (text) file on one disk area connects the index files (RMX) on another disk area to the physically structured data files on another area of the disks.

Figure 14B:
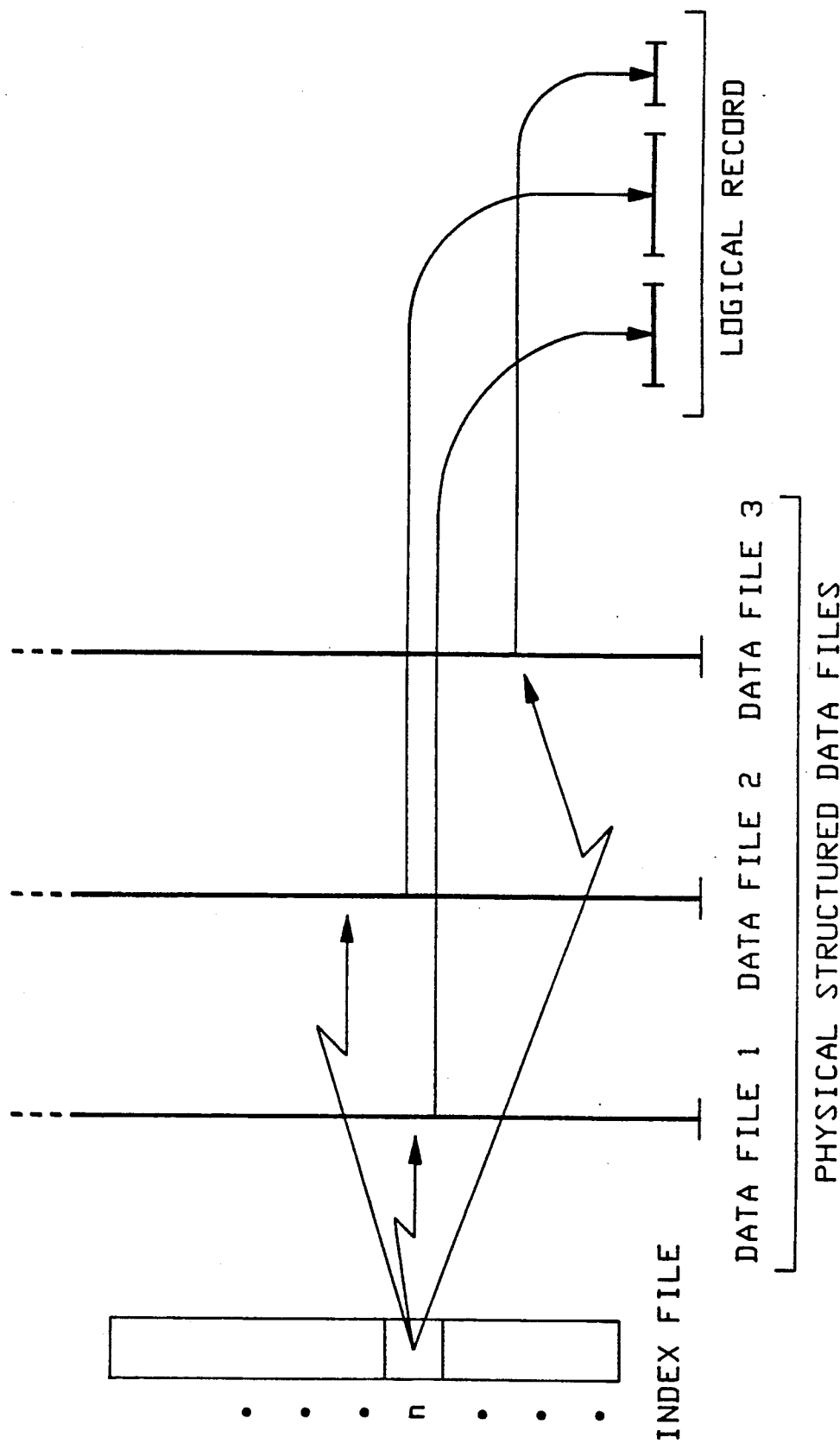
FIG. 14B shows the Index File in relation to the Logical Structured Data File.

In FIG. 14B, this schematic indicates how three data files such as data files #1, #2, and #3 are mapped to logical records which are also related to the index file n.

Figure 14C:
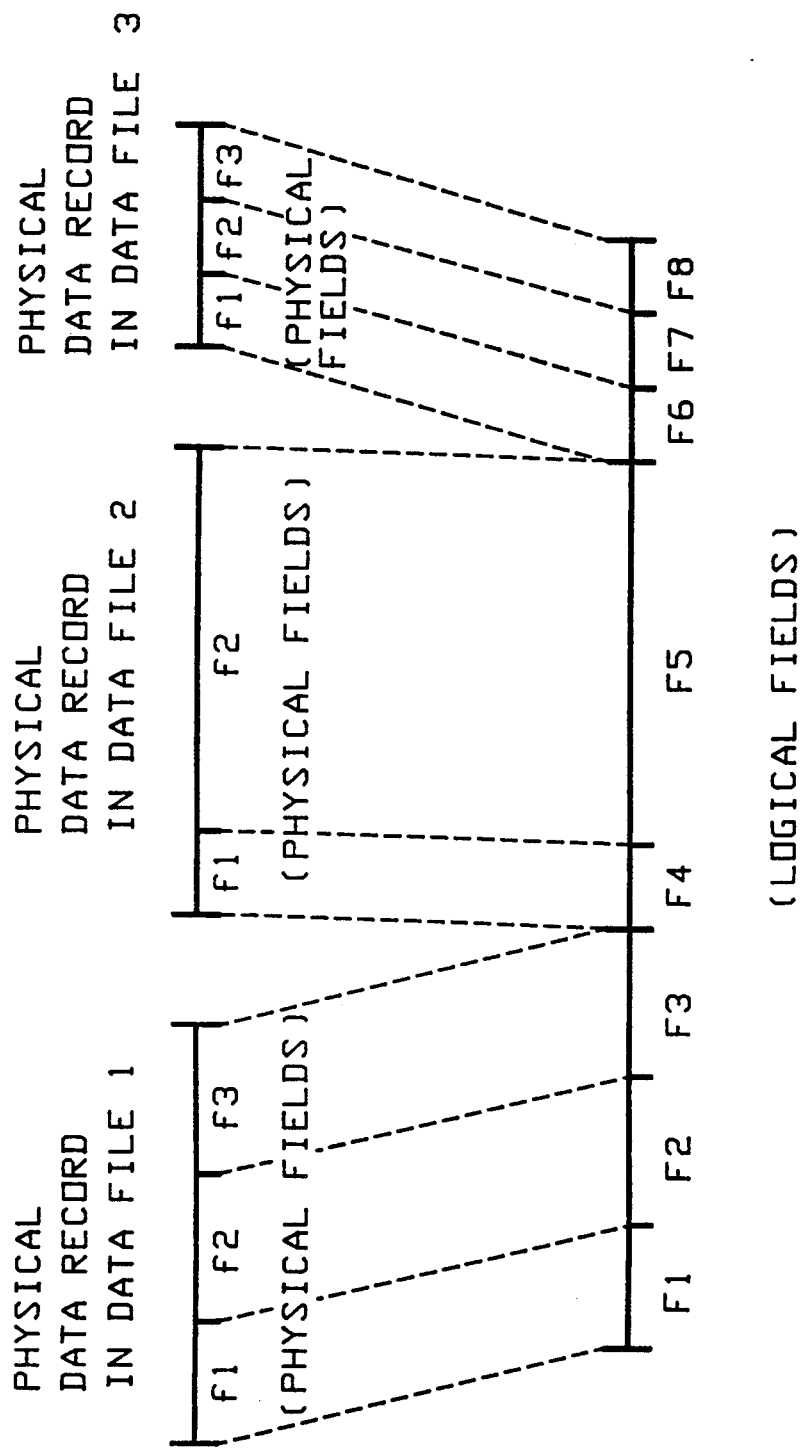
FIG. 14C illustrates the Logical Structured Record in relation to the physical record.

FIG. 14C is a schematic showing the logical structured record, where the logical fields F1, F2, and F3 are co-related to the physical data records in data file #1 shown as f1, f2, and f3. Likewise, the logical fields F4 and F5 are related to the physical fields f1 and f2 of the physical data record in data file #2. Then the logical fields F6, F7 and F8 are related to the physical fields f1, f2, and f3 of the physical data record in data file #3.

Figure 14D:
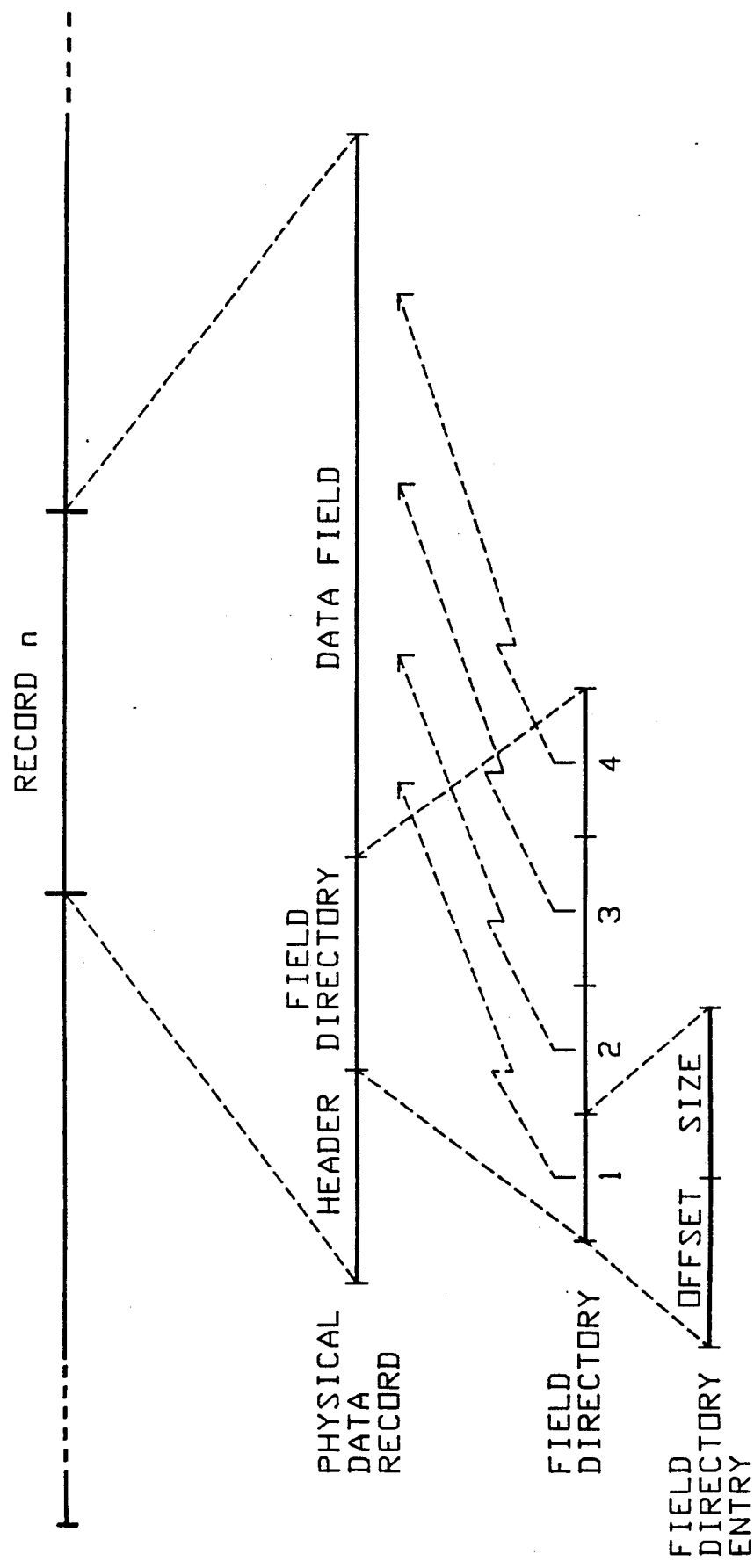
FIG. 14D illustrates the Physical Data Record organization.

FIG. 14D illustrates the physical data record shown as Record n whereby the Record n is made up of the physical data record having a Header, a field directory area and an area for data fields. The field directory entry for field directory area #1 shows a space for the Offset and a space for the size information. Each one of the field directory data 1, 2, 3, and 4 relates to a certain portion of the physical records data fields.

With the structured file set organization and the physical components, the storage and retrieval module is capable of storing 60 images per second where the average check image size is a compressed image of approximately 20 kilobytes of data. The retrieval rate of image data for transmission to a requesting workstation is on the order of 22 images per second. The disk storage structure has a minimum of two drives and a maximum of eight drives such that the minimum capacity, with two drives, is 1,600 megabytes (formatted) and the maximum capacity, with eight drives, is 6,400 megabytes (formatted).

While the previously discussed configurations of the image and item processing system shown in FIG. 1A generally involve one site and relatively small locality area, the system is adaptable for usage in a local-remote configuration where one portion of the system may provide for complete image and item operations with the host computer 6 but at the same time, the host computer 6 and the local workstation and communications processor may be connected to distant remote locations in other cities where a completely self-sufficient remote location can provide all the image and item processing functions without the need for an on-site host computer since the original local host computer 6 can be connected via modems to monitor the remote operation. Since the image and item operations do not need processing by the host computer, the remote operations can operate fully functionally and use only the host computer 6 for administrative and record keeping operations which do not diminish the high speed image and item processing operations of the system.

Certain prior art systems required that the host computer process all the image data so that no image and item processing operations could occur without the connection of an on-site host computer. The presently described system obviates this situation since the host computer 6 of the present configuration does not process images and items but only operates for administrative and initialization purposes plus record keeping purposes which do not require the high volume data streams required for the image and item processing.

Figure 15:
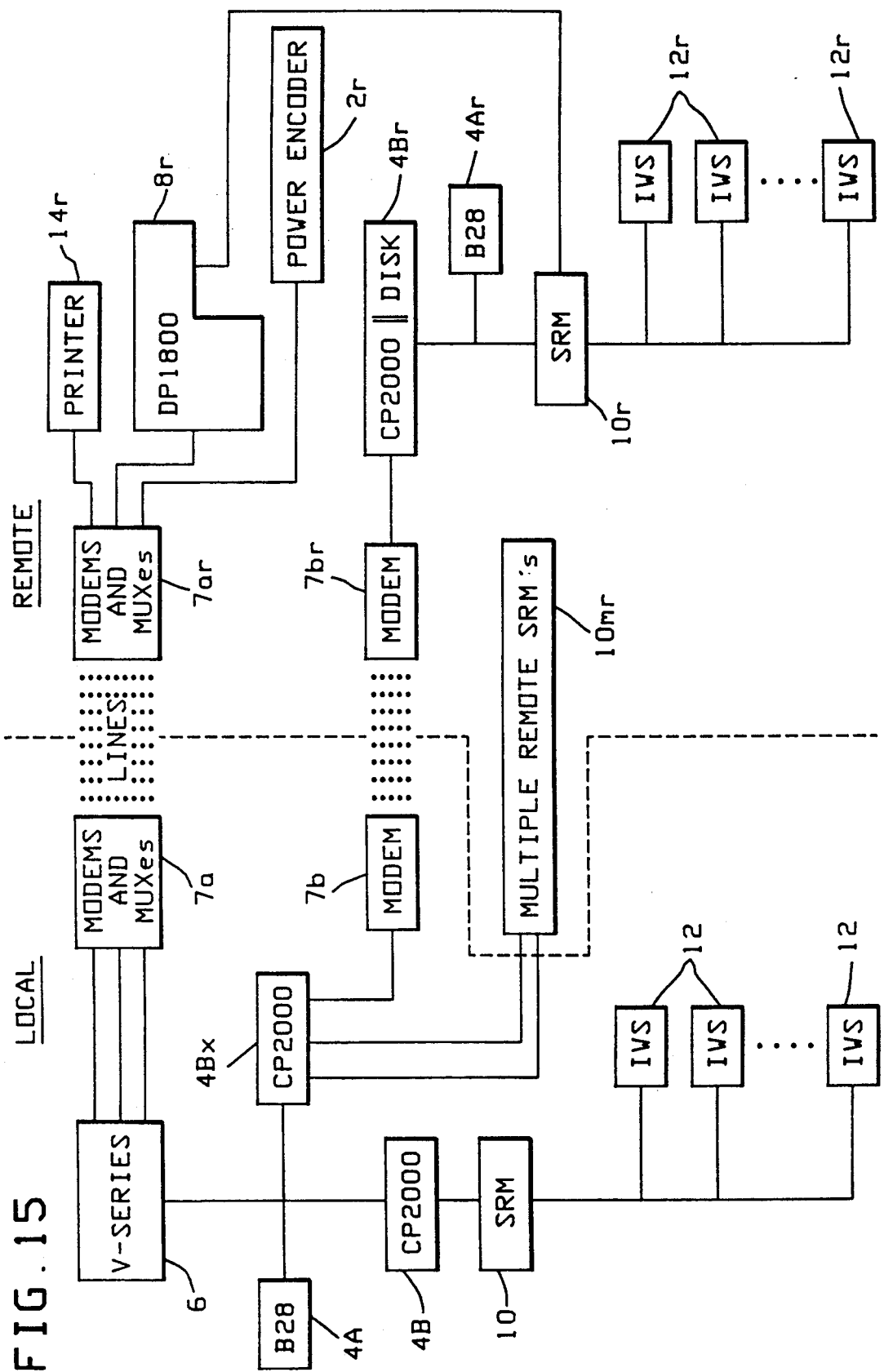
FIG. 15 is a drawing showing the system having local and remote intercooperating Storage/Retrieval Modules.

Thus, with reference to FIG. 15, there is seen a configuration whereby a local site having a host computer 6 can provide fully functional image and item processing operations through use of the local storage and retrieval module 10, the local workstation 4A, and the communications processor 4B, plus the interconnected image workstations 12. Simultaneously at a remote location such as a remote city, a document processor 8, a power encoder 2r, and a printer 14r can be connected to a modem and multiplexer unit 7ar. The modem-multiplexer 7ar is connected by long lines to the modem-multiplexer 7a which communicates with the host computer 6.

Likewise, the local communications processor 4Bx can communicate from local modem 7b to the remote modem 7br for transmission to a remote communication processor 4Br which can communicate with the remote storage and retrieval module 10r and whereby remote image workstations 12r can retrieve image and item information from the storage/retrieval module 10r.

The communications processor 4Bx is also connected to a multiple group of remote storage and retrieval modules 10mr which provide for added storage and retrieval capacity for both the storage and retrieval module 10 at the local site and also for the storage and retrieval module 10r at the remote site.

With reference to FIG. 9A, the storage/retrieval system operational functions are shown and can be illustrated by the following examples shown in a sequential series of steps.

Figure 1B:
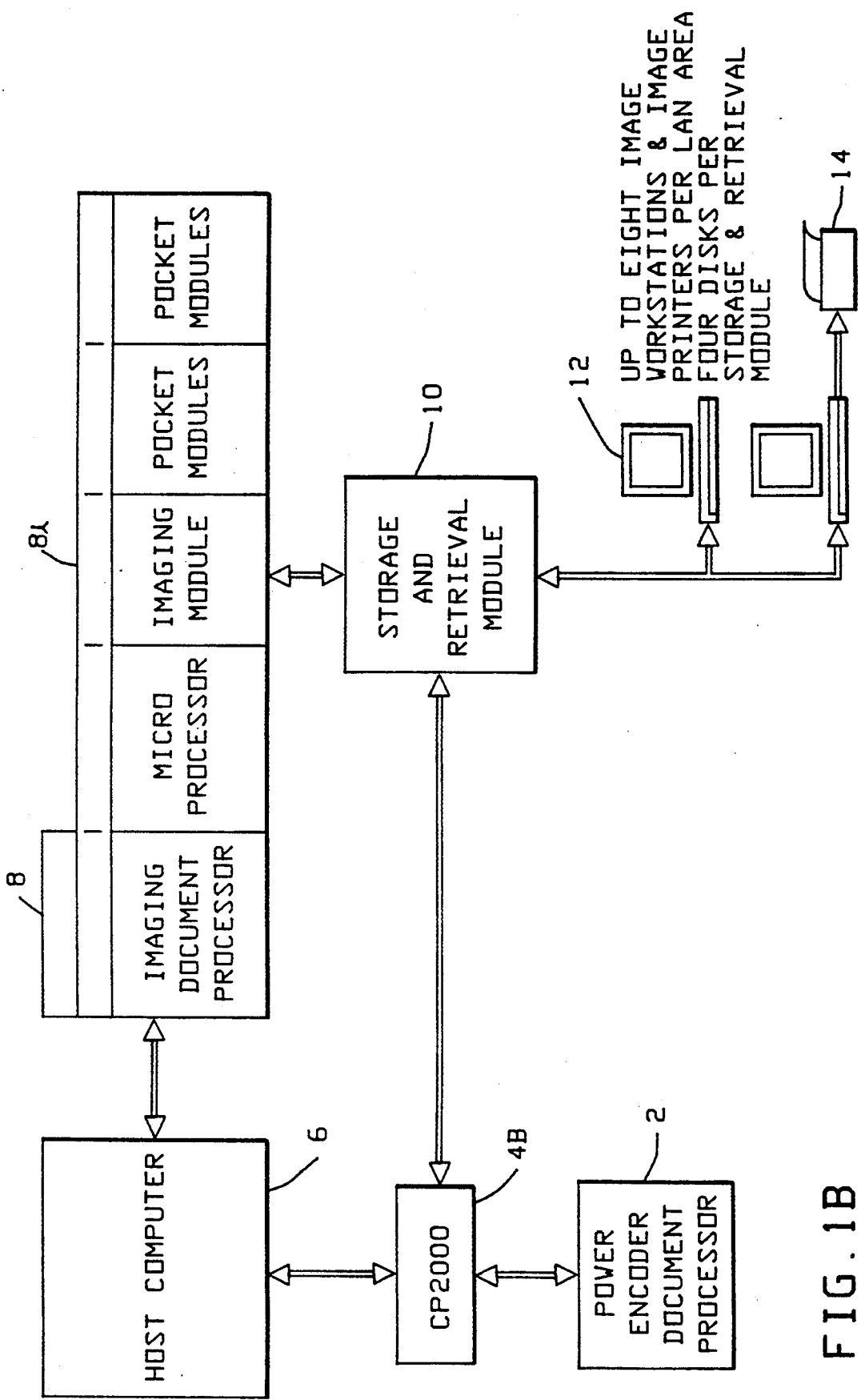
FIG. 1B is a block diagram of system modules.
Figure 9B:
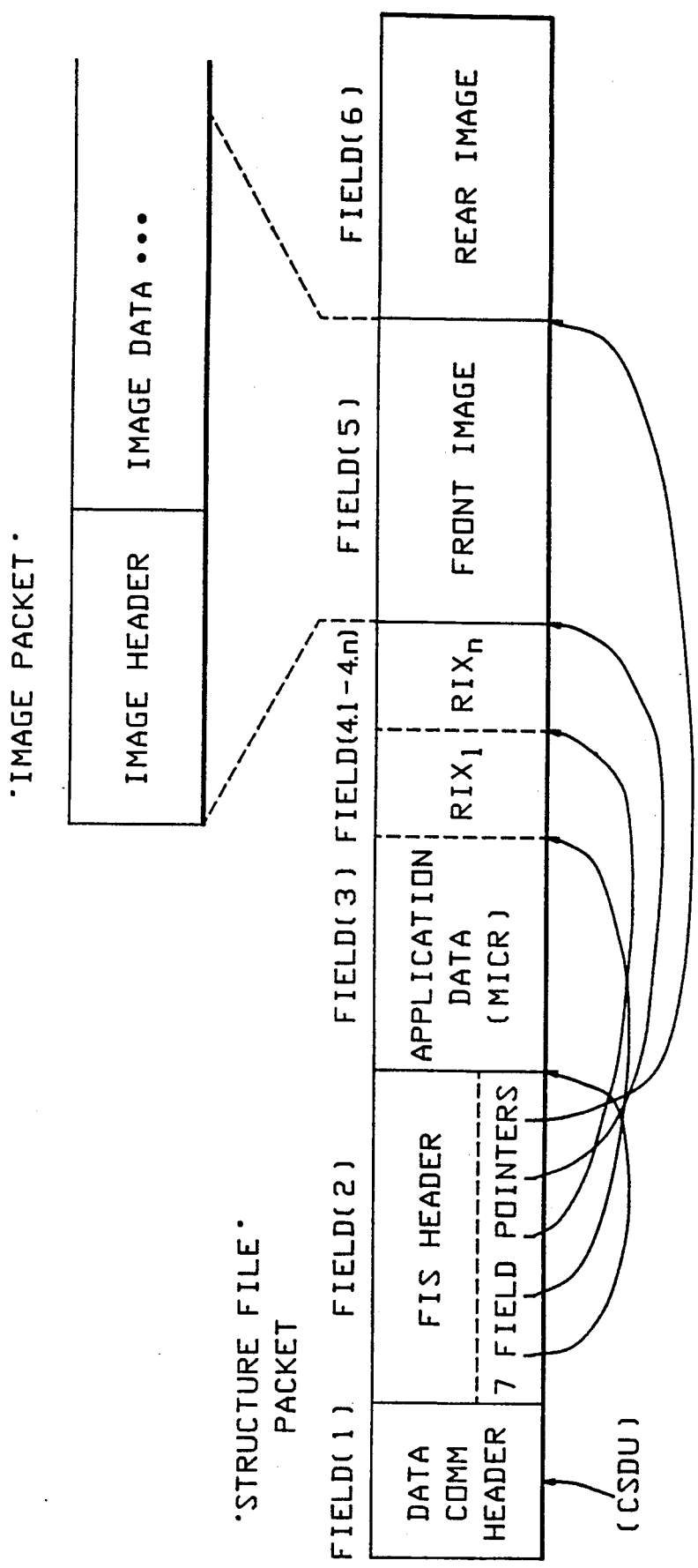
FIG. 9B is a schematic drawing of the image packet.

The first basic operation illustrated herein is the "storage operation" on disk where enormous amounts of packet-data are received from the Image Module 8i (FIG. 1B). There are data packets which average 40 kilobytes per check, which come across the point-to-point optical link, 10po to the storage retrieval system at the rate of 30 packets per second. Thus in FIG. 9A, the IM step 101 transmits these data packets to the step 102 (POL 10po). This data packet is pictorially represented in FIG. 9B. FIG. 9B depicts the packet of information transmitted between the IM (imaging module 8i, FIG. 1B) and the storage retrieval module 10 for storage on magnetic disk. The IM 8i captures the MICR data and image data.

Essentially there are two types of packets generated from the Image Module 8i: (i) an "Image Packet" which contains a standard image header shown in FIG. 9C which is prefixed to the digitized image data and (ii) a "Structured File" data packet which combines image packets with other data necessary for storage and retrieval requirements in the SRM 10.

The Structured File packet is logically a record of a variable number of pre-defined variable length fields. The first field (1) is a data communications header necessary for data integrity and transmission to an associated SRM. The second field (2) is a system header (FIS) which fundamentally describes the remaining field in the packet. It contains field pointers to the remaining fields. The field (3) contains information defined by the off-load sort program, including code line data (MICR). The fields 4.1–4.n contain Retrieval Index numbers to be associated with the images stored on the SRM.

Depending on the application requirements, any given image captured can be stored in any of several different files on the SRM. Thus the capability for, and the need to generate several RIX numbers, exists in the image module IM 8i. It should be noted, however, that only one copy of the image is transmitted to the SRM which subsequently, in turn, can be copied by the SRM itself for multiple instant storage.

Finally, the Image Packets are appended to the record. These include a document front-side image and, optionally, a document rear-side (back) image. Again referring to FIG. 9A, the Storage Processor 10p operates at step 103a to queue the image data packets for subsequent writing to disk.

At step 104 of the IM services function, the Unit Processor 10u transmits the packet for handling by the SRM Communication Handler function, at step 105. The Communication Handler routes and presents the incoming message to the SRM (via the Structured File packet) and on to the target program on the SRM which will handle the message.

Then the Image Command Services functions at step 106, using the Storage Processor 10p, in order to handle the specifics of all requests on the SRM. These requests would include such service requests as: file management, unit management, initialization, etc.

From step 106 of FIG. 9A, the image packet is split into two separate functional channels: (i) for sequential data to be stored, and (ii) for image data to be stored. The "sequential data" is all non-image related data, and examples of such data are: text files, code files, binary files, etc. The sequential data (i) is transmitted by this system file manager function in the storage processor 10p, at step 107, to perform the function of file management on the SRM. This function is a standard file system/file storage and retrieval operation such as create, open, close, read, write, etc.

After this, the storage services function (operating in the Storage Processor 10p) at step 109, passes the sequential data to the disk driver in step 111 and then stores the data on disk at step 112.

The second channel for image data (ii) from step 106, in Storage Processor 10p, handles the image data for storage. Here, the image command services function at step 106 operates to provide commands to the Image File Manager function at step 108. The file manager function 108 operates in the Storage Processor 10p.

At step 113, the Image Record Services function in Unit Processor 10u, functions to analyze the data imbedded in the SRM message requesting file management services, to determine if a storage or retrieval request has been made and to transmit the image data, at step 114, via the storage services function in the Storage Processor 10p. This functions to control the disk drive at step 111 and selects the deposit of the image data on disk at step 112 where a selected sector address is chosen.

The second basic function of the SRM 10 and the SRM subsystem involves the "retrieval" of data captured and placed on the disks 20 (FIG. 4A).

The image command services function at step 106 can be activated by the host 6 or workstation 12 (via workstation services 116). Thus the image command services function of step 106 can operate in two channels, —namely (i) for retrieval of sequential data, and (ii) for retrieval of image data.

For the sequential data (i), the System File Manager function at step 107 (operating in the Unit Processor 10u) will offer the Retrieval Services function, in Unit Processor 10u, in step 110 which has functions similar to those provided by the Image File Manager function of step 108, and works to control the disk drive 20 via the disk driver at step 111 in order to access the designated cylinder, sector and address of the disk at step 112. After this, the Unit Processor 10u, at step 106, uses the SRM communication handler function at step 105 to activate the workstation services function at step 116 in order to transmit to the Workstation Communication Manager in Unit Processor 10u at step 117, which then instructs the Ethernet Controller 10c to send the requested sequential data to the workstations (12, 14, FIG. 1A) at step 119, after activation of the Ethernet drivers at step 118. Thus, step 119 provides the data to the workstations as ordered from a workstation 12 via the host 6 (FIG. 1A).

The second (ii) channel for "retrieval" in the SRM 10 module involves the image data retrieval at step 106 using the Image Command Services function. Here the Image Command Services of the Unit Processor 10u commands the Image File Manager at step 108 in order to activate the Image Record Services at step 113, which then activates the Retrieval Services function at step 115. This commands the disk drive to access a designated cylinder, sector and address at step 111 which will operate, at step 112, to gain data access so that the Image Command Services of step 106 can convey the image data to the workstations 12 via step 119.

In FIG. 9A of the Storage Retrieval Module subsystem, another illustration of its function would involve that of a host (6) command to the storage/retrieval module 10. One example of this could be the "Copy Command" where the host 6 orders that a designated packet of data on disk 20 should be accessed and copied for storage on a second SRM module and its disk memory.

Here, the host 6 at step 132 (using the image record services function) transmits a copy command designating a particular image packet for copying onto a second SRM. The host command function at step 132 and the Ethernet driver function at 131 are handled by the Ethernet Controller 10c (FIG. 4B) where the host services function at step 130 operates to handle the host for specific services such as start/stop programs, logging and statistic generation and update, copying of structured files and changing unit states, etc.

Thus the host services function 130 uses the SRM communication handler function at step 105 and the Image Command Services function at step 106 (in Unit Processor 10u) in order to activate the Image File Manager function at step 108. This function communicates with the Image Record Services at step 113 in order to command the retrieval services in step 115 in order to control the disk drive via step 111 so as to access the disk at step 112. The retrieval data structure for a small record size would involve a header, a RIX data field, and a pointer to the data area.

After the image data packet is accessed from the disk, then the SRM-SRM services function at step 140 (in the Unit Processor 10u) will activate the Image Command Services function at step 106 (in Unit Processor 10u) where the packet data is handled by the SRM Communication Handler at step 105 (also in Unit Processor 10u) whereupon the SRM Services function at step 140 operates on the Ethernet Controller 10c to activate the second disk drive via the SCSI driver function 141 and the final writing of the copied image data packet onto the "second" storage/retrieval module via step 142.

Thus the system provides not only for the usage of a single SRM 10 but for the intercommunication and intercooperation of multiple numbers of storage/retrieval modules in the system.

Figure 16:
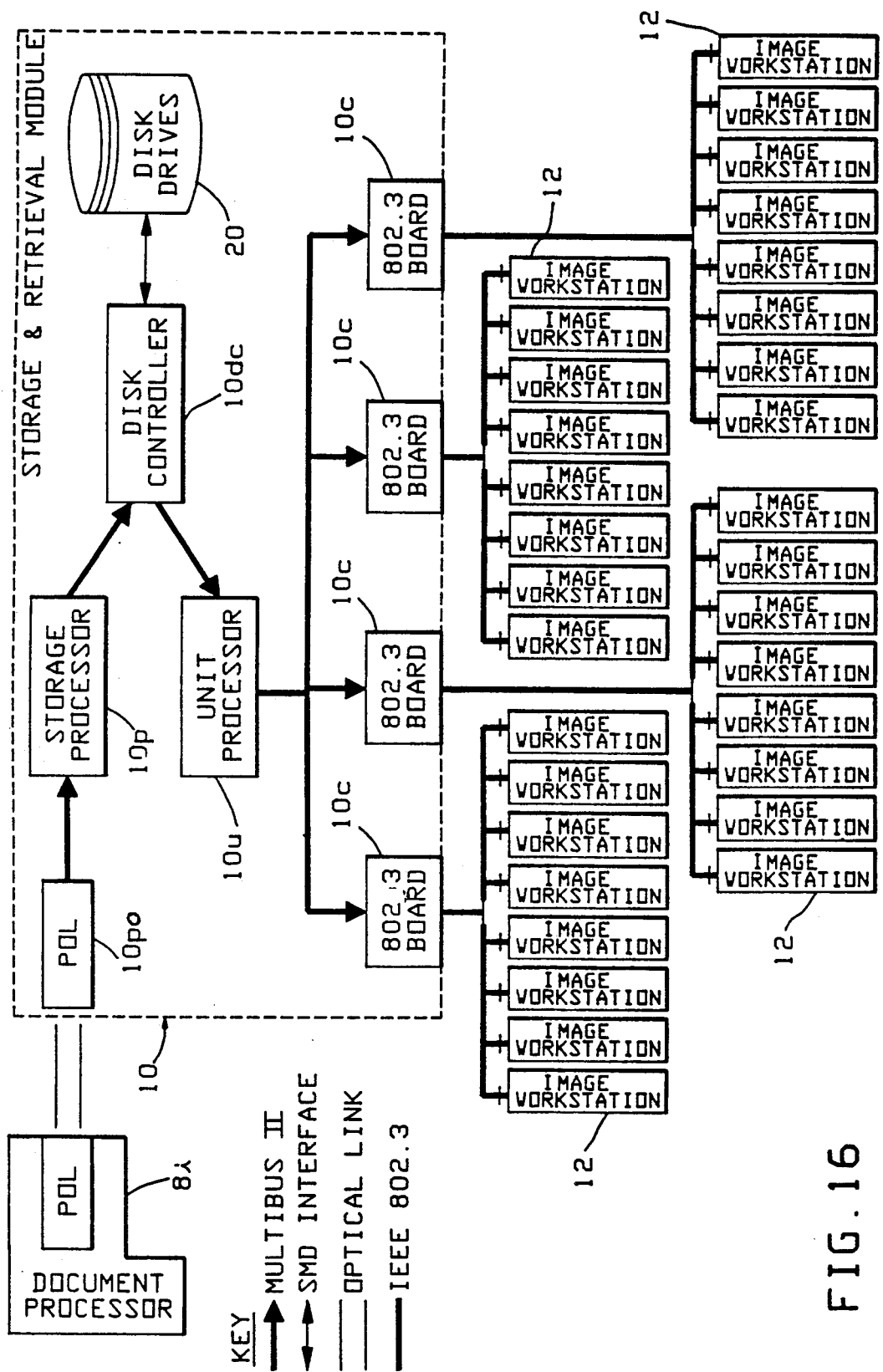
FIG. 16 is a block diagram showing the optical link to the Storage/Retrieval Module.

FIG. 16 shows a generalized block of how data from the Image Capture Module 8i travels to the optical link controller 10po (POL) of the Storage Retrieval Module 10 when the Storage Processor 10p operates to store data on disk unit 20 via disk controller 10dc. For retrieval, the Unit Processor 10u takes requests from workstations 12 and initiates retrieval of requested data for transmittal to a requesting workstation 12.

POL Controller (point-to-point optical link controller):

The point-to-point optical link controller 10po is shown in block diagram form in FIG. 17. The POL controller is a single Multibus II board that handles duplex serial communication at 20 megabits (Mb) per second over a pair of serial fiber optic links 9po. The POL controller consists of seven major functional areas which include: the Multibus II Parallel System Bus (PSB) interface, the Multibus II interconnect space, the Multibus II CSM Services (central services module) functions required by the Multibus II, the local bus extension (LBX) interface, the optical receiver interface, the optical transmitter interface, and the control processor.

The POL controller 10po has a fiber optic interface which allows duplex communication. The hardware 204r FIG. 17 in the controller handles all the low level communication protocol including handling errors, framing for transmission and synchronizing the interface.

The hardware divides all messages sent into "packets" of 2048 bytes, or less if the message or the last packet in the message is less than 2048 bytes, then generates a cyclic redundancy check (CRC) for each packet, inserts the appropriate delimiters for the packets, and then transmits the packets until the message is complete. The hardware can generate four different delimiters which involve two "start" delimiters and two "end" delimiters. One start delimiter indicates the start of a message while the other start delimiter is used to indicate the start of an intermediate packet. One "end" delimiter is used for terminating a packet while the other "end" delimiter is used to terminate the message. The message format is organized in the following sequence:

SDO, PACKET 1, CRC, ED1, SD1, PACKET 1, . . ., SD1, PACKET n, CRC, ED0 where SD0 equals the starting delimiter of the entire message;

ED0 equals the ending limiter for the entire message;

SD1 equals the starting delimiter for an intermediate hardware frame;

ED1 equals the ending delimiter for an intermediate hardware frame;

CRC equals the cyclic redundancy check bits (16 check bits);

PACKET 1 equals the intermediate hardware frame (2048 bytes);

PACKET n equals the remaining N bytes (mod 2048) of the message.

The cyclic redundancy check is generated by the checker 206c for each individual packet. The remainder of the message (mod 2048) if non-zero, must be greater than 4 bytes to ensure the correct accumulation of the CRC.

The hardware generates synchronization signals in order to insure correct operation of the optical link. During idle time, when there are no messages being sent, data 1's are transmitted to ensure the receiver's clock recovery chip remains locked. During the transmission of the message, if data is not available for transmission, the transmitter transmits a synch signal (SYNCH 1) to keep the clock recovery chip 203 locked, and the receiver logic active.

The receiver hardware (204r, FIG. 17) reassembles the hardware packets into the complete message while checking the individual packets for CRC errors. The receiver removes the sync signals (SYNCH 1) received and does not accumulate a CRC for them. All errors are reported at the end of the message rather than at the time detected.

Figure 17B:
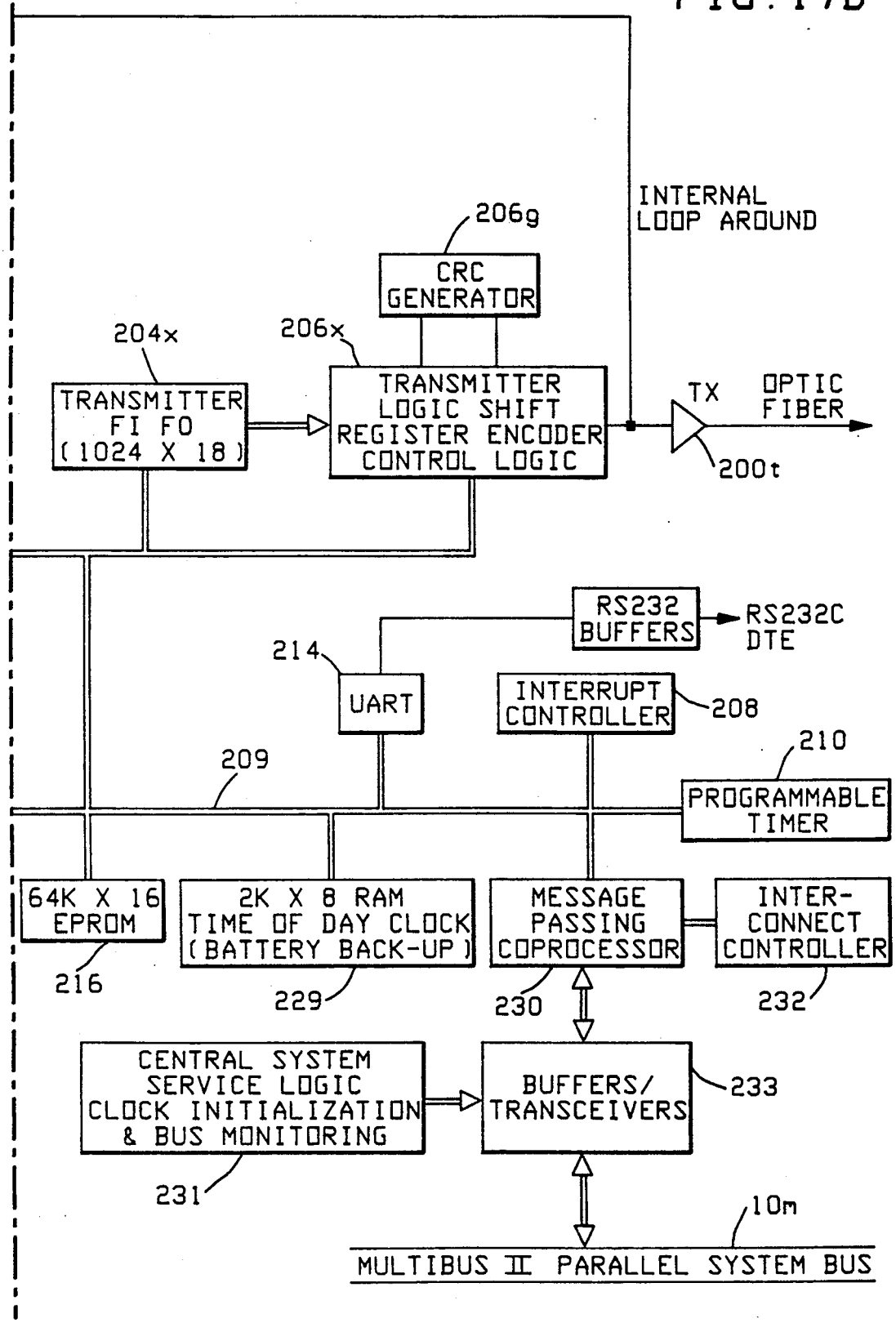
FIG. 17 is a composite of FIGS. 17A and 17B showing a detailed block diagram of the Optical Link controller for receiving digitized optical signals from the image module.

In FIG. 17, the control processor CPU 226 handles all the protocol associated with transmitting and receiving data over the fiber optic link. The processor 226 is also responsible for handling system initialization of the parallel system bus interface PSB. The control processor 226 is an Intel 80286 microprocessor with EPROM and dynamic RAM for storage of data and code. It also contains two interrupt controllers, a programmable timer, and a serial communications controller for system software and diagnostics support. The Intel 80286 is a microprocessor providing a 16-bit wide data path and up to 24 bits of addressing. It can operate in one of two modes: Real Address Mode or Protected Virtual Address Mode. The address space of the 80286 consists of memory space and I/O space. The processor allows space for up to 256 interrupt vectors. The user-defined interrupts are identified via the interrupt vector provided by the interrupt controller 208 (FIG. 17B) data bus 209 during an interrupt acknowledge cycle.

The DMA controller 228 of FIG. 17 is used to handle the message passing coprocessor 230 and also the fiber optic transmit and receive functions. This DMA controller is designated as an advanced DMA controller (ADMA). It provides four independent DMA channels that can transfer data at rates of up to 8 megabytes per second and it supports both synchronized and non-synchronized DMA operations with command chaining, data chaining, and other methods.

The POL controller 10po uses the ADMA 228 in the mode where the ADMA supports memory space and I/O space operations. If the CPU 226 (Intel 80286) is operating in the real address mode, both the processor and the ADMA can access up to one megabyte of memory space. When the processor 226 operates in protected virtual address mode, both the processor and the ADMA can access up to 16 megabytes of memory space. A board supports block data transfers to a maximum block length of 16 megabytes. The DMA controller 228 and the processor 226 share access to the local bus 209. Bus control is passed between the processor 226 and the DMA controller via a Hold/Hold acknowledge signal handshake.

Two channels of the DMA controller 228 are configured for the message passing coprocessor 230 with one channel for receiving data from the parallel system bus 10m and the other channel for transmitting data over the parallel system bus 10m. The other two channels are configured for the fiber optic link with one channel for transmission of data and the other channel for reception of data.

The POL controller 10po has a memory system which provides two megabytes of dynamic RAM 218 and has 128 KB of EPROM 216. The DRAM parity is provided on a byte basis with a parity error causing a non-maskable interrupt to the processor 226. The refresh of the dynamic RAM is handled in hardware. The EPROM is used for the power-on confidence testing and for initial loading of software.

The POL controller 10po provides a serial I/O interface using an asynchronous RS 232 C port to allow communication with an RS 232 C compatible device to allow for diagnostics and software debug. The serial interface is implemented by a Programmable Communication Interface chip 214 and RS 232 C drivers and receivers.

In FIG. 17, the POL controller 10po provides programmable interrupt controllers 208 to process interrupts. One is a master and the other is a slave.

A programmable interval timer 210 is provided for system software support. The preferred usage is that of an NEC 8254 programmable interval timer which provides three 16-bit interval timers. Connected to the data bus 209 is a static RAM/time of day clock 229. This contains 2040 bytes of static RAM, a crystal operated time of day clock, lithium battery and circuitry to switch power between the battery and the system power as needed.

Several light-emitting diodes (LED's) are driven directly by hardware to provide hardware status. Two of the LED's provide status of the parallel system bus interface 10m while the other four LED's provide status of the optical interface. The optical interface status displayed shows the condition of the transmitter and the receiver. One LED is lit to indicate the transmitter is transmitting data. One LED is lit if the cable is connected and the optical transmitter on the other side of the cable is powered up. One LED is lit if the optical receiver is not receiving a message, and another LED is lit if the optical receiver is synchronized to the incoming data stream.

The Multibus II interface via bus 10m allows communication between the POL controller 10po and the other controllers in the storage/retrieval module 10. The interface to the PSB bus 10m consists of the message passing coprocessor 230, the buffer transceivers 233, the interconnect controller 232, and the central system services logic 231. The message passing coprocessor 230 performs memory, I/O references and interconnect space to the PSB interface, and handles the message passing protocol. The message passing coprocessor 230 provides a data path between the local control processor bus 209 and the PSB interface to bus 10m . The coprocessor 230 also provides access to the local interconnect space with a data path to the interconnect space controller 232 of FIG. 17. The multibus interface includes arbitration and transfer control, error detecting and reporting, local bus handshake control, remote diagnostic testing and reporting and also board identification.

The POL board "interconnect space" provides a set of registers for board configuration and diagnostic reporting which allows dynamic configuration of I/O and memory, the initiation of board diagnostics and reporting diagnostic results. This interconnect space is controlled by the interconnect controller 232. The interconnect space functions to enable the addressing and communication to other boards connected to the multiprocessor II bus 10m. In the preferred embodiment, the interconnect space of the POL controller is managed by an Intel 8751 microcontroller. The Multibus II centralized system services (CSM) module 231 provides a central source for general purpose Multibus II functions. These include system clock generation, system initialization, bus time out detection, and power fail handling. The POL controller 10po only provides these functions if the controller is located in slot zero of the Multibus II backplane. The CSM functions are performed via 232, 230 and associated hardware.

In FIG. 17 the optical receiver interface 200 receives serial data with an embedded clock (using Manchester encoding) over a fiber optic link. It separates the clock and recovers the data. The data is checked for framing in order to detect the "start" and the "stop" of messages. The data is converted to a parallel data stream and buffered in the receiver FIFO 204R for later unloading by the processor ADMA 228. Using the CRC checker 206c, there is generated a CRC for messages in order to detect errors in transmission. The optical receiver interface consists of the optical receiver 200, the clock recovery chip 203, the framing and sync stripping circuitry 205, the serial-to-parallel converter 206r, the CRC 206c, the FIFO buffer 204r and various status control registers.

The optical receiver 200 can receive non-return-zero (NRZ) data of up to 50 megabits per second and can convert this to TTL levels. The POL transfers data at 40 megabits per second. The receiver accepts 815 nanometer wavelength signals.

The clock recovery circuit 203 takes the 40 megabit per second Manchester-encoded TTL signal and retimes this data to an internally generated 40 MHz clock, which is phase-locked onto the incoming data. The synchronization state machine 205 is used to generate the 20 MHz clock which is used to clock in the 20 megabit per second decoded data. The delimiter state machine 207 detects all delimiters sent over the interface including start/stop and sync delimiters. This information is used by the receiver state machine (in 206r) to frame the messages, load data into the FIFO's and to discard sync information. The CRC checker 206c checks the message received for errors, and reports this at the end portion of the packets and the message. Any error is latched in the receiver status register where it is available for the control firmware to read.

The receiver logic-shift register 206r takes the covered data and converts it from a serial bitstream to a parallel data stream via its 16-bit shift register. The shift register accepts the 20 megahertz serial data and generates a 16-bit wide word which is used throughout the rest of the receiver.

The 16-bit parallel data is now loaded into the FIFO receiver buffer 204r to decouple the receiving of data from the unloading of the received data by the ADMA 228. The DMA controller 228 is hardwired to access the FIFO 204r without providing address and therefore allowing the DMA controller to operate in a single cycle (flyby) mode. Status and control registers are p for the receiver interface to allow the control processor CPU 226 to monitor the receiver status and to control receiver operation. The receiver status and the control register status can be accessed at an I/O address (90). A read of the I/O address (90) provides input to the status register while a write to the I/O address register 90 writes the control register.

The optical transmitter interface of FIG. 17 receives parallel data, serializes the data, embeds a clock using Manchester encoding transmits the serial data out over a fiber optic link 200t. Messages are framed by the transmitter and the cyclic redundancy check (CRC) is generated for all data transmitted (via 206g). The transmitter logic 206x sends sync information during idle time in the transmitter. The transmitter provides an FIFO buffer to decouple the transmission of data from the ADMA 228. The optical transmitter interface consists of the optical transmitter 200t, the Manchester encoding circuit 206x, the framing and sync generation circuitry 206x, the parallel-to-serial converter in 206x, the CRC generator 206g, the FIFO buffer 204x, and status control registers accessed at the I/O address (80).

The optical transmitter 200t accepts a TTL signal up to 50 megahertz and converts it to an optical signal to be transmitted. In the POL controller, data is transferred at a 40 megabit per second rate over the transmitter. The transmitter 200t accepts 815 nanometer wavelength signals. The transmitter connects to a 62.5 micron fiber optic line.

The Manchester-encoding circuitry 206x accepts a 20 megabit per second serial data stream and generates a 40 megabit per second Manchester-encoded serial output containing an embedded clock signal. The transmitter interface provides circuitry to embed start/stop delimiters for message framing. The circuit 206x inserts synchronization signals into the data stream during IDLE and when data is not available for transmission. The transmitter interface generates, via 206g, the CRC for all messages transmitted and appends it to the ends of messages. The transmitter 200t receives 16-bit wide words for transmission from the control processor 226 and converts them to a serial data stream. The conversion is done via a 16-bit shift register in 206x. The output of the shift register is a 20 megabits per second serial data stream. The transmitter FIFO buffer 204x receives the 16-bit parallel data in order to decouple the transmission of data from the loading of the data by the control processor 226. The DMA controller 228 is hardwired to access the FIFO 204x without providing address and thus allowing the DMA controller to operate in a single cycle mode. Status and control registers are provided for the transmitter interface to allow the control processor 226 to monitor the transmitter status and to control the transmitter operation. The control and status registers are accessed at the I/O address (80).

The systems software in the POL controller 10po handles the data communication protocol used for transmitting data over the fiber optic link. The systems software sets up the processor 226 and the DMA controller 228 for transmitting and receiving data from the transmitter, the receiver and the message passing coprocessor 230. The processor 226 monitors status during communication and generates the appropriate control signals to initiate and terminate communication. The system software also handles the interconnect space and the initialization of other boards which are interfaced to the parallel system bus 10m.

The Multibus II, seen as 10m of FIG. 17, consists of the Parallel System Bus (often designated iPSB), a Local Bus Extension, a Serial System Bus, an I/O Expansion Bus, and the Multichannel DMA (direct memory access) I/O bus. The Multibus II is specified in the IEEE standard P1296.

The Multibus II Parallel System Bus is the only bus used in the storage/retrieval module 10. It is a high performance general purpose bus that provides data movement and interprocessor communication functions in addition to supporting arbitration, execution, and I/O data movement and board configuration support. The Parallel System Bus (PSB) supports four address spaces: a 32-bit memory address space, a 16-bit I/O address space, a 32-bit message address space, and a 16-bit interconnect address space. Data is clocked at 10 megahertz and the data can be up to 32 bits wide.

The PSB provides for message passing. This allows two bus agents or boards to exchange information in blocks of data providing a high performance facility for moving data from one functional module to another without administrative overhead for memory management or synchronization problems at the bus interface. All controller boards support the message passing using hardware via the message passing coprocessor (MPC) 230. The Parallel System Bus uses message passing as a maximum burst transfer capability of 32 megabytes per second.

GLOSSARY OF ITEMS RELATING TO STORAGE/RETRIEVAL SYSTEM

BALANCING: This is the process of proving that debit and credit totals are correct in a group of transactions.

CLUSTER: In the Image Item Processing System, this is a group of document processors (with imaging capability) and the related units that are networked together.

CODE LINE: The magnetic ink character recognition (MICR) printing that appears at the bottom of a financial document. A document processor reads this encoding, records the code line, and passes the record on to the item processing system for placement in the data base and for pocket selection.

DISK DRIVE: A device that reads data from a magnetic disk and copies it into a computer's memory so that it can be used by the computer. Additionally, it is a device that writes data from the computer's memory onto a disk so it can be stored.

DOCUMENT: This is any piece of paper relevant to the transfer of monetary funds and, in general, it denotes any document that can be processed by a document processor such as, for example, a check, a deposit ticket, or a batch control document.

DOCUMENT IDENTIFICATION NUMBER: A number assigned by the Unisys Item Processing System that uniquely identifies each document within a block of work and for a given processing day. The document identification number is part of the *Retrieval Index* (RIX), and this is endorsed on each item as it is processed.

DOCUMENT PROCESSOR: This is a machine that reads document magnetic ink character recognition (MICR) code lines and sorts the documents into physical packets. Document processors can also be used to endorse, microfilm, or image capture documents.

ENCODE: The act of printing machine-readable magnetic characters or optical characters on a document.

ENCODER: A device that prints machine-readable magnetic characters or optical characters of a standard size and style on a document.

FIBER OPTIC CONNECTION: A communications pathway which uses optical fiber as its transmission media. This is used in the point-to-point optical link.

FIELD This is a defined area for recording a single piece of information.

FIRMWARE: A program that has been implanted in a read-only memory device.

FLOAT: The dollar amount of items outstanding and in the process of collection from banks. Float is also often designated as "uncollected funds".

GIGABYTE (GB): A value equivalent to one billion bytes of memory (1,000,000,000).

HOST: The mainframe computer in the Image Item Processing System that makes general purpose processing, storage, and communication resources available to the image application and systems programs, and also centralizes the monitoring and control of the system.

HOST LAN: This is the local area network controller connecting the host to the storage and retrieval modules in the Image Item Processing System.

IMAGE: A set of digital data which represents one side of a document and which can be fed to a workstation screen in order to present a visual representation of the document.

IMAGE BALANCING WORKSTATION: An image workstation (12) for performing balancing in applications running on the Image Item Processing System. Here the operator views transactions to check the correctness of the items involved, such as checking the items on a deposit slip with the actual images of the checks to be sure that they all correlate properly.

IMAGE CHECK PROCESSING SYSTEM (ICPS): An imaging application that facilitates amount-entry of checks, encoding of checks, code-line identification correction, balancing and distribution for standard over-the-counter checks.

IMAGE DATA ENTRY WORKSTATION: A workstation for performing data entry in applications running on the Image Item Processing System.

IMAGE HEADER: A part of an image packet with information to correlate the image data to document information stored in the host computer (6) and to allow later reconstruction of images.

IMAGE ITEM PROCESSING SYSTEM (IIPS): A Unisys product for capturing, storing and retrieving document images. This product is a platform for imaging applications, such as the Image Check Processing System, which facilitates financial document processing.

IMAGE PACKET: In the Image Item Processing System, a block of compressed image data for transmission. Each packet has "header" information to correlate the image data to the document information stored in the host computer (6). Each packet holds compressed image data.

IMAGE PRINT WORKSTATION: A workstation for printing images and text information relating to applications running on the Image Item Processing System.

IMAGE WORKSTATION: Any one of the intelligent terminals in the Image Item Processing System which is networked to a Storage and Retrieval Module (SRM 10).

IMAGE WORKSTATION LAN: This is the local area network connecting image workstations 12 (FIG. 1) to the Storage/Retrieval Modules (SRM 10) in the Image Item Processing System.

IMAGING MODULE: A part (8i) of the document processor 8 that captures and digitizes check images, which digitized data can be converted to optical digitized data and transmitted via a fiber optic link to the Storage and Retrieval Module 10.

INTERCONNECT SPACE: A separate address space on Multibus II that allows for dynamic configuration of I/O and memory, remote diagnostic testing and reporting, and printed circuit board assembly identification. Multibus II is a trademark of the Intel Corporation of Santa Clara, California.

ITEM: Any piece of paper that can be processed by a document processor. Such pieces of paper will contain certain information data considered to be of value for storage and retrieval.

ITEM PROCESSING SYSTEM: The related equipment, including computer hardware and software, for capturing information from financial documents (such as checks), and for using the information to perform related tasks such as proof, correctness and balancing.

LOCAL AREA NETWORK: A data communication network confined to a relatively small area, such as a group of offices, which is usually capable of high speeds and heavy traffic volumes.

LOG: A record of operations of a computer system which lists each job or run made, the time it required, the operation actions and other pertinent and useful data.

MAGNETIC INK CHARACTER RECOGNITION (MICR): The technology of enabling printed characters composed of a pattern of magnetic ink to be read by a machine.

MODULE: A package unit that is usually interchangeable. Modules are units in a system which are, in turn, composed of smaller components.

NETWORK ARCHITECTURE: This involves the rules, protocols, services, formats, conventions, and interface specifications that collectively describe the logical structure of a communications system and provide a basis for its design and implementation.

OPERATING SYSTEM: The software that controls the execution of computer programs and that typically provides scheduling, debugging, input/output control, accounting, compilation, storage assignment, data management, and related services.

OPERATOR CONTROL STATION (OCS): A remote Unisys host terminal that is connected by a direct-interconnect to the host computer 6. It is used to perform functions similar to those performed with an operator display terminal (ODT).

OPTICAL FIBER: A thread of highly transparent glass that is pulsed very rapidly to carry a stream of binary optical signals. In carrying a high volume of data, the optical fibers are immune to electrical interference that can often plague conventional cables.

PARALLEL INTERFACE: An equipment boundary where information is transferred simultaneously over a set of paths, as, for example, where all the data bits in a character are sent simultaneously over eight parallel paths. This is to be contrasted with a serial interface where data is sent serially on one path.

PIPELINE: The set of printed wiring circuit boards in the Imaging Module (8i) that processes and compresses image data. There are two pipelines in the system, one for front document image capture and another for rear document image capture.

POINT-TO-POINT OPTICAL LINK: A data link that uses fiber optic technology for images from an imaging module to a storage and retrieval module at the high data rates required for efficient imaging applications.

PROTOCOL: A set of rules or conventions governing the exchange of information between computer systems, or other types of electronic modules.

REJECT POCKET: A specific pocket in the document processor sorter 8 to which all control tickets, all items that fail the sort pattern, all items involved in feeder exceptions, and certain specifically selected items selected by the sort pattern, are all sent for accumulation.

REMOTE TERMINAL: A device for communicating with a computer from sites that are physically separated from the computer, often distant enough that communications facilities, such as telephone lines, are used rather than direct cables.

RIX: This is the retrieval index which is a unique key used to retrieve any stored image. Elements of the "key" include the data, the location of capture, the sorter identification, and the sequence of input.

ROM A read-only memory used in computers which is permanently programmed with one group of frequently used instructions. It does not lose its program when the computer's power is turned off, but normally the program cannot be changed by the user.

RS-232-C: A standard interface between data terminal equipment and data communication equipment (employing a 25-pin connector) in order to support a serial binary interchange.

SCREEN: A surface on which information is displayed, such as a video display screen.

SERIAL INTERFACE: An interface on which all the data moves over the same wire one bit after the other.

SITE: A designation for document processors within a document processing center. If multiple document processors are used at one center, a single physical center can have more than one site. If only one document processing data base exists, then site and center are the equivalent of each other. Also used to generally desig-nate the locale or location area where equipment is placed.

SORT PATTERN: This is a user-defined data structure used by an input device handler in order to sort documents into selected packets. Each "sort pattern" has other non-sorting parameters related to the specific type of items being sorted.

STORAGE AND RETRIEVAL MODULE (SRM): In the Image and Item Processing System, this is the unit (SRM 10) that stores image packets on magnetic disk and sends images to image workstations (12) for display or for printing (14).

STORAGE AND RETRIEVAL MODULE LAN: This is the local area network which connects storage and retrieval modules in the Image Item Processing System.

SYSTEM: In data processing, this is a collection of people, machines, and methods organized to accomplish a set of specific functions.

SYSTEM DIRECTORY: A set of records in the host computer 6 that defines the entities in the Image Item Processing System. These records establish the system configuration.

SYSTEM SERVICES: In the Image Item Processing System, these involve the commands and supporting programming code in the system software that form an interface between the hardware and the application software.

TERMINAL: A keyboard/display or keyboard/printer device used to input programs and data to the computer and to receive output from the computer.

THROUGHPUT: This is a measure of total system performance, usually stated in the number of documents processed per hour of actual operation with time for certain indirect tasks excluded.

TWO-WIRE DIRECT INTERFACE (TDI): This is a Unisys interface that is based on the RS-232-C interface and is used for connecting peripherals a host (6) through a CP 2000 communications processor (4B, FIG. 1A).

UNIT: A device having a special function. In the Image Item Processing System, this would be a basic part of the system. For example, the host 6 is a unit in the system.

UTILITY PROGRAMS: These are computer programs that provide commonly needed services, such as transferring data from one medium to another (disk to tape) and character conversion. Utilities are designed to facilitate or aid the operation and use of the computer for a number of different applications and uses.

WINDOW: A portion of a screen display that is dedicated to a specific use and which can have separate documents. Each window is independently controlled by the application program.

WORKSTATION: A configuration of computer equipment designed for use by one person at a time. A combination of cathode ray tube screen, central processing unit, memory and keyboard with or without local storage facilities. A workstation may be connected to a computer or may be used as a stand-alone system for local processing.

There has been described herein a remotely located storage/retrieval subsystem which can operate with a remote document image processing system without the need for a remote host computer. The network can be controlled and managed by a local host computer which maintains communication and control of the remote storage/retrieval modules and remote document processing system by means of modems and by means of a specialized communication processor which links the remote storage/retrieval modules.

While other embodiments may have similar functions to the system described herein, it should be understood that the presently developed system and storage retrieval capabilities are encompassed by the following claims.

What is claimed is:

1. A banking system financial network using a single local host computer means for managing specialized digital storage-retrieval module means at a local site and at a remote site, said system network comprising:
(a) a local subsystem means for storing and making humanly readable packets of digital information and image data stored at said remote site, and including:
(a1) a local host computer means at said local site communicating with a local digital storage-retrieval module means including:
(a1a) a local communication means for information and image data transfer to and from a remote subsystem at said remote site;
(a1b) means to transmit and receive instructions and management data to and from said remote subsystem;
(a2) said packets providing digital images of bank checks and/or financial documents;
(a3) local specialized digital storage-retrieval module means for storing and retrieving said packets of digital information and image data as copied from a remote specialized digital storage retrieval module means;

(a4) local peripheral device means including work stations and printers for accessing said packets for transformation into humanly readable form in real time;

(b) remote subsystem means for transforming bank checks and financial documents into digital information and image data packets for storage in said remote specialized digital storage retrieval module means including:

(b1) remote document processor means for reading and converting each incoming check and financial document into a digital packet of image and information data as digital optical signals and including:

(b1a) means to transmit said digital packets to said remote specialized storage-retrieval means at a rate of "R" packets per second where each packet includes "K" kilobytes of data;

(b2) remote communication transfer means including:

(b2a) means for enabling commands and data transfers between said local host computer means and said remote document processor means;

(b2b) means for enabling transfer of said packets between said remote specialized storage-retrieval means and said local specialized storage-retrieval means;

(c) said remote specialized digital storage-retrieval module means for converting said digital optical signals, from said remote document processor means, into digital electrical signal pockets of digital image and information data for transmission to said remote peripheral device means and to said local specialized storage retrieval means;

(d) remote peripheral device means including work stations and printers for accessing said packets into humanly readable form in real time.

2. The banking system financial network of claim 1 wherein each of said remote and local specialized digital storage retrieval means includes:

(a) a plurality of storage/retrieval module means connected in a cluster wherein said plurality of storage/retrieval module means are connected to each other via a local area network controller means and function without need to interrupt said host computer means in storage/retrieval operations, wherein each of said storage/retrieval module means includes:

(a1) means for receiving digitized optical signals containing packets of image data and information data in real time, said digitized optical signals transmitting at least 30 packets of image data per second;

(a2) means for converting said digitized optical signals to digitized electrical signals;

(a3) means for storing said electrical signals in real time on identified areas of disk units organized into files within a file system and which separates non-image information data and image data into separate files;

(a4) means for retrieving in real time, and without alteration, said electrical signals from said separate files as identified image data and non-image information data packets concurrently while storage operations are also taking place;

(a5) means for transmitting retrieved image data packets to a work station for display or to a printer for printout;

(a6) means for communicating with said host computer means to receive operational instructions and to transmit said non-image information data for storage and use by said host computer means;

(a7) parallel system bus means for interconnecting said means of (a1) through (a6);

(b) said local area network controller means for enabling communication from any one storage/retrieval module means to another storage/retrieval module means in a clustered group of storage/retrieval module means.

3. The banking system financial network of claim 1 wherein said local and remote storage-retrieval module means each includes:

(a) means for secure storage, without alteration, of said digital packets;

(b) a plurality of disk units for storing said digital packets;

(c) means for storing said digital packets in real time on identified areas of said disk units organized into files within a file system and which separates non-image information and image data into separate files;

(d) means for retrieving in real time and without alteration said digital packets from said separate files as identified image data and non-image information data packets concurrently while storage operations are also taking place.

4. The banking system financial network of claim 1 wherein "R" is equal to 30 packets per second and "K" is equal to 40 kilobytes.

* * * * *